(12) United States Patent
Lee

(10) Patent No.: US 12,126,824 B2
(45) Date of Patent: *Oct. 22, 2024

(54) METHOD FOR ENCODING/DECODING VIDEO SIGNAL, AND APPARATUS THEREFOR

(71) Applicant: Apple Inc., Cupertino, CA (US)

(72) Inventor: Bae Keun Lee, Seongnam-si (KR)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/135,106

(22) Filed: Apr. 14, 2023

(65) Prior Publication Data
US 2023/0370631 A1 Nov. 16, 2023

Related U.S. Application Data

(63) Continuation of application No. 17/241,950, filed on Apr. 27, 2021, now Pat. No. 11,632,562, which is a
(Continued)

(30) Foreign Application Priority Data

Feb. 26, 2019 (KR) .................. 10-2019-0022767

(51) Int. Cl.
*H04N 19/159* (2014.01)
*H04N 19/109* (2014.01)
(Continued)

(52) U.S. Cl.
CPC .......... *H04N 19/51* (2014.11); *H04N 19/109* (2014.11); *H04N 19/159* (2014.11); *H04N 19/176* (2014.11); *H04N 19/70* (2014.11)

(58) Field of Classification Search
None
See application file for complete search history.

(56) References Cited

U.S. PATENT DOCUMENTS 11,025,944 B2 6/2021 Lee
11,632,562 B2 * 4/2023 Lee ................. H04N 19/70
(Continued)

FOREIGN PATENT DOCUMENTS

CN 104396248 3/2015
CN 109314785 2/2019
(Continued)

OTHER PUBLICATIONS

Bross et al., "Versatile Video Coding(Draft 4)," Joint Video Experts Team (JVET) of ITU-T SG 16 WP3 and ISO/IEC JTC 1/SC 29/WG 11, Jan. 18, 2019, pp. 1-301.
(Continued)

*Primary Examiner* — Christopher G Findley
(74) *Attorney, Agent, or Firm* — Fish & Richardson P.C.

(57) ABSTRACT

A method for decoding a video, according to the present invention, may comprise the steps of: parsing a first flag indicating whether inter prediction on the basis of a merge mode is applied to a current block; if the first flag is true, parsing a second flag indicating whether a regular merge mode or a merge offset encoding mode is applied to the current block; and if the second flag is true, parsing a third flag indicating whether the merge offset encoding mode is applied to the current block.

16 Claims, 19 Drawing Sheets

Related U.S. Application Data continuation of application No. 17/126,803, filed on Dec. 18, 2020, now Pat. No. 11,025,944, which is a continuation of application No. PCT/KR2020/002754, filed on Feb. 26, 2020.

(51) Int. Cl.
*H04N 19/176* (2014.01)
*H04N 19/51* (2014.01)
*H04N 19/70* (2014.01)

(56) References Cited

U.S. PATENT DOCUMENTS

| | | |
|---|---|---|
| 2015/0103897 A1 | 4/2015 | Kim et al. |
| 2016/0100189 A1 | 4/2016 | Pang et al. |
| 2020/0053379 A1 | 2/2020 | Han et al. |
| 2020/0169748 A1 | 5/2020 | Chen et al. |
| 2020/0169757 A1 | 5/2020 | Chiang et al. |
| 2021/0105499 A1 | 4/2021 | Lee |
| 2021/0218957 A1 | 7/2021 | Jang |
| 2021/0258599 A1 | 8/2021 | Lee |
| 2021/0392364 A1 | 12/2021 | Chiang et al. |

FOREIGN PATENT DOCUMENTS

| | | |
|---|---|---|
| KR | 10-2013-0028633 | 3/2013 |
| KR | 10-2014-0049527 | 4/2014 |
| KR | 10-2018-0037583 | 4/2018 |
| WO | WO 2017/176092 | 10/2017 |
| WO | WO 2018/026222 | 2/2018 |
| WO | WO 2018/030773 | 2/2018 |
| WO | WO 2018/128222 | 7/2018 |

OTHER PUBLICATIONS

International Preliminary Report on Patentability in International Appln. No. PCT/KR2020/002754, dated Sep. 10, 2021, 11 pages (with Machine Translation).

International Search Report and Written Opinion in International Appln. PCT/KR2020/002754, dated Jun. 10, 2020, 13 pages (with Machine Translation).

* cited by examiner

【FIG. 1】
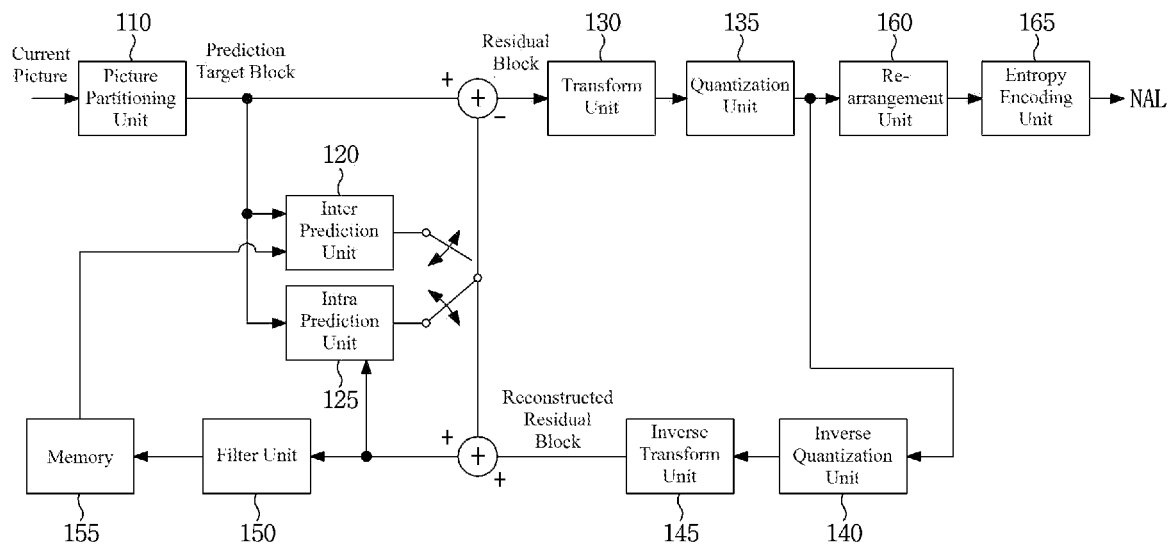
【FIG. 2】
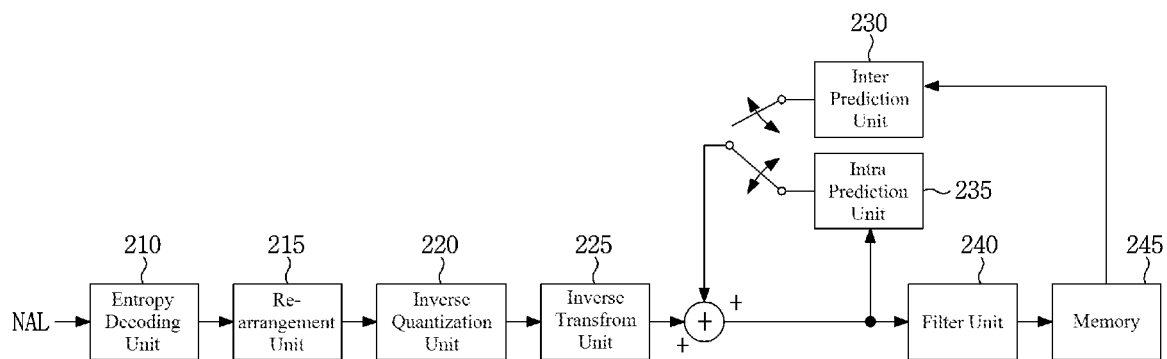

【FIG. 3】
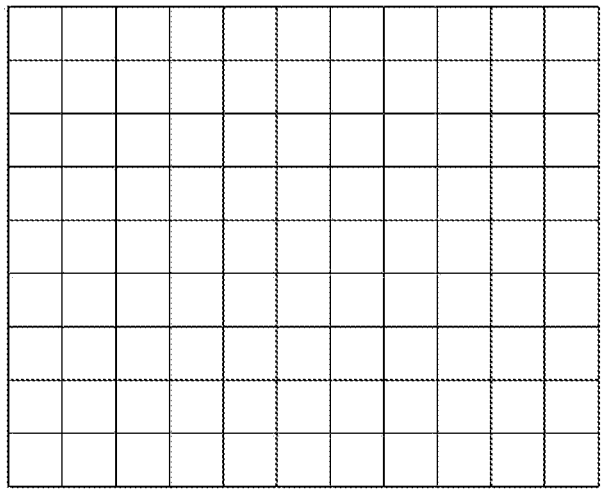
【FIG. 4】
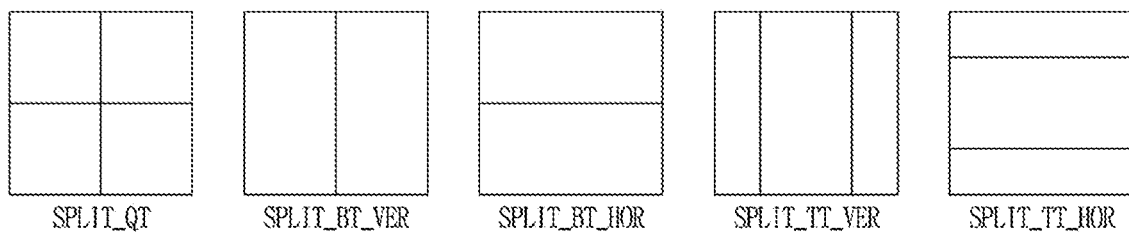
【FIG. 5】
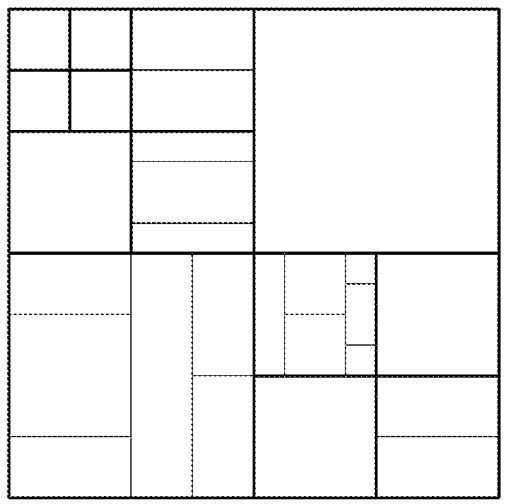

[FIG. 6]
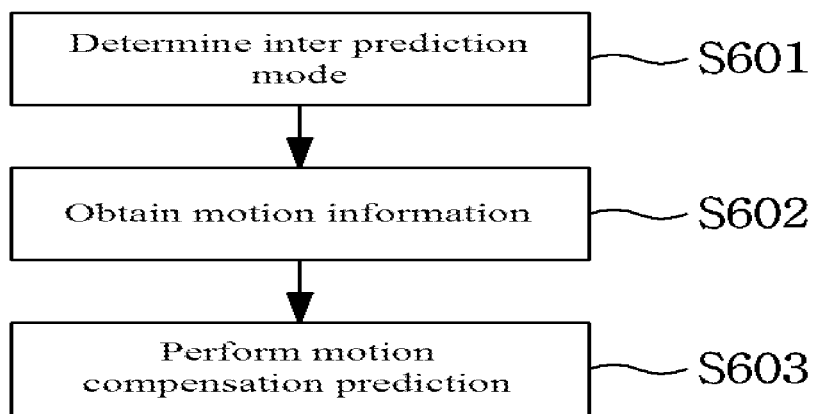
[FIG. 7]
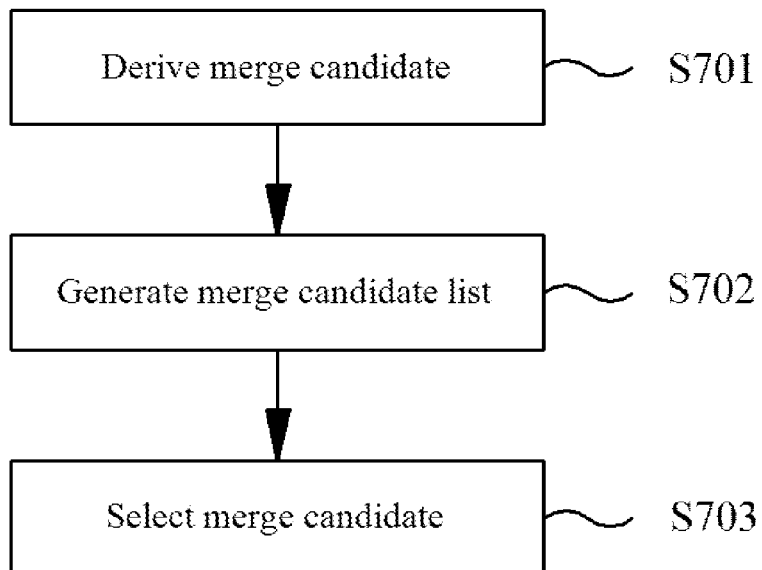

[FIG. 8]
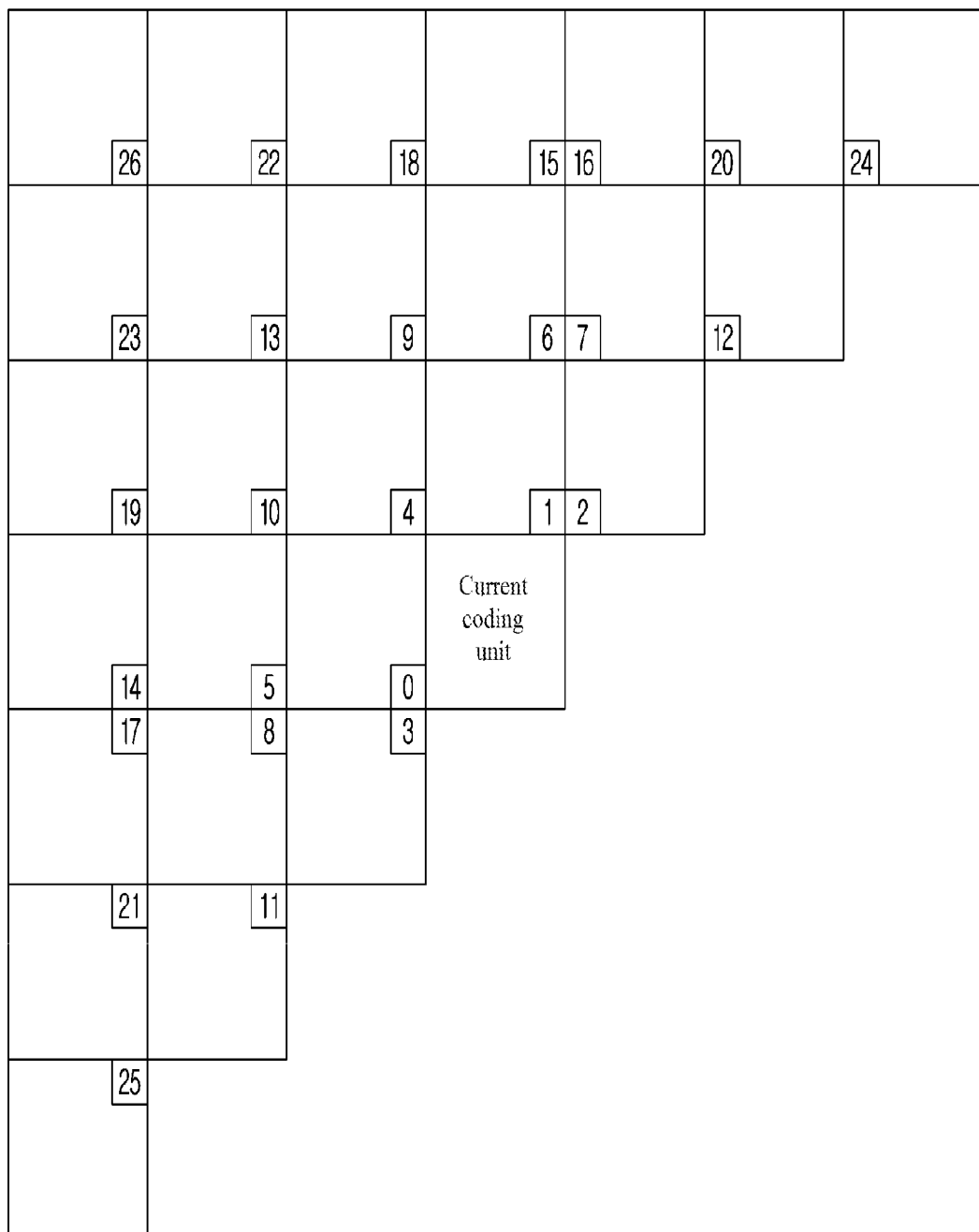

[FIG. 9]
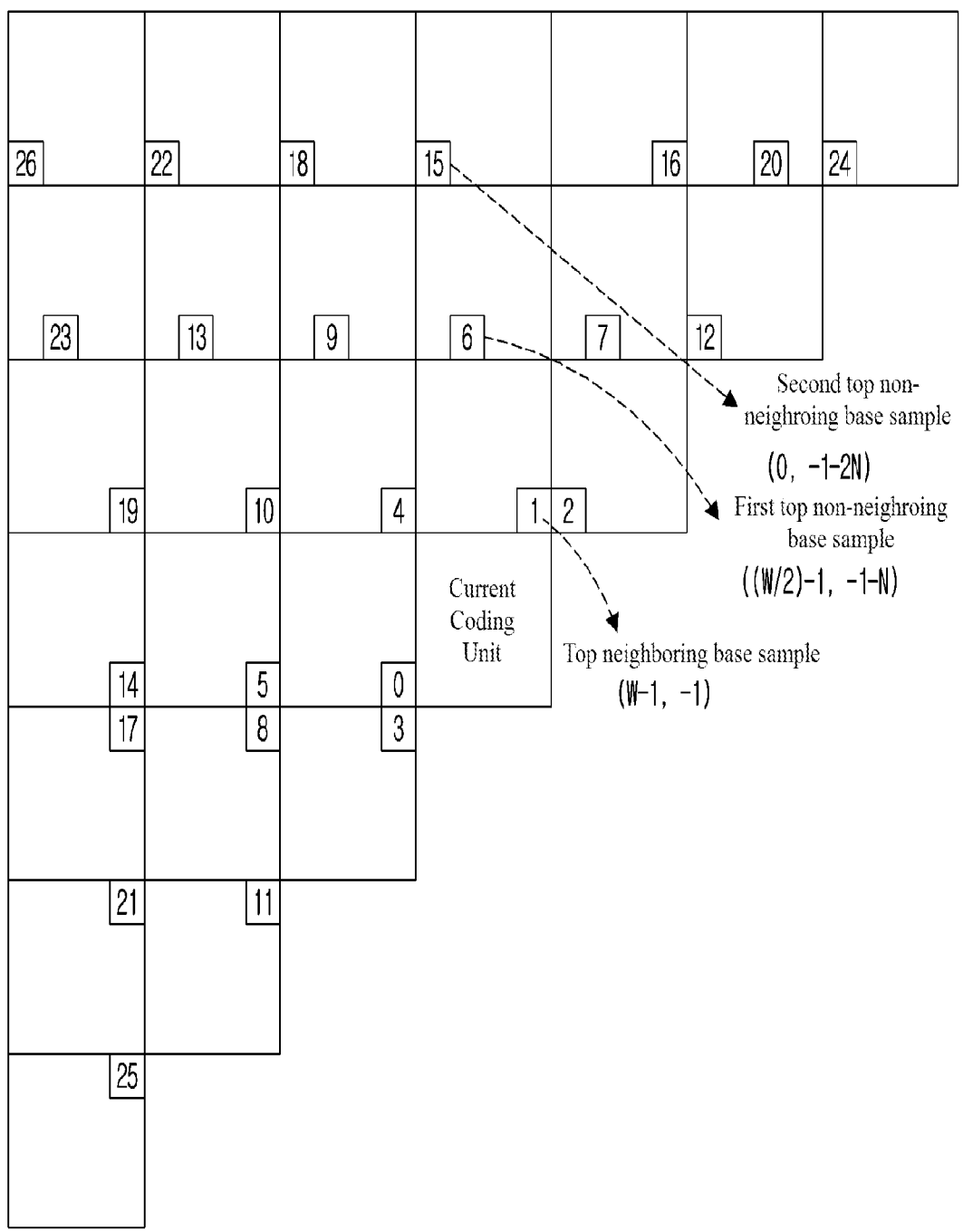

[FIG. 10]
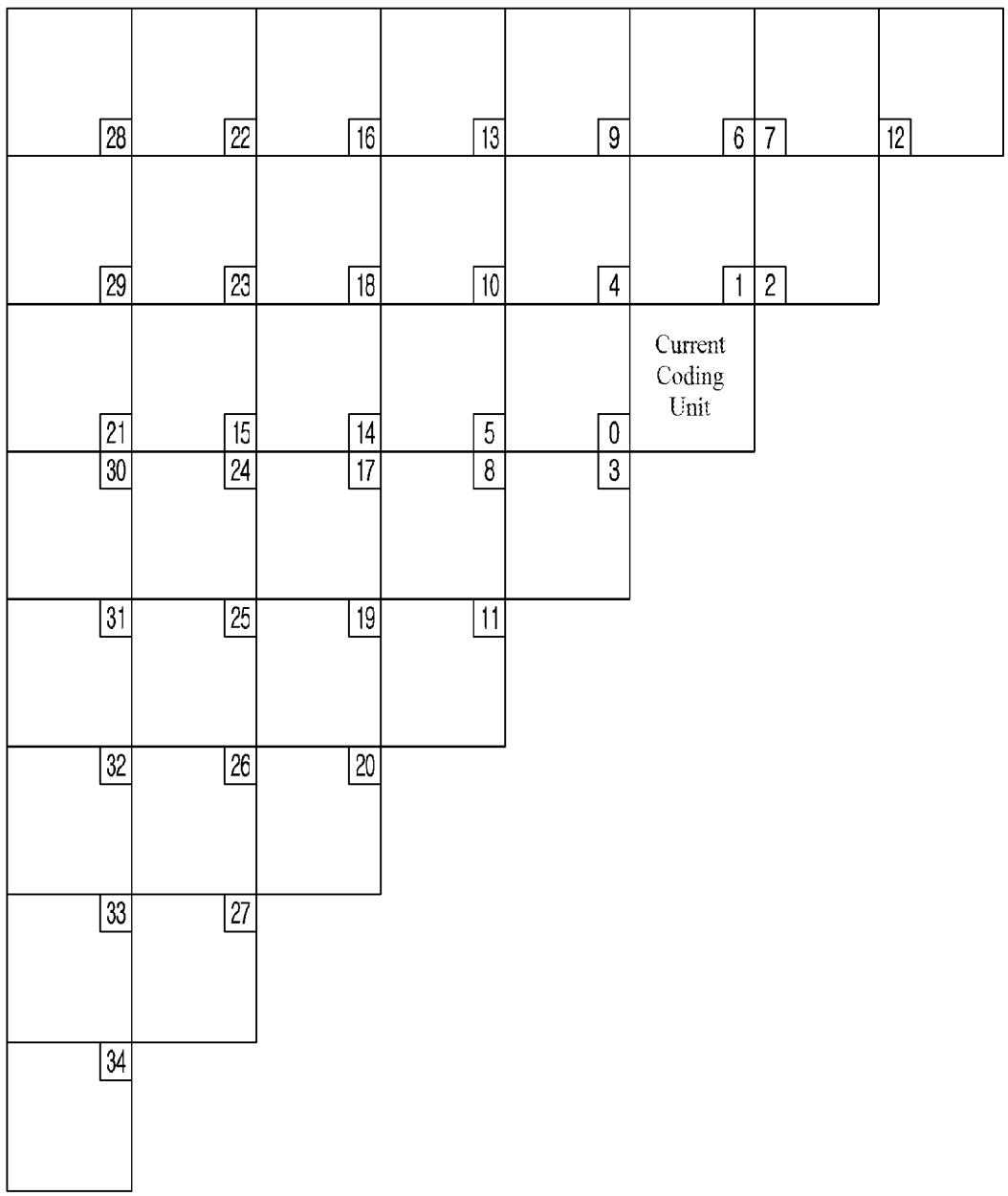

[FIG. 11]
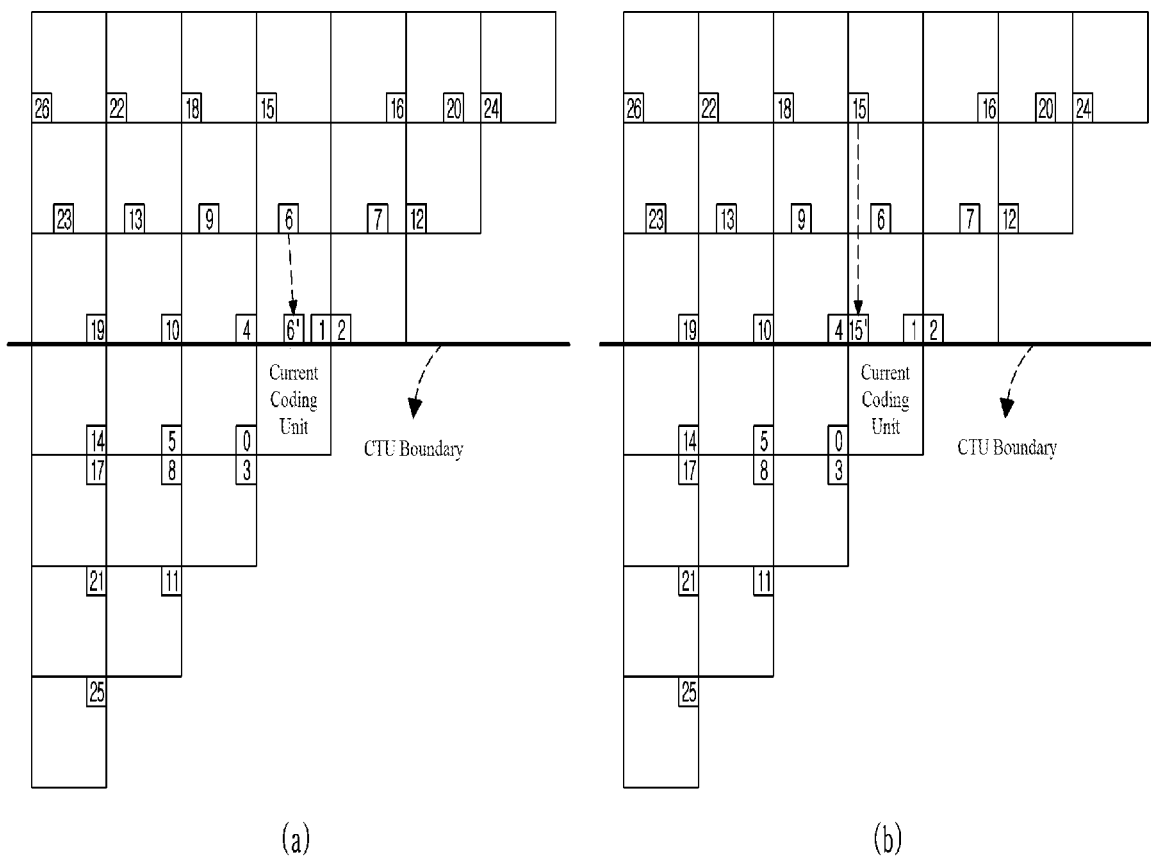
(a)　　　　　　　　　　(b)

【FIG. 12】
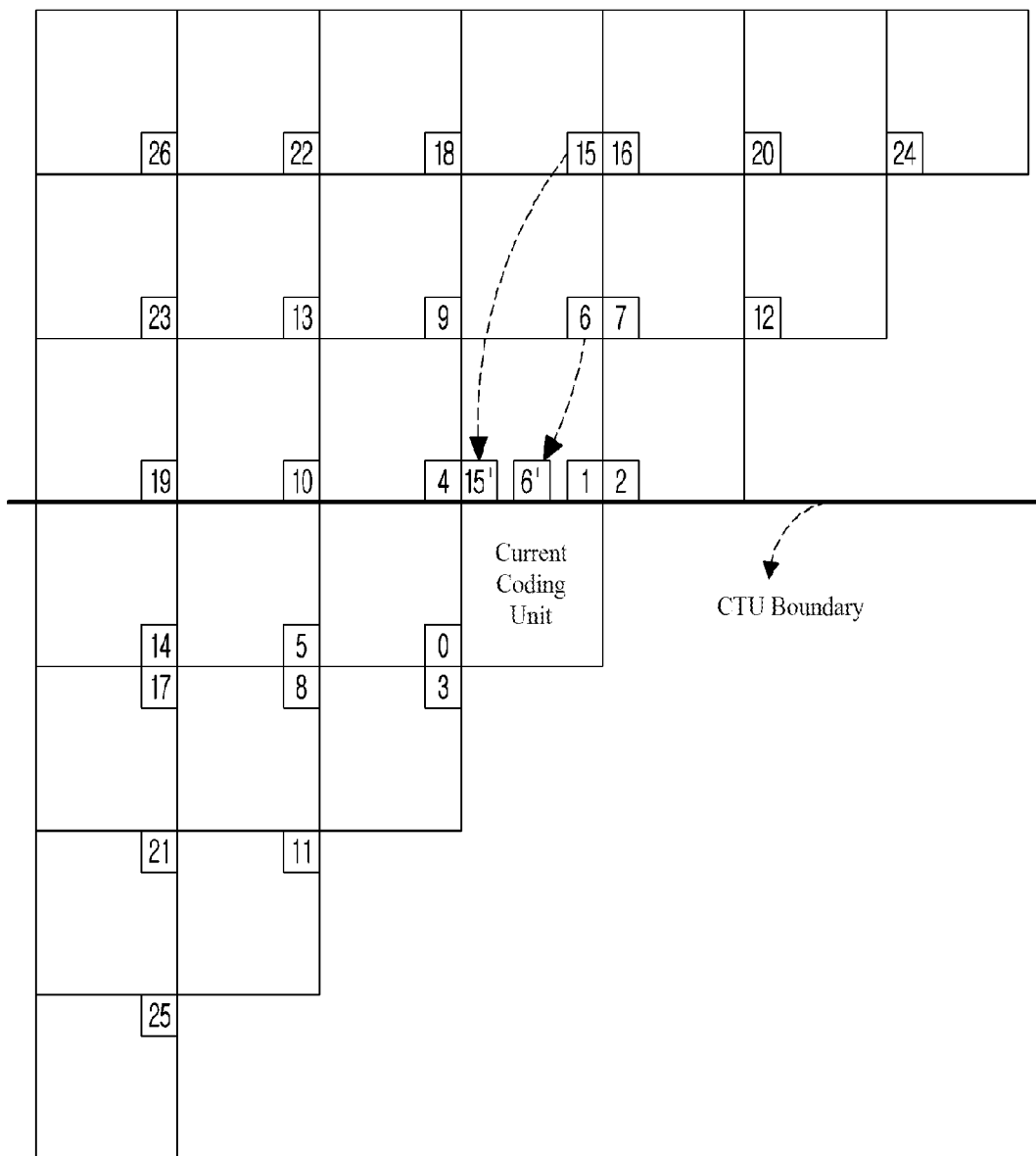

[FIG. 13]
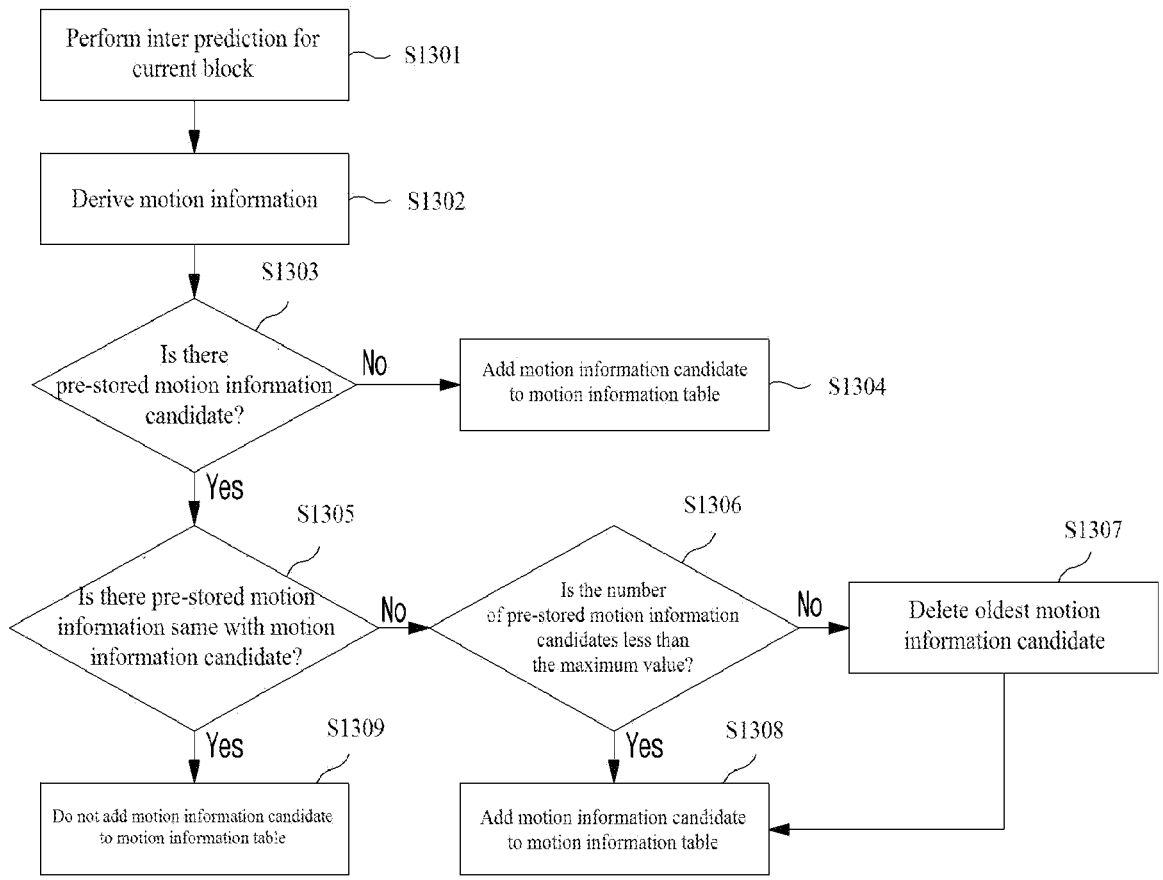
[FIG. 14]
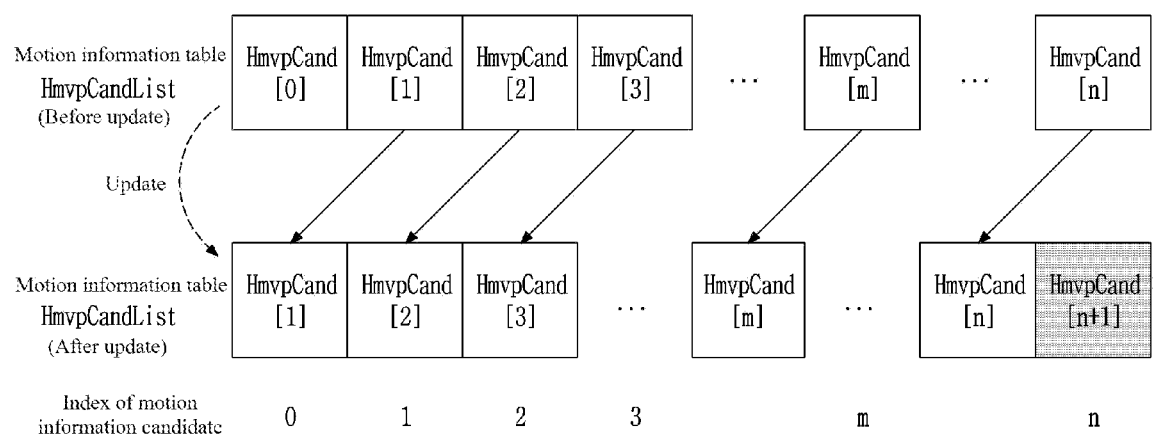

【FIG. 15】
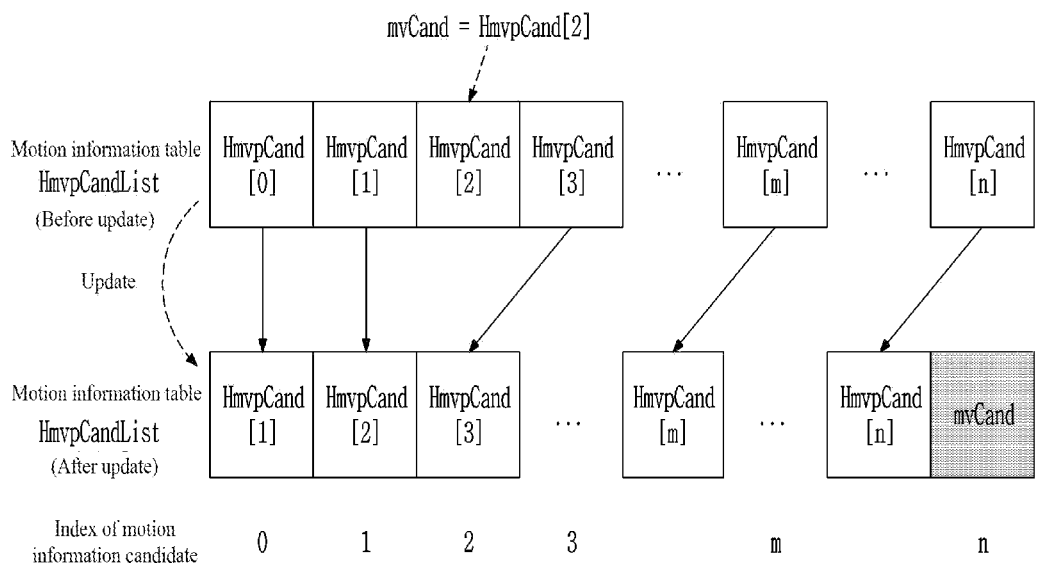
【FIG. 16】
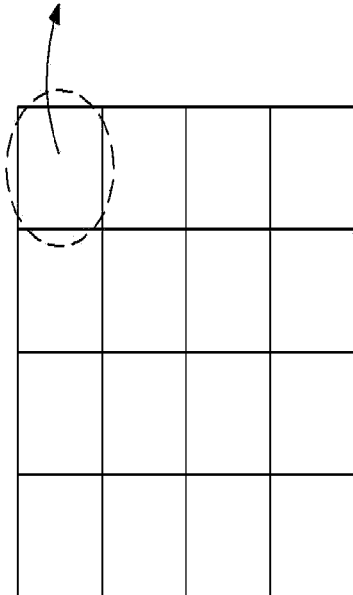 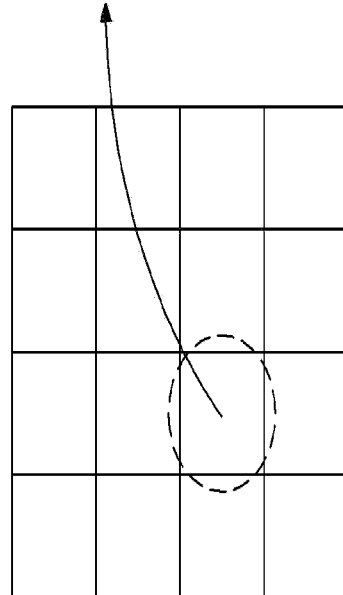
Representative sub-block     Representative sub-block
(a)        (b)

【FIG. 17】
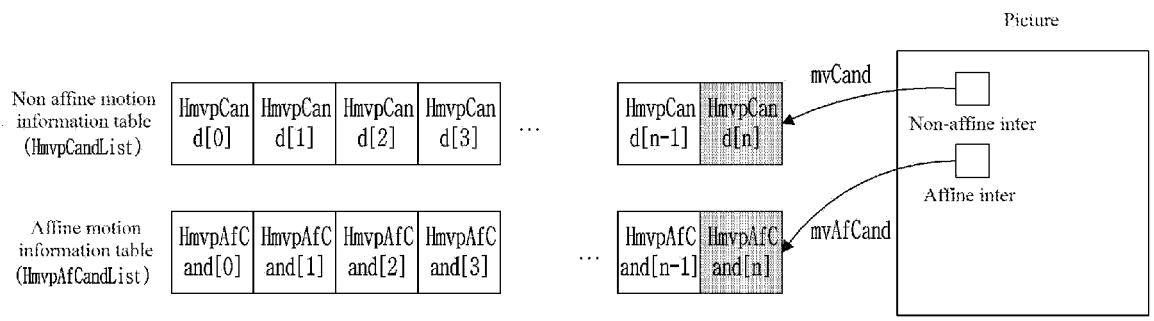
【FIG. 18】
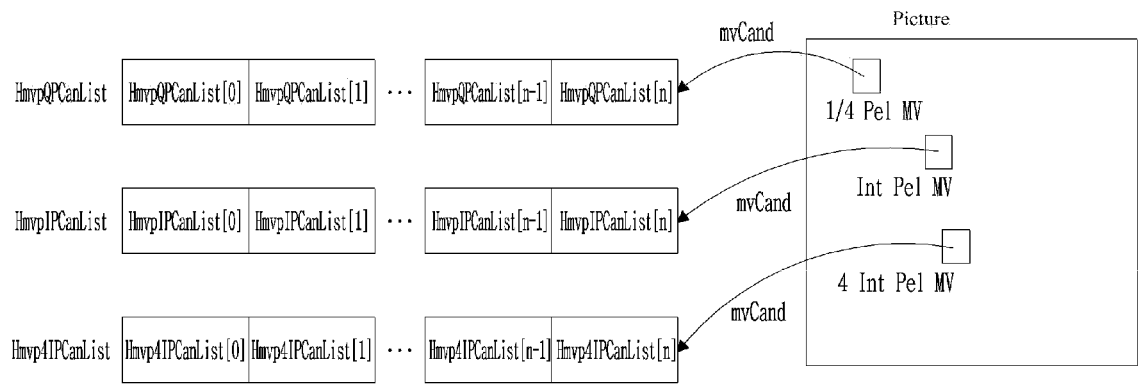
【FIG. 19】
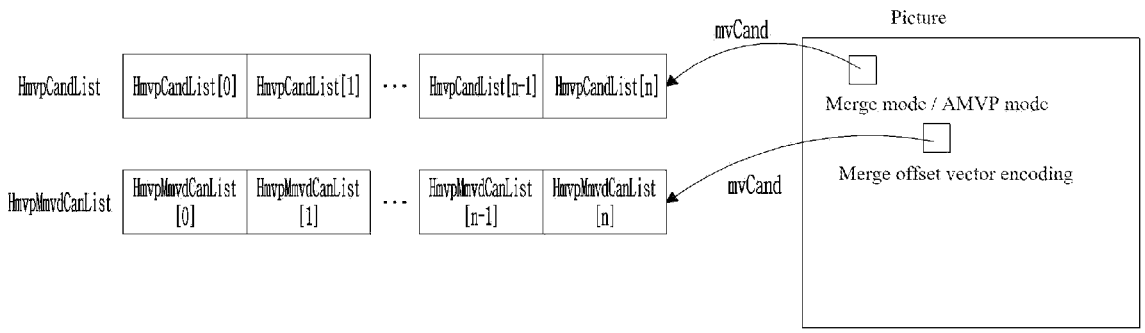

[FIG. 20]
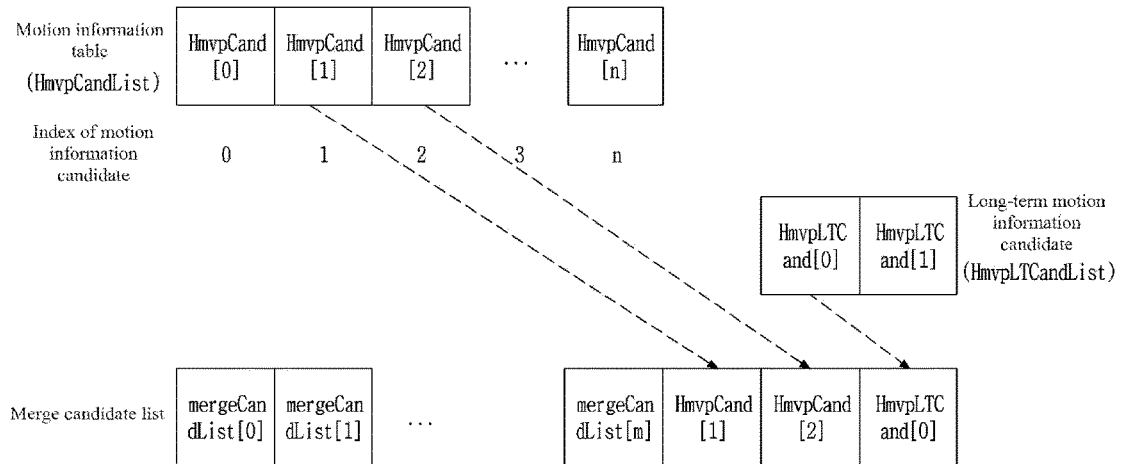
[FIG. 21]
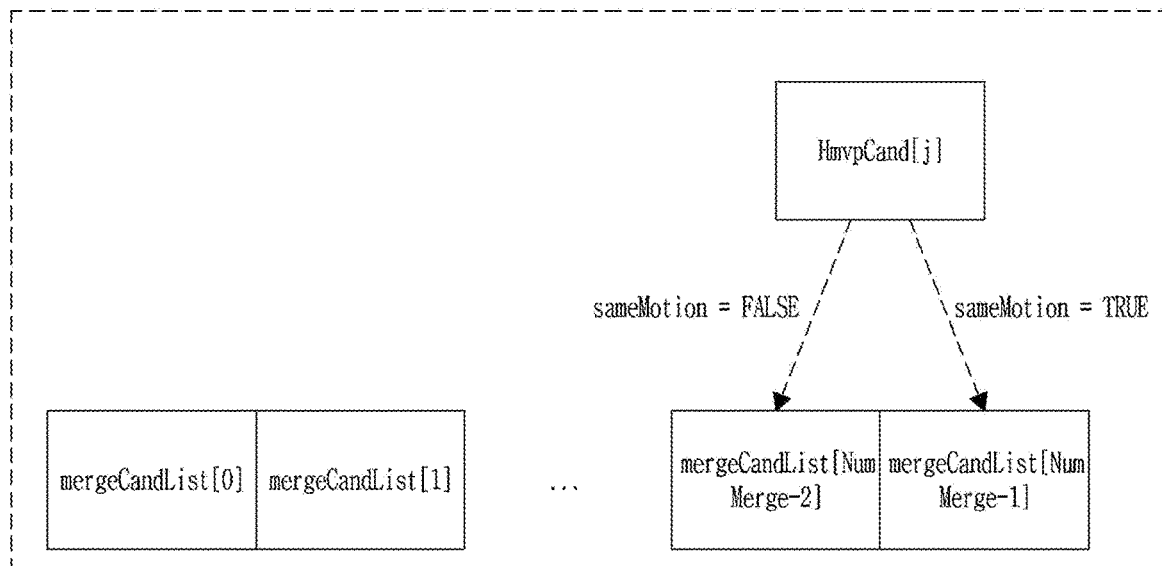

[FIG. 22]
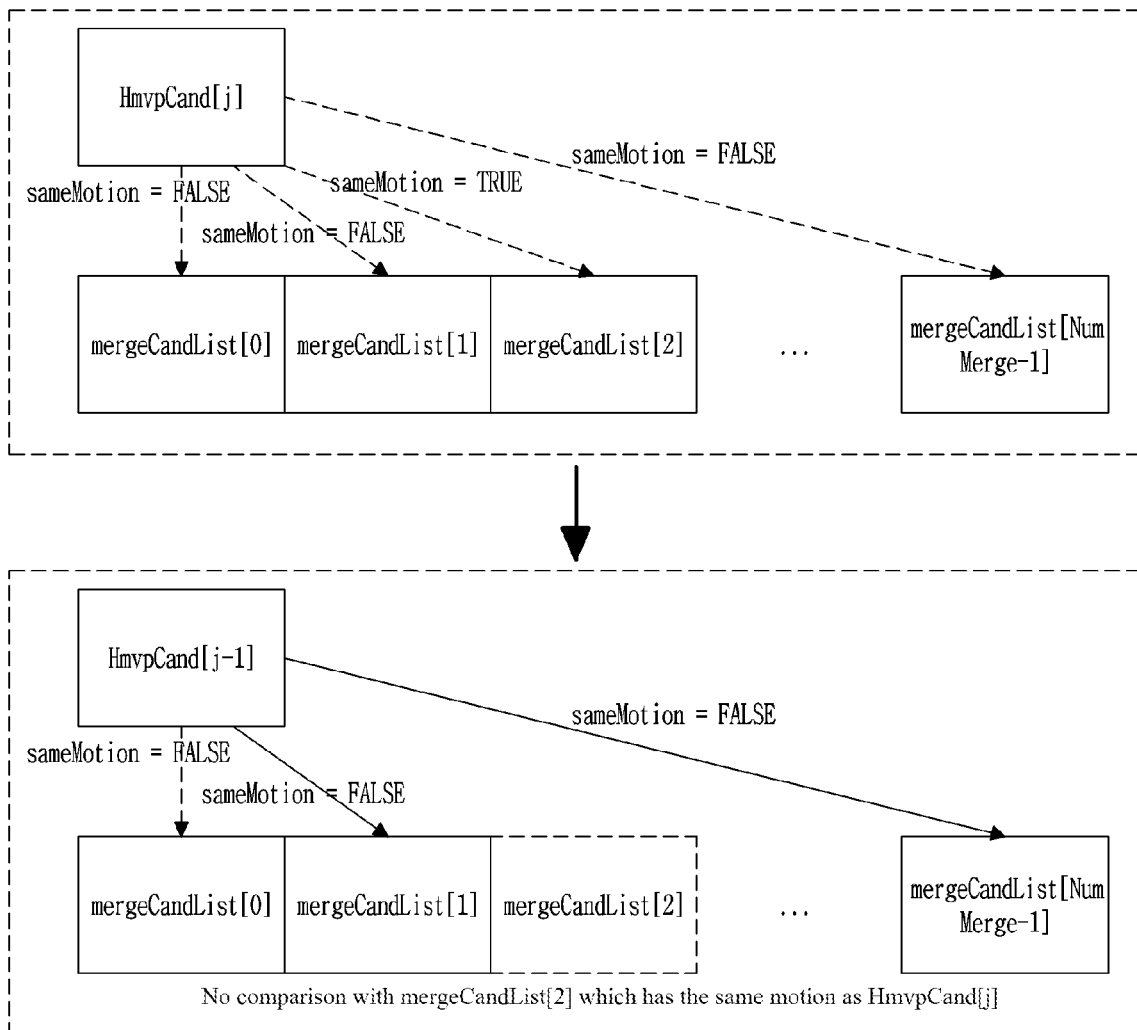

[FIG. 23]
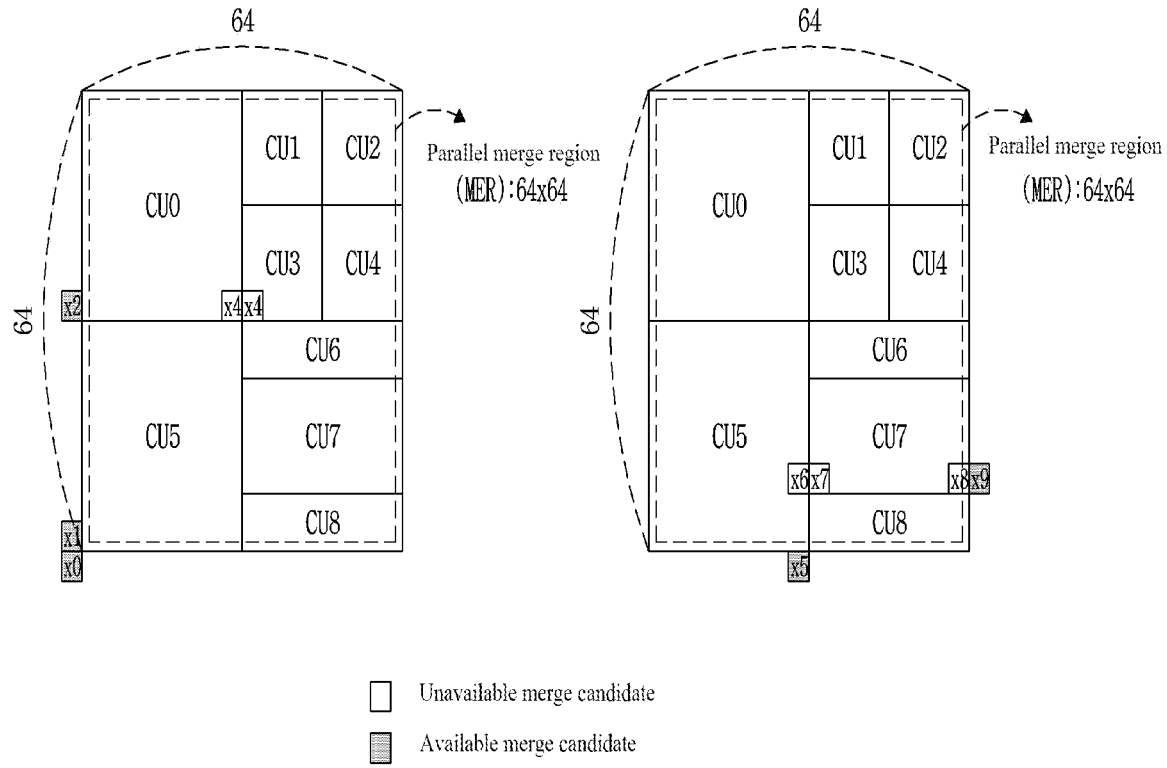
[FIG. 24]
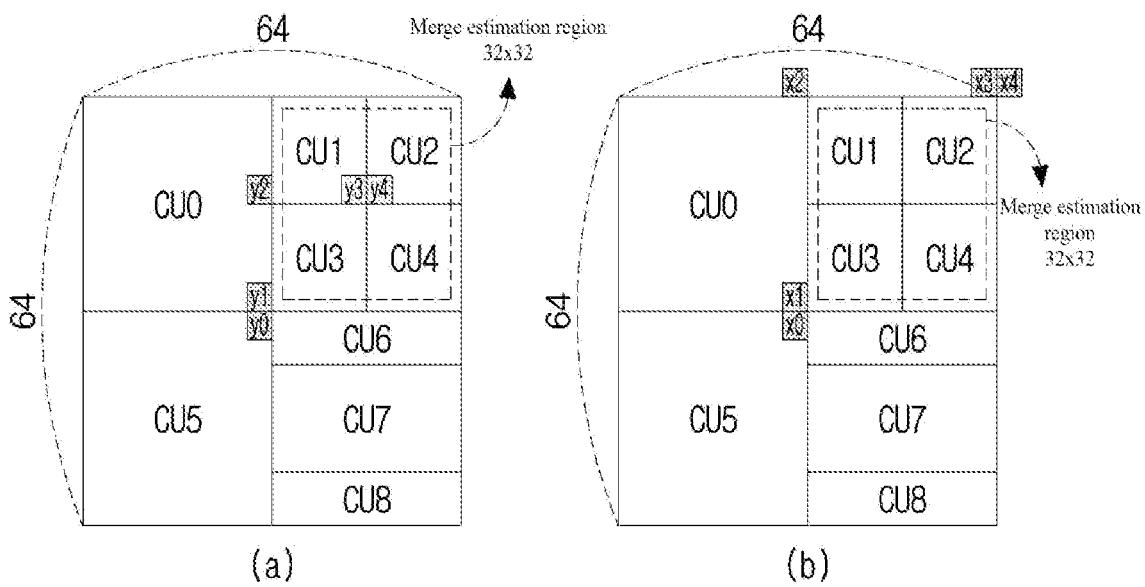

[FIG. 25]
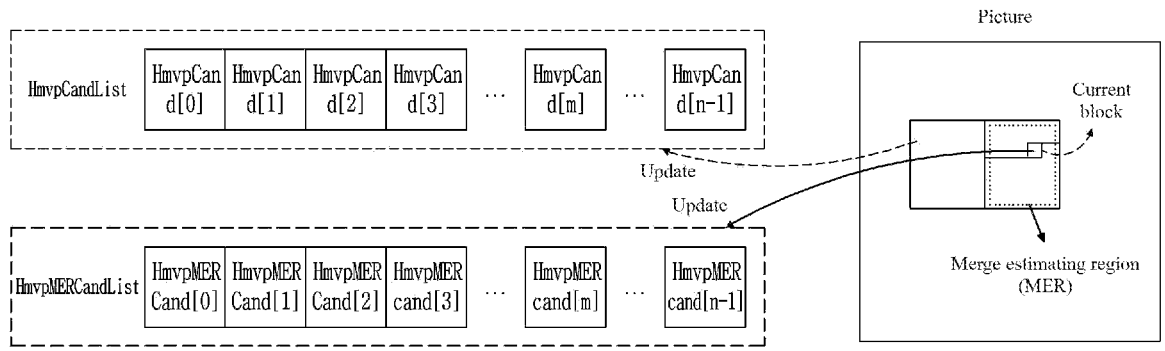
[FIG. 26]
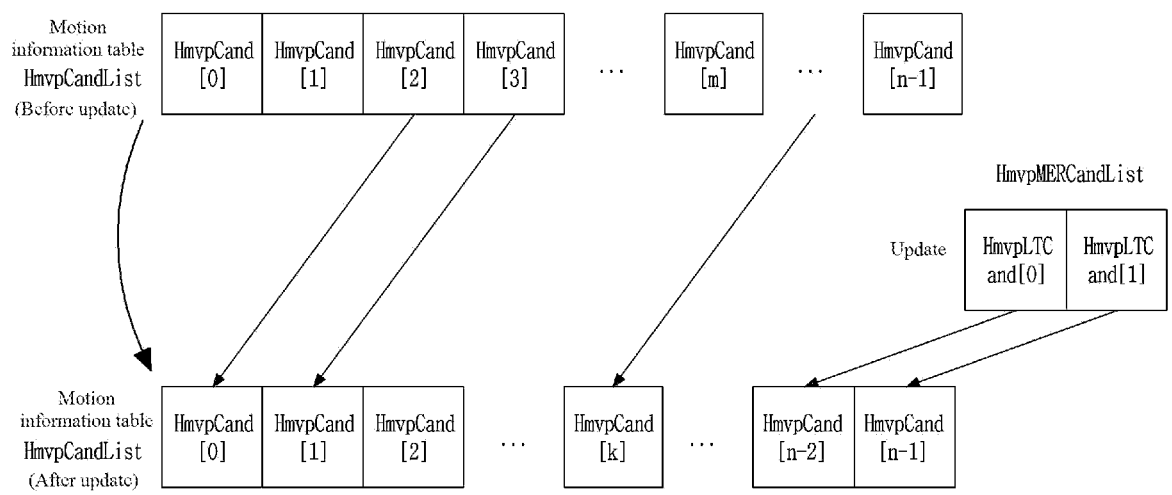
[FIG. 27]
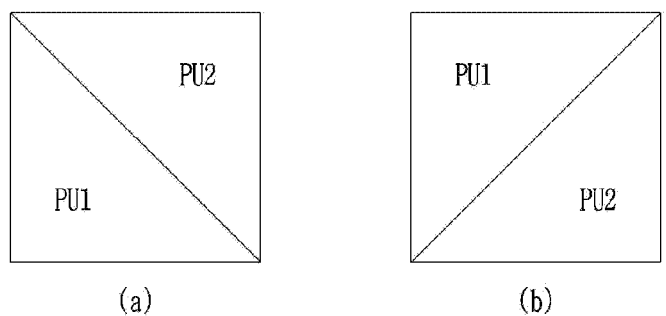

【FIG. 28】
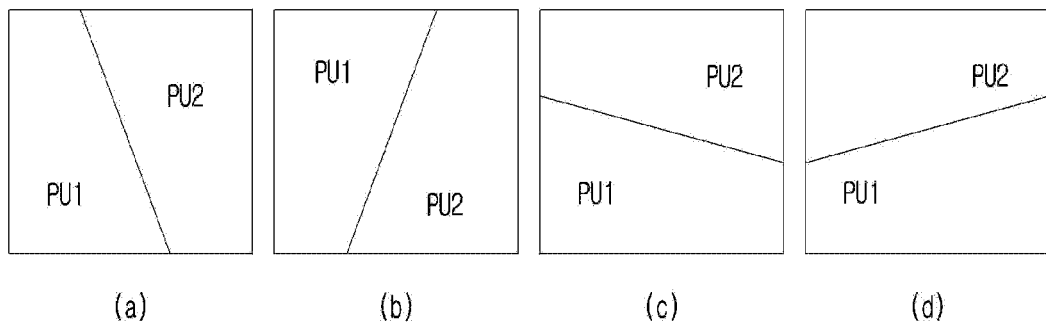
【FIG. 29】
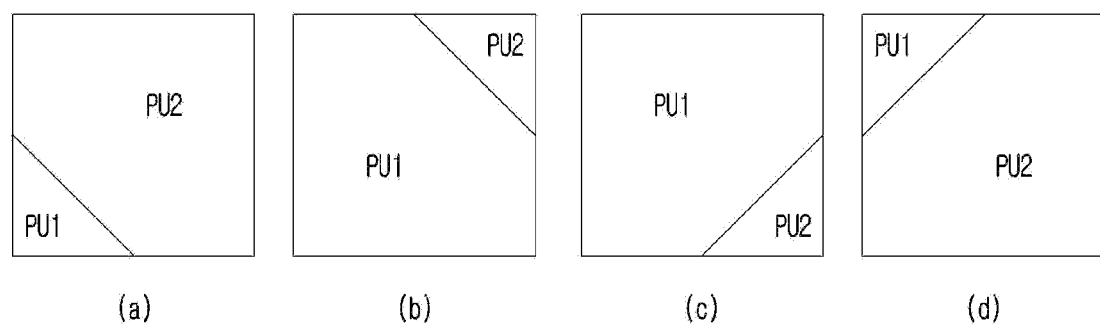
【FIG. 30】
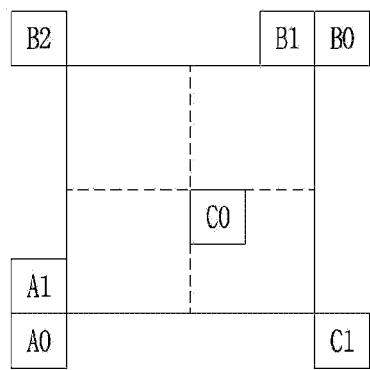

【FIG. 31】
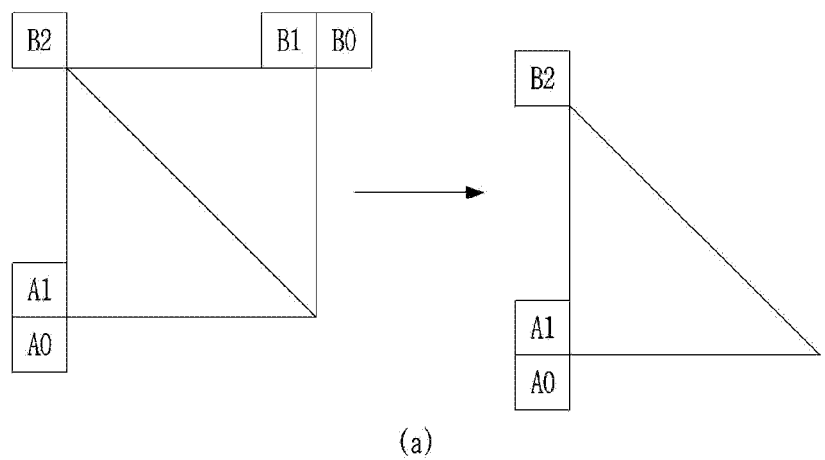
(a)
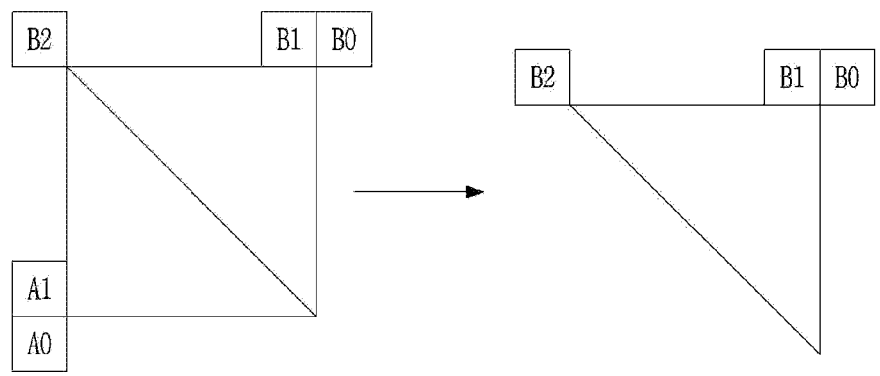
(b)

【FIG. 32】

$P = \frac{4}{8} \times P1 + \frac{4}{8} \times P2$  $P = P2$

| 4 | 2 | 1 | | | | | |
| 6 | 4 | 2 | 1 | | | | |
| 7 | 6 | 4 | 2 | 1 | | | |
| | 7 | 6 | 4 | 2 | 1 | | |
| | | 7 | 6 | 4 | 2 | 1 | |
| | | | 7 | 6 | 4 | 2 | 1 |
| | | | | 7 | 6 | 4 | 2 |
| | | | | | 7 | 6 | 4 |

$P = P1$ (a)

$P = \frac{4}{8} \times P1 + \frac{4}{8} \times P2$  $P = P2$

| 4 | 1 | | |
| 7 | 4 | 1 | |
| | 7 | 4 | 1 |
| | | 7 | 4 |

$P = P1$  $P = \frac{4}{8} \times P1 + \frac{4}{8} \times P2$

| | | | | | 7 | 6 | 4 |
| | | | | 7 | 6 | 4 | 2 |
| | | | 7 | 6 | 4 | 2 | 1 |
| | | 7 | 6 | 4 | 2 | 1 | |
| | 7 | 6 | 4 | 2 | 1 | | |
| 7 | 6 | 4 | 2 | 1 | | | |
| 6 | 4 | 2 | 1 | | | | |
| 4 | 2 | 1 | | | | | |

$P = P2$ (a)

$P = P1$  $P = \frac{4}{8} \times P1 + \frac{4}{8} \times P2$

| | | 7 | 4 |
| | 7 | 4 | 1 |
| 7 | 4 | 1 | |
| 4 | 1 | | |

$P = P2$ (b)

[FIG. 34]
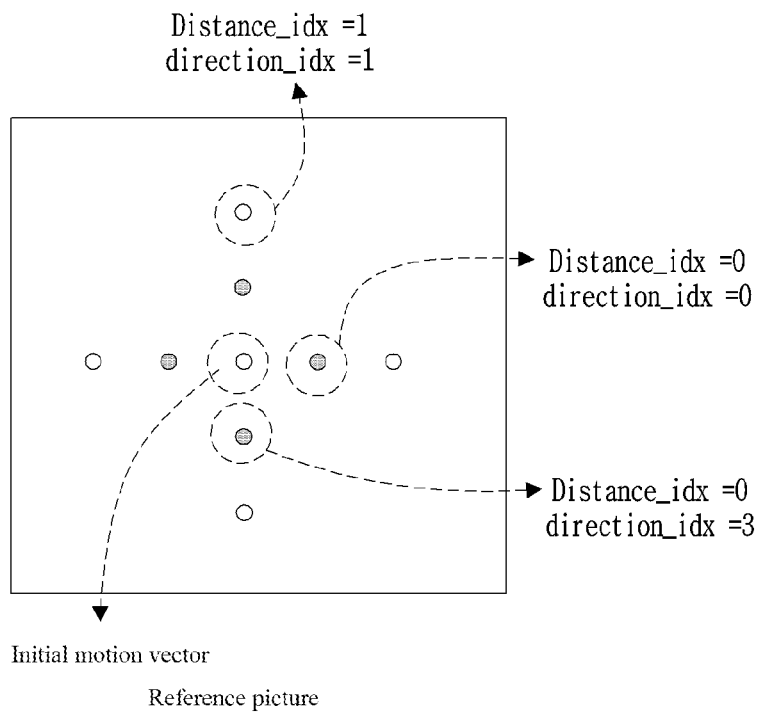
[FIG. 35]
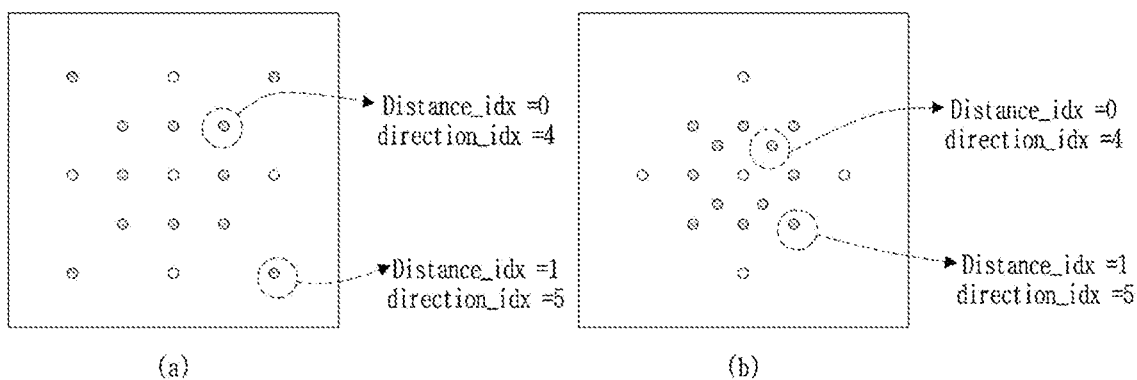

METHOD FOR ENCODING/DECODING VIDEO SIGNAL, AND APPARATUS THEREFOR

CROSS-REFERENCE TO RELATED APPLICATIONS

The present application is a continuation application of U.S. patent application Ser. No. 17/241,950, filed Apr. 27, 2021, which is a continuation of U.S. patent application Ser. No. 17/126,803, filed Dec. 18, 2020, which is a continuation of PCT International Application No. PCT/KR2020/002754, filed on Feb. 26, 2020, which claims foreign priority to Korean Patent Application No. 10-2019-0022767, filed on Feb. 26, 2019, the entire disclosures of each of which are hereby incorporated by reference.

FIELD OF THE DISCLOSURE

The present disclosure relates to a video signal encoding/decoding method and a device therefor.

DESCRIPTION OF THE RELATED ART

As display panels become larger, video service of higher quality is required. The biggest problem with high-definition video service is that an amount of data is greatly increased. In order to solve the above problem, research for improving the video compression rate is being actively conducted. As a representative example, the Joint Collaborative Team on Video Coding (JCT-VC) was formed in 2009 by the Motion Picture Experts Group (MPEG) and the Video Coding Experts Group (VCEG) under the International Telecommunication Union-Telecommunication (ITU-T). The JCT-VC proposed High Efficiency Video Coding (HEVC), a video compression standard that has about twice compression performance of H.264/AVC, and that was approved as standard on Jan. 25, 2013. However, with rapid development of high-definition video services, the performance of HEVC is gradually showing its limitations.

DISCLOSURE

Technical Purpose

A purpose of the present disclosure is to provide a method of deriving a merge candidate by using a motion information table in encoding/decoding a video signal, and a device for performing the method.

A purpose of the present disclosure is to provide a method of updating the motion information of blocks included in a merge processing region in a motion information table in encoding/decoding a video signal, and a device for performing the method.

A purpose of the present disclosure is to provide a method of refining a motion vector derived based on a merge candidate in encoding/decoding a video signal, and a device for performing the method.

A purpose of the present disclosure is to provide a method of effectively determining an inter prediction method which will be applied to a current block in encoding/decoding a video signal, and a device for performing the method.

Technical purposes obtainable from the present disclosure are non-limited to the above-mentioned technical purposes, and other unmentioned technical purposes may be clearly understood from the following description by those having ordinary skill in the technical field to which the present disclosure pertains.

Technical Solution

A video signal decoding method according to the present disclosure may include parsing the first flag representing whether inter prediction based on a merge mode is applied to a current block, parsing the second flag representing whether a regular merge mode or a merge offset encoding mode is applied to the current block when the first flag is true and parsing the third flag representing whether the merge offset encoding mode is applied to the current block when the second flag is true. In this case, when the third flag is true, the merge offset encoding mode may be applied to the current block and when the third flag is false, the regular merge mode may be applied to the current block.

A video signal encoding method according to the present disclosure may include encoding the first flag representing whether inter prediction based on a merge mode is applied to a current block, encoding the second flag representing whether a regular merge mode or a merge offset encoding mode is applied to the current block when the first flag is true and encoding the third flag representing whether the merge offset encoding mode is applied to the current block when the second flag is true. In this case, when the merge offset encoding mode is applied to the current block, the third flag may be set to be true and when the regular merge mode is applied to the current block, the third flag may be set to be false.

A video signal decoding/encoding method according to the present disclosure may further include parsing/encoding the fourth flag representing whether a combined prediction mode is applied to the current block when the second flag is false.

In a video signal decoding/encoding method according to the present disclosure, an encoding method based on prediction unit partitioning may be applied when the fourth flag is false.

In a video signal decoding/encoding method according to the present disclosure, the motion information of the current block may be derived from a merge candidate list of the current block and when the number of merge candidates derived from neighboring blocks of the current block is equal to or less than a threshold value, a motion information candidate included in a motion information table may be added to the merge candidate list as a merge candidate.

In a video signal decoding/encoding method according to the present disclosure, when the current block is included in a merge processing region, the motion information table may not be updated while blocks included in the merge processing region are decoded.

In a video signal decoding/encoding method according to the present disclosure, when the current block is included in a merge processing region, whether the motion information of the current block is updated in the motion information table may be determined based on a position of the current block in the merge processing region.

In a video signal decoding/encoding method according to the present disclosure, when the current block is at a bottom-right position in the merge processing region, it may be determined to update the motion information of the current block in the motion information table.

It is to be understood that the foregoing summarized features are exemplary aspects of the following detailed description of the present disclosure without limiting the scope of the present disclosure.

Technical Effect

According to the present disclosure, inter-prediction efficiency may be improved by deriving a merge candidate using a motion information table.

According to the present disclosure, inter-prediction efficiency may be improved by providing a method of updating the motion information of blocks included in a merge processing region in a motion information table.

According to the present disclosure, inter-prediction efficiency may be improved by refining a motion vector derived based on a merge candidate.

According to the present disclosure, an inter-prediction method which will be applied to a current block may be effectively determined.

Effects obtainable from the present disclosure may be non-limited by the above-mentioned effect, and other unmentioned effects may be clearly understood from the following description by those having ordinary skill in the technical field to which the present disclosure pertains.

BRIEF DESCRIPTION OF THE DRAWINGS

FIG. 1 is a view showing a block diagram of a video encoding device (encoder) according to an embodiment of the present disclosure;

FIG. 2 is a view showing a block diagram of a video decoding device (decoder) according to an embodiment of the present disclosure;

FIG. 3 is a view showing a basic coding tree unit according to an embodiment of the present disclosure;

FIG. 4 is a view showing various partitioning types of a coding block;

FIG. 5 is a view of an example showing an aspect of partitioning a CTU;

FIG. 6 is a flow diagram of an inter prediction method according to an embodiment of the present disclosure;

FIG. 7 is a flow diagram of a process deriving the current block motion information under a merge mode;

FIG. 8 is a diagram of illustrating candidate blocks used to derive a merge candidate;

FIG. 9 is a diagram showing a position of base samples;

FIG. 10 is a diagram illustrating candidate blocks used to derive a merge candidate;

FIG. 11 is a diagram showing an example in which a position of a base sample is changed;

FIG. 12 is a diagram showing an example in which a position of a base sample is changed;

FIG. 13 is a diagram to explain the update aspect of a motion information table;

FIG. 14 is a diagram showing the update aspect of a motion information table;

FIG. 15 is a diagram showing an example in which the index of a pre-saved motion information candidate is renewed;

FIG. 16 is a diagram showing the position of a representative sub-block;

FIG. 17 shows an example in which a motion information table is generated per inter-prediction mode;

FIG. 18 shows an example in which a motion information table is generated per motion vector resolution;

FIG. 19 shows an example in which the motion information of a block to which a merge offset encoding method is applied is stored in a separate motion information table;

FIG. 20 is a diagram showing an example in which a motion information candidate included in a long-term motion information table is added to a merge candidate list;

FIG. 21 is a diagram showing an example in which a redundancy check is performed only for a part of merge candidates;

FIG. 22 is a diagram showing an example in which a redundancy check with a specific merge candidate is omitted;

FIG. 23 is a diagram showing an example in which a candidate block included in the same merge processing region as a current block is set to be unavailable as a merge candidate;

FIG. 24 is a diagram showing an example deriving a merge candidate for a current block when a current block is included in a merge processing region;

FIG. 25 is a diagram showing a temporary motion information table;

FIG. 26 is a diagram showing an example in which a motion information table and a temporary motion information table are unified;

FIG. 27 is a diagram showing an example in which a coding block is partitioned into a plurality of prediction units by using a diagonal line;

FIG. 28 is a diagram showing an example in which a coding block is partitioned into two prediction units;

FIG. 29 shows examples in which a coding block is partitioned into a plurality of different-sized prediction blocks;

FIG. 30 is a diagram showing neighboring blocks used to derive a partitioning mode merge candidate;

FIG. 31 is a diagram for explaining an example in which the availability of a neighboring block is determined per prediction unit;

FIGS. 32 and 33 are diagrams showing an example in which a prediction sample is derived based on a weighted sum operation of the first prediction sample and the second prediction sample;

FIG. 34 is a diagram showing an offset vector according to a value of distance_idx showing a magnitude of an offset vector and direction_idx showing a direction of an offset vector;

FIG. 35 is a diagram showing an offset vector according to a value of distance_idx showing a size of an offset vector and direction_idx showing a direction of an offset vector.

DETAILED DESCRIPTION OF THE DISCLOSURE

Hereinafter, embodiments of the present disclosure will be described in detail with reference to the accompanying drawings.

Image encoding and decoding is performed on a basis of a block. In an example, for a coding block, a transform block, or a prediction block, encoding/decoding processes such as transform, quantization, prediction, in-loop filtering, reconstruction, etc. may be performed.

Hereinafter, an encoding/decoding target block is referred to as a "current block". In an example, a current block may represent a coding block, a transform block, or a prediction block according to a current process of encoding/decoding.

In addition, the term "unit" used in the present specification represents a basis unit for performing a specific encoding/decoding process, and a "block" may be understood to represent a sample array having a predetermined size. Unless otherwise stated, "block" and "unit" may be used interchangeably. In an example, in examples described later, a coding block and a coding unit may be understood to have the same meaning as each other.

FIG. 1 is view showing a block diagram of an image encoding apparatus (encoder) according to an embodiment of the present disclosure.

Referring to FIG. 1, an image encoding apparatus 100 may include a picture partitioning unit 110, prediction units 120 and 125, a transform unit 130, a quantization unit 135, a rearrangement unit 160, an entropy encoding unit 165, a dequantization unit 140, an inverse-transform unit 145, a filter unit 150, and a memory 155.

Components described in FIG. 1 are independently illustrated in order to show different characteristic functions in an image encoding apparatus, and the figure does not mean that each component is constituted by separated hardware or one software unit. That is, each component is just enumerated for convenience of explanation, at least two components of respective components may constitute one component or one component may be partitioned into a plurality of components which may perform their functions. Even an embodiment of integrating respective components and embodiment of dividing a component are also included in the scope of the present disclosure unless they are departing from the spirit of the present disclosure.

Further, some components are not requisite components that perform essential functions of the present disclosure but are optional components for just improving performance. The present disclosure may be implemented with the requisite component for implementing the spirit of the present disclosure other than the component used to just improve the performance and a structure including only the requisite component other than the optional component used to just improve the performance is also included in the scope of the present disclosure.

The picture partitioning unit 110 may partition an input picture into at least one processing unit. In this connection, the processing unit may be a prediction unit (PU), a transform unit (TU), or a coding unit (CU). In the picture partitioning unit 110, a single picture may be partitioned into combinations of a plurality of coding units, prediction units, and transform units, and the picture may be encoded by selecting a combination of the coding units, the prediction units, and the transform units according to a predetermined condition (for example, cost function).

For example, a single picture may be partitioned into a plurality of coding units. In order to partition a picture into coding units, a recursive tree structure such as a quad-tree structure may be used, and a coding unit that is originated from a root such as a single image or largest coding unit may be partitioned into other coding units and may have child nodes as many as the partitioned coding units. A coding unit that is no longer partitioned according to certain restrictions becomes a leaf node. Namely, when it is assumed that only square partitioning is available for a single coding unit, a single coding unit may be partitioned into at most four other coding units.

Hereinafter, in the embodiment of the present disclosure, a coding unit may be used as a unit for encoding or may be used as a unit for decoding.

A prediction unit may be obtained by partitioning a single coding unit into at least one square or rectangle having the same size, or a single coding unit may be partitioned into prediction units in such a manner that one prediction unit may be different from another prediction unit in a shape and/or size.

In generation of a prediction unit based on a coding block to which intra-prediction is being performed, when the coding unit is not the smallest coding unit, intra-prediction may be performed without performing partitioning into a plurality of N×N prediction units.

The prediction units 120 and 125 may include an inter-prediction unit 120 performing inter-prediction and an intra prediction unit 125 performing intra-prediction. Whether to perform inter-prediction or intra-prediction on a prediction unit may be determined, and detailed information (for example, an intra-prediction mode, a motion vector, a reference picture, etc.) according to each prediction method may be determined. In this connection, a processing unit on which prediction is performed may differ with a processing unit for which a prediction method, and detail thereof are determined. For example, a prediction method, a prediction mode, etc. may be determined on the basis of a prediction unit, and prediction may be performed on the basis of a transform unit. A residual value (residual block) between the generated prediction block and an original block may be input to the transform unit 130. In addition, prediction mode information used for prediction, motion vector information, etc. may be encoded using a residual value by the entropy encoding unit 165 and may be transmitted to the decoder. When a specific encoding mode is used, an original block is encoded as it is and transmitted to a decoding unit without generating a prediction block through the prediction unit 120 or 125.

The inter-prediction unit 120 may predict a prediction unit on the basis of information on at least one of a previous picture and a subsequent picture of a current picture, or in some cases, may predict a prediction unit on the basis of information on some encoded regions in the current picture. The inter-prediction unit 120 may include a reference picture interpolation unit, a motion prediction unit, and a motion compensation unit.

The reference picture interpolation unit may receive reference picture information from the memory 155, and generate pixel information of a pixel at an integer or less from the reference picture. In case of a luma pixel, an 8-tap DCT-based interpolation filter having different coefficients may be used so as to generate pixel information on a pixel at an integer or less for a ¼ pixel unit. In case of a chroma signal, a 4-tap DCT-based interpolation filter having different filter coefficients may be used so as to generate pixel information on a pixel at an integer or less for a ⅛ pixel unit.

The motion prediction unit may perform motion prediction based on a reference picture interpolated by the reference picture interpolation unit. As methods for calculating a motion vector, various methods, such as a full search-based block matching algorithm (FBMA), a three step search (TSS) algorithm, a new three-step search (NTS) algorithm, etc. may be used. A motion vector may have a motion vector value in a unit of ½ or ¼ pixel on the basis of the interpolated pixel. The motion prediction unit may predict a current prediction unit by varying a motion prediction method. As motion prediction methods, various methods, such as a skip method, a merge method, an advanced motion vector prediction (AMVP) method, an intra block copy method, etc. may be used.

The intra-prediction unit 125 may generate a prediction unit on the basis of information on a reference pixel around a current block, which is pixel information in a current picture. When a neighboring block of a current prediction unit is a block for which inter-prediction is performed, and thus a reference pixel is a pixel for which inter-prediction is performed, a reference pixel included in the block for which inter-prediction is performed may be replaced by information on a reference pixel of a neighboring block for which intra-prediction is performed. In other words, when a reference pixel is unavailable, at least one reference pixel of available reference pixels may be used in place of unavailable reference pixel information.

A prediction mode in intra-prediction may include a directional prediction mode using reference pixel information according to a prediction direction and a non-directional mode not using directional information when performing prediction. A mode for predicting luma information may be different from a mode for predicting chroma information. In order to predict the chroma information, information on an intra-prediction mode used for predicting the luma information or information on a predicted luma signal may be used.

In performing intra-prediction, when a prediction unit is identical in a size with a transform unit, intra-prediction may be performed on the prediction unit on the basis of pixels positioned at the left, the top-left, and the top of the prediction unit. However, in performing intra-prediction, when a prediction unit is different in a size with a transform unit, intra-prediction may be performed by using a reference pixel based on the transform unit. In addition, intra-prediction using N×N partitioning may be only used for the smallest coding unit.

In an intra-prediction method, a prediction block may be generated after applying an adaptive intra smoothing (AIS) filter to a reference pixel according to a prediction mode. A type of AIS filter applied to a reference pixel may vary. In order to perform an intra-prediction method, an intra prediction mode for a current prediction unit may be predicted from an intra-prediction mode of a prediction unit present around the current prediction unit. In predicting a prediction mode for a current prediction unit by using mode information predicted from a neighboring prediction unit, when an intra prediction mode for the current prediction unit is identical to an intra prediction mode of the neighboring prediction unit, information indicating that the current prediction unit and the neighboring prediction unit have the same prediction mode may be transmitted by using predetermined flag information. When a prediction mode for the current prediction unit is different from prediction modes of the neighboring prediction units, entropy encoding may be performed to encode information on a prediction mode for a current block.

In addition, a residual block may be generated which includes information on a residual value that is a difference value between a prediction unit for which prediction is performed on by the prediction unit 120 or 125, and an original block of the prediction unit. The generated residual block may be input to the transform unit 130.

The transform unit 130 may perform transform on a residual block, which includes information on a residual value between an original block and a prediction unit generated by the prediction unit 120 or 125, by using a transform method such as discrete cosine transform (DCT) or discrete sine transform (DST). In this connection, a DCT transform core includes at least one of DCT2 or DCT8 and a DST transform core includes DST7. Whether to apply DCT, or DST so as to perform transform on a residual block may be determined on the basis of information on an intra-prediction mode of a prediction unit which is used to generate the residual block. It is possible to skip a transform for a residual block. A flag indicating whether or not to skip a transform for a residual block may be encoded. A transform skip may be allowed for a residual block whose a size is smaller than or equal to a threshold value, a residual block of a luma component, or a residual block of a chroma component under 4:4:4 format.

The quantization unit 135 may perform quantization on values transformed into a frequency domain by the transform unit 130. A quantization coefficient may vary according to a block or importance of an image. Values calculated in the quantization unit 135 may be provided to the dequantization unit 140 and the rearrangement unit 160.

The rearrangement unit 160 may perform rearrangement on coefficient values with respect to quantized residual values.

The rearrangement unit 160 may change coefficients in the form of a two-dimensional block into coefficients in the form of a one-dimensional vector through a coefficient scanning method. For example, the rearrangement unit 160 may scan from a DC coefficient to a coefficient in a high frequency domain by using a zigzag scanning method so as to change the coefficients into the form of a one-dimensional vector. According to a size and an intra prediction mode of a transform unit, rather than zigzag scanning, vertical directional scanning where coefficients in the form of a two-dimensional block are scanned in a column direction, or horizontal directional scanning where coefficients in the form of two-dimensional block are scanned in a row direction may be used. In other words, which scanning method among zigzag scanning, vertical directional scanning, and horizontal directional scanning is used may be determined according to a size and an intra prediction mode of a transform unit.

The entropy encoding unit 165 may perform entropy encoding on the basis of values calculated by the rearrangement unit 160. Entropy encoding may use various encoding methods, for example, exponential Golomb coding, context-adaptive variable length coding (CAVLC), or context-adaptive binary arithmetic coding (CABAL).

The entropy encoding unit 165 may encode various types of information, such as information on a residual value coefficient and information on a block type of a coding unit, information on a prediction mode, information on a partitioning unit, information on a prediction unit, information on a partitioning unit, information on a prediction unit and information on a transmission unit, information on a motion vector, information on a reference frame, information on a block interpolation, filtering information, etc. obtained from the rearrangement unit 160 and the prediction units 120 and 125.

The entropy encoding unit 165 may entropy encode coefficients of a coding unit input from the rearrangement unit 160.

The dequantization unit 140 may perform dequantization on values quantized in the quantization unit 135, and the inverse-transform unit 145 may perform inverse-transform on values transformed in the transform unit 130. A residual value generated by the dequantization unit 140 and the inverse-transform unit 145 may be added with a prediction unit predicted by a motion estimation unit, a motion compensation unit, or the intra-prediction unit which are included in the prediction units 120 and 125 so as to generate a reconstructed block.

The filter unit 150 may include at least one of a deblocking filter, an offset correction unit, and an adaptive loop filter (ALF).

The deblocking filter may remove block distortion that occurs due to boundaries between blocks in a reconstructed picture. In order to determine whether or not to perform deblocking, whether or not to apply a deblocking filter to a current block may be determined on the basis of pixels included in several rows and columns included in a block. When a deblocking filter is applied to a block, a strong filter or a weak filter is applied according to required deblocking filtering strength. In addition, in applying a deblocking filter, when performing horizontal directional filtering and vertical directional filtering, horizontal directional filtering and vertical directional filtering may be configured to be processed in parallel.

The offset correction unit may correct an original image by an offset in a unit of a pixel with respect to an image for which deblocking is performed. In order to perform offset correction on a specific picture, a method of applying a offset to a region which is determined after partitioning pixels of the image into the predetermined number of regions, or a method of applying an offset according to edge information of each pixel may be used.

Adaptive loop filtering (ALF) may be performed on the basis of a value obtained by comparing a filtered reconstructed image with an original image. Pixels included in an image may be partitioned into predetermined groups, a filter to be applied to each of the groups may be determined, and filtering may be individually performed on each group. Information on whether or not to apply ALF and may be transmitted for each coding unit (CU) for a luma signal, and a shape and a filter coefficient of an ALF filter to be applied may vary on the basis of each block. Alternatively, an ALF filter having the same shape (fixed shape) may be applied regardless of a feature of a block to which the filter will be applied.

In the memory 155, a reconstructed block or picture calculated through the filter unit 150 may be stored. The stored reconstructed block or picture may be provided to the prediction unit 120 or 125 when performing inter-prediction.

FIG. 2 is view showing a block diagram of an image decoding apparatus (decoder) according to an embodiment of the present disclosure.

Referring to FIG. 2, an image decoding apparatus 200 may include: an entropy decoding unit 210, a rearrangement unit 215, a dequantization unit 220, an inverse-transform unit 225, prediction units 230 and 235, a filter unit 240, and a memory 245.

When an image bitstream is input from the encoder, the input bitstream may be decoded according to an inverse process of the image encoding apparatus.

The entropy decoding unit 210 may perform entropy decoding according to the inverse process of the entropy encoding by the entropy encoding unit of the image encoder. For example, in association with the methods performed by the image encoder apparatus, various methods, such as exponential Golomb coding, context-adaptive variable length coding (CAVLC), or context-adaptive binary arithmetic coding (CABAC) may be applied.

The entropy decoding unit 210 may decode information on intra-prediction and inter-prediction performed by the encoder.

The rearrangement unit 215 may perform rearrangement on the bitstream entropy decoded by the entropy decoding unit 210 on the basis of the rearrangement method used in the encoder. Coefficients represented in the form of a one-dimensional vector may be reconstructed and rearranged into coefficients in the form of a two-dimensional block. The rearrangement unit 215 may perform rearrangement through a method of receiving information related to coefficient scanning performed in the encoder and of inversely scanning on the basis of the scanning order performed in the encoder.

The dequantization unit 220 may perform dequantization on the basis of a quantization parameter received from the encoder and coefficient values of the rearranged block.

The inverse-transform unit 225 may perform, an inverse transform, that is inverse DCT or inverse DST, against to a transform, that is DCT or DST, performed on the quantization result by the transform unit in the image encoder. In this connection, a DCT transform core may include at least one of DCT2 or DCT8, and a DST transform core may include DST7. Alternatively, when the transform is skipped in the image encoder, the inverse-transform also not be performed in the inverse-transform unit 225. Inverse transform may be performed on the basis of a transmission unit determined by the image encoder. The inverse transform unit 225 of the image decoder may selectively perform a transform method (for example, DCT, or DST) according to multiple pieces of information, such as a prediction method, a size of a current block, a prediction direction, etc.

The prediction unit 230 or 235 may generate a prediction block on the basis of information related to a prediction block received from the entropy decoding unit 210 and information on a previously decoded block or picture received from the memory 245.

As described above, as the operation of the image encoder, in performing intra-prediction, when a prediction unit is identical in size with a transform unit, intra-prediction may be performed on the prediction unit on the basis of pixels positioned at the left, the top-left, and the top of the prediction unit. However, in performing intra-prediction, when a prediction unit is different in size with a transform unit, intra-prediction may be performed by using a reference pixel based on the transform unit. In addition, intra-prediction using N×N partitioning may be only used for the smallest coding unit.

The prediction units 230 and 235 may include a PU determination module, an inter-prediction unit, and an intra-prediction unit. The PU determination unit may receive various types of information, such as information on a prediction unit, information on a prediction mode of an intra-prediction method, information on a motion prediction of an inter-prediction method, etc. which are input from the entropy decoding unit 210, divide a prediction unit in a current coding unit, and determine whether inter-prediction or intra-prediction is performed on the prediction unit. By using information required in inter-prediction of a current prediction unit received from the image encoder, the inter-prediction unit 230 may perform inter-prediction on the current prediction unit on the basis of information on at least one of a previous picture and a subsequent picture of a current picture including the current prediction unit. Alternatively, inter-prediction may be performed on the basis of information on some pre-reconstructed regions in a current picture including the current prediction unit.

In order to perform inter-prediction, which method among a skip mode, a merge mode, an AMVP mode, or an intra block copy mode is used as a motion prediction method for a prediction unit included in a coding unit may be determined on the basis of the coding unit.

The intra prediction unit 235 may generate a prediction block on the basis of information on a pixel within a current picture. When a prediction unit is a prediction unit for which intra-prediction has been performed, intra-prediction may be performed on the basis of information on an intra-prediction mode of a prediction unit received from the image encoder. The intra prediction unit 235 may include an adaptive intra smoothing (AIS) filter, a reference pixel interpolation module, or a DC filter. The AIS filter may perform filtering on a reference pixel of a current block, and whether to apply the filter may be determined according to a prediction mode for a current prediction unit. A prediction mode of the prediction unit and information on an AIS filter which are received from the image encoder may be used when performing AIS filtering on a reference pixel of a current block. When a prediction mode for the current block is a mode to which AIS filtering is not applied, the AIS filter may not be applied.

When a prediction mode of a prediction unit is a prediction mode for which intra-prediction is performed on the basis of a pixel value obtained by interpolating reference pixels, the reference pixel interpolation unit may interpolate the reference pixels so as to generate a reference pixel having a unit of an integer or less. When a prediction mode for a current prediction unit is a prediction mode where a prediction block is generated without interpolating reference pixels, the reference pixels may not be interpolated. The DC filter may generate a prediction block through filtering when a prediction mode for a current block is a DC mode.

A reconstructed block or picture may be provided to the filter unit 240. The filter unit 240 may include a deblocking filter, an offset correction module, and an ALF.

Information on whether or not a deblocking filter has been applied to a corresponding block or picture and information on whether a strong filter or a weak filter is applied when the deblocking filter is applied may be received from the image encoder. The deblocking filter of the image decoder may receive information on a deblocking filter from the image encoder, and the image decoder may perform deblocking filtering on a corresponding block.

The offset correction unit may perform offset correction on a reconstructed image on the basis of a type of offset correction, information on an offset value, etc. applied to an image when performing encoding.

The ALF may be applied to a coding unit on the basis of information on whether or not to apply ALF, information on an ALF coefficient, etc. received from the encoder. The above ALF information may be provided by being included in a particular parameter set.

In the memory 245, a reconstructed picture or block may be stored so as to be used as a reference picture or reference block, and the reconstructed picture may be provided to an output unit.

FIG. 3 is a view showing a basic coding tree unit according to an embodiment of the present disclosure.

The largest coding block may be defined as a coding tree block. A single picture may be partitioned into a plurality of coding tree units (CTU). A CTU may be a coding unit of the largest size, and may be referred to as the largest coding unit (LCU). FIG. 3 is a view showing an example where a single picture is partitioned into a plurality of CTUs.

A size of a CTU may be defined in a picture level or sequence level. For the same, information representing a size of a CTU may be signaled through a picture parameter set or sequence parameter set.

In an example, a size of a CTU for the entire picture within a sequence may be set to 128×128. Alternatively, any one of 128×128 or 256×256 may be determined as a size of a CTU in a picture level. In an example, a CTU may be set to have a size of 128×128 in a first picture, and a size of 256×256 in a second picture.

Coding blocks may be generated by partitioning a CTU. A coding block represents a basic unit for performing encoding/decoding. In an example, prediction or transform may be performed for each coding block, or a prediction encoding mode may be determined for each coding block. In this connection, the prediction encoding mode represents a method of generating a prediction image. In an example, a prediction encoding mode may include intra-prediction, inter-prediction, current picture referencing (CPR), intra block copy (IBC) or combined prediction. For a coding block, a prediction block of the coding block may be generated by using a prediction encoding mode of at least one of intra-prediction, inter-prediction, current picture referencing, or combined prediction.

Information representing a prediction encoding mode for a current block may be signaled in a bitstream. In an example, the information may be a 1-bit flag representing whether a prediction encoding mode is an intra mode or an inter mode. When a prediction encoding mode for a current block is determined as an inter mode, current picture referencing or combined prediction may be available.

Current picture referencing is setting a current picture as a reference picture and obtaining a prediction block of a current block from a region that has been already encoded/decoded within a current picture. In this connection, the current picture means a picture including the current block. Information representing whether or not current picture referencing is applied to a current block may be signaled in a bitstream. In an example, the information may be a 1-bit flag. When the flag is TRUE, a prediction encoding mode for a current block may be determined as current picture referencing, and when the flag is FALSE, a prediction encoding mode for a current block may be determined as inter-prediction.

Alternatively, a prediction encoding mode for a current block may be determined on the basis of a reference picture index. In an example, when a reference picture index indicates a current picture, a prediction encoding mode for a current block may be determined as current picture referencing. When a reference picture index indicates a picture other than a current picture, a prediction encoding mode for a current block may be determined as inter-prediction. In other words, current picture referencing is a prediction method using information on a region that has been already encoded/decoded within a current picture, and inter-prediction is a prediction method using information on another picture that has been already encoded/decoded.

Combined prediction represents a combined encoding mode combining at least two of intra-prediction, inter-prediction, and current picture referencing. In an example, when combined prediction is applied, a first prediction block may be generated on the basis of any one of intra-prediction, inter-prediction or current picture referencing, and a second prediction block may be generated on the basis of another. When a first prediction block and a second prediction block are generated, a final prediction block may be generated by calculating an average or weighted sum of the first prediction block and the second prediction block. Information representing whether or not to apply combined prediction to a current block may be signaled in a bitstream. The information may be a 1-bit flag.

FIG. 4 is a view showing various partitioning types a coding block.

A coding block may be partitioned into a plurality of coding blocks on the basis of quad-tree partitioning, binary-tree partitioning or ternary tree partitioning. The partitioned coding block may be partitioned again into a plurality of coding blocks on the basis of quad-tree partitioning, binary-tree partitioning or ternary tree partitioning.

Quad-tree partitioning represents a method of partitioning a current block into four blocks. As a result of quad-tree partitioning, a current block may be partitioned into four square partitions (refer to "SPLIT_QT" of FIG. 4 (*a*)).

Binary-tree partitioning represents a method of partitioning a current block into two blocks. Partitioning a current block into two blocks along a vertical direction (that is, using a vertical line across the current block) may be referred to vertical directional binary-tree partitioning, and partitioning a current block into two blocks along a horizontal direction (that is, using a horizontal line across the current block) may be referred to as horizontal directional binary-tree partitioning. As a result of binary-tree partitioning, a current block may be partitioned into two non-square partitions. "SPLIT_BT_VER" of FIG. 4 (b) is a view showing a result of vertical directional binary-tree partitioning, and "SPLIT_BT_HOR" of FIG. 4 (c) is a view showing a result of horizontal directional binary-tree partitioning.

Ternary-tree partitioning represents a method of partitioning a current block into three blocks. Partitioning a current block into three blocks along a vertical direction (that is, using two vertical lines across the current block) may be referred to vertical directional ternary-tree partitioning, and partitioning a current block into three blocks along a horizontal direction (that is, using two horizontal lines across the current block) may be referred to as horizontal directional ternary-tree partitioning. As a result of ternary-tree partitioning, a current block may be partitioned into three non-square partitions. In this connection, a width/height of a partition positioned at the center of a current block may be twice than a width/height of other partitions. "SPLIT_TT_VER" of FIG. 4 (d) is a view showing a result of vertical directional ternary-tree partitioning, and "SPLIT_TT_HOR" of FIG. 4 (e) is a view showing a result of horizontal directional ternary-tree partitioning.

The number of partitioning times of a CTU may be defined as a partitioning depth. The maximum partitioning depth of a CTU may be determined in a sequence or picture level. Accordingly, the maximum partitioning depth of a CTU may vary on the basis of a sequence or picture.

Alternatively, the maximum partitioning depth may be independently determined for each partitioning method. In an example, the maximum partitioning depth where quad-tree partitioning is allowed may differ from the maximum partitioning depth where binary-tree partitioning and/or ternary-tree partitioning is allowed.

The encoder may signal information representing at least one of a partitioning type and a partitioning depth of a current block in a bitstream. The decoder may determine a partitioning type and a partitioning depth of a CTU on the basis of the information obtained by parsing a bitstream.

FIG. 5 is a view of an example showing an aspect of partitioning a CTU.

Partitioning a coding block by using quad-tree partitioning, binary-tree partitioning and/or ternary-tree partitioning may be referred to as multi-tree partitioning.

Coding blocks generated by partitioning a coding block by applying multi-tree partitioning may be referred to child coding blocks. When a partitioning depth of a coding block is k, a partitioning depth of child coding blocks is set to k+1.

To the contrary, for coding blocks having a partitioning depth of k+1, a coding block having a partitioning depth of k may be referred to as a parent coding block.

A partitioning type of a current coding block may be determined on the basis of at least one of a partitioning type of a parent coding block and a partitioning type of a neighboring coding block. In this connection, the neighboring coding block may be a block adjacent to a current coding block, and include at least one of an top neighboring block, a left neighboring block, or a neighboring block adjacent to the top-left corner of the current coding block. In this connection, the partitioning type may include whether or not to apply quad-tree partitioning, whether or not to apply binary-tree partitioning, a direction of binary-tree partitioning, whether or not to apply ternary-tree partitioning, or a direction of ternary-tree partitioning.

In order to determine a partitioning type of a coding block, information representing whether or not a coding block is partitioned may be signaled in a bitstream. The information is a 1-bit flag of "split_cu_flag", and when the flag is TRUE, it may represent that a coding block is partitioned by a multi tree partitioning method.

When split_cu_flag is TRUE, information representing whether or not a coding block is partitioned by quad-tree partitioning may be signaled in a bitstream. The information is a 1-bit flag of split_qt_flag, and when the flag is TRUE, a coding block may be partitioned into four blocks.

In an example, in an example shown in FIG. 5, a CTU is partitioned by quad-tree partitioning, and thus four coding blocks having a partitioning depth of 1 are generated. In addition, it is shown that quad-tree partitioning is applied again to the first coding block and the fourth coding block among four coding blocks generated by quad-tree partitioning. As a result, four coding blocks having a partitioning depth of 2 may be generated.

In addition, by applying again quad-tree partitioning to a coding block having a partitioning depth of 2, a coding block having a partitioning depth of 3 may be generated.

When quad-tree partitioning is not applied to a coding block, whether to perform binary-tree partitioning or ternary-tree partitioning for the coding block may be determined according to at least one of a size of the coding block, whether or not the coding block is positioned at a picture boundary, the maximum partitioning depth, or a partitioning type of a neighboring block. When it is determined to perform binary-tree partitioning or ternary-tree partitioning for the coding block, information representing a partitioning direction may be signaled in a bitstream. The information may be a 1-bit flag of mtt_split_cu_vertical_flag. Whether a partitioning direction is a vertical direction or a horizontal direction may be determined on the basis of the flag. Additionally, information representing which one of binary-tree partitioning or ternary-tree partitioning is applied to the coding block may be signaled in a bitstream. The information may be a 1-bit flag of mtt_split_cu_binary_flag. Whether binary-tree partitioning is applied to the coding block or ternary-tree partitioning is applied to the coding block may be determined on the basis of the flag.

In an example, in an example shown in FIG. 5, vertical directional binary-tree partitioning is applied to a coding block having a partitioning depth of 1, vertical directional ternary-tree partitioning is applied to a left coding block among coding blocks generated by the partitioning, and vertical directional binary-tree partitioning is applied to a right coding block.

Inter-prediction is a prediction encoding mode predicting a current block by using information on a previous picture. In an example, a block (hereinafter, collocated block) at the same position with a current block within a previous picture may be set as a prediction block of the current block. Hereinafter, a prediction block generated on the basis of a collocated block of the current block may be referred to as a collocated prediction block.

To the contrary, when an object present in a previous picture has moved to another position in a current picture, a current block may be effectively predicted by using motions of the object. For example, when a motion direction and a size of the object is determined by comparing a previous picture with a current picture, a prediction block (or prediction image) of the current block may be generated according to motion information of the objects. Hereinafter, a prediction block generated by using motion information may be referred to as a motion prediction block.

A residual block may be generated by subtracting a prediction block from a current block. In this connection, in case where an object moves, energy of a residual block may be reduced by using a motion prediction block rather than using a collocated prediction block, and thus compression performance of the residual block may be improved.

As above, generating a prediction block by using motion information may be referred to as motion estimation prediction. In the most inter-prediction, a prediction block may be generated on the basis of motion compensation prediction.

Motion information may include at least one of a motion vector, a reference picture index, a prediction direction, and a bidirectional weighting factor index. A motion vector represents a motion direction of an object and a magnitude. A reference picture index specifies a reference picture of a current block among reference pictures included in a reference picture list. A prediction direction indicates any one of uni-directional L0 prediction, uni-directional L1 prediction, or bi-directional prediction (L0 prediction and L1 prediction). At least one of L0 directional motion information and L1 directional motion information may be used according to a prediction direction of a current block. A bidirectional weighting factor index specifies a weighting factor applied to an L0 prediction block and a weighting factor applied to an L1 prediction block.

FIG. 6 is a flow diagram of an inter-prediction method according to the embodiment of the present disclosure.

In reference to FIG. 6, an inter-prediction method includes determining an inter-prediction mode for a current block S601, obtaining motion information of the current block according to the determined inter-prediction mode S602, and performing motion compensation prediction for a current block on the basis of the obtained motion information S603.

In this connection, the inter-prediction mode may represent various methods for determining motion information of a current block, and include an inter-prediction mode using translation motion information, an inter-prediction mode using affine motion information. In an example, an inter-prediction mode using translation motion information may include a merge mode and a motion vector prediction mode, and an inter-prediction mode using affine motion information may include an affine merge mode and an affine motion vector prediction mode. Motion information on a current block may be determined on the basis of a neighboring block neighboring the current block or information obtained by parsing a bitstream.

Motion information of a current block may be derived from motion information of another block. In this connection, another block may be a block encoded/decoded by inter prediction previous to the current block. Setting motion information of a current block to be the same as motion information of another block may be defined as a merge mode. Also, setting a motion vector of another block as a prediction value of a motion vector of the current block may be defined as a motion vector prediction mode.

FIG. 7 is a flow diagram of a process deriving the motion information of a current block under a merge mode.

The merge candidate of a current block may be derived S701. The merge candidate of a current block may be derived from a block encoded/decoded by inter-prediction prior to a current block.

FIG. 8 is a diagram illustrating candidate blocks used to derive a merge candidate.

The candidate blocks may include at least one of neighboring blocks including a sample adjacent to a current block or non-neighboring blocks including a sample non-adjacent to a current block. Hereinafter, samples determining candidate blocks are defined as base samples. In addition, a base sample adjacent to a current block is referred to as a neighboring base sample and a base sample non-adjacent to a current block is referred to as a non-neighboring base sample.

A neighboring base sample may be included in a neighboring column of a leftmost column of a current block or a neighboring row of an uppermost row of a current block. In an example, when the coordinate of a left-top sample of a current block is (0,0), at least one of a block including a base sample at a position of (−1, H−1), (W−1, −1), (W, −1), (−1, H) or (−1, −1) may be used as a candidate block. In reference to a diagram, the neighboring blocks of index 0 to 4 may be used as candidate blocks.

A non-neighboring base sample represents a sample that at least one of a x-axis distance or a y-axis distance with a base sample adjacent to a current block has a predefined value. In an example, at least one of a block including a base sample that a x-axis distance with a left base sample is a predefined value, a block including a non-neighboring sample that a y-axis distance with a top base sample is a predefined value or a block including a non-neighboring sample that a x-axis distance and a y-axis distance with a left-top base sample are a predefined value may be used as a candidate block. A predefined value may be a natural number such as 4, 8, 12, 16, etc. In reference to a diagram, at least one of blocks in an index 5 to 26 may be used as a candidate block.

A sample not positioned on the same vertical, horizontal or diagonal line as a neighboring base sample may be set as a non-neighboring base sample.

FIG. 9 is a diagram showing a position of base samples.

As in an example shown in FIG. 9, an X-coordinate of top non-neighboring base samples may be set to be different from that of top neighboring base samples. In an example, when a position of a top neighboring base sample is (W−1, −1), a position of a top non-neighboring base sample apart from a top neighboring base sample by N on a y-axis may be set to be ((W/2)−1, −1−N), and a position of a top non-neighboring base sample apart from a top neighboring base sample by 2N on a y-axis may be set to be (0, −1−2N). In other words, a position of a non-adjacent base sample may be determined based on a position of an adjacent base sample and a distance with an adjacent base sample.

Hereinafter, a candidate block including a neighboring base sample among candidate blocks is referred to as a neighboring block and a candidate block including a non-neighboring base sample is referred to as a non-neighboring block.

When a distance between a current block and a candidate block is equal to or greater than a threshold value, the candidate block may be set to be unavailable as a merge candidate. The threshold value may be determined based on a size of a coding tree unit. In an example, a threshold value may be set as a height of a coding tree unit (ctu_height) or a value adding or subtracting an offset to or from a height of a coding tree unit (ctu_height±N). As an offset N is a predefined value in an encoding device and a decoding device, it may be set to be 4, 8, 16, 32 or ctu_height.

When a difference between a y-axis coordinate of a current block and a y-axis coordinate of a sample included in a candidate block is greater than a threshold value, a candidate block may be determined to be unavailable as a merge candidate.

Alternatively, a candidate block not belonging to the same coding tree unit as a current block may be set to be unavailable as a merge candidate. In an example, when a base sample is out of an upper boundary of a coding tree unit to which a current block belongs, a candidate block including the base sample may be set to be unavailable as a merge candidate.

When an upper boundary of a current block adjoins an upper boundary of a coding tree unit, a plurality of candidate blocks may be determined to be unavailable as a merge candidate, so the encoding/decoding efficiency of a current block may be reduced. To solve such a problem, it may be set that the number of candidate blocks positioned at the left of a current block is greater than the number of candidate blocks positioned at the top of a current block.

FIG. 10 is a diagram illustrating candidate blocks used to derive a merge candidate.

As in an example shown in FIG. 10, top blocks belonging to N block rows at the top of a current block and left blocks belonging to M block columns at the left of a current block may be set as candidate blocks. In this case, the number of left candidate blocks may be set to be greater than the number of top candidate blocks by setting N to be greater than M.

In an example, a difference between a y-axis coordinate of a base sample in a current block and a y-axis coordinate of a top block which may be used as a candidate block may be set not to exceed N times the height of a current block. In addition, a difference between an x-axis coordinate of a base sample in a current block and an x-axis coordinate of a left block which may be used as a candidate block may be set not to exceed M times a width of a current block.

In an example, an example shown in FIG. 10 showed that blocks belonging to two block rows at the top of a current block and blocks belonging to five left block columns at the left of a current block are set as candidate blocks.

In another example, when a candidate block does not belong to the same coding tree unit as a current block, a merge candidate may be derived by using a block belonging to the same coding tree unit as a current block or a block including a base sample adjacent to the boundary of the coding tree unit instead of the candidate block.

FIG. 11 is a diagram showing an example in which a position of a base sample is changed.

When a base sample is included in a coding tree unit different from a current block and the base sample is not adjacent to the boundary of the coding tree unit, a candidate block may be determined by using a base sample adjacent to the boundary of the coding tree unit instead of the base sample.

In an example, in an example shown in FIGS. 11 (a) and (b), when an upper boundary of a current block adjoins an upper boundary of a coding tree unit, base samples at the top of a current block belong to a coding tree unit different from a current block. A base sample which is not adjacent to an upper boundary of a coding tree unit among base samples belonging to a coding tree unit different from a current block may be substituted with a sample adjacent to an upper boundary of a coding tree unit.

In an example, as in an example shown in FIG. 11 (a), a base sample at a position of 6 may be substituted with a sample at a position of 6' on the upper boundary of a coding tree unit and as in an example shown in the FIG. 11 (b), a base sample at a position of 15 may be substituted with a sample at a position of 15' on the upper boundary of a coding tree unit. In this case, a y-coordinate of a substituted sample is derived being changed into an adjacent position of a coding tree unit and a x-coordinate of a substituted sample may be set the same as a base sample. In an example, a sample at a position of 6' may have the same x-coordinate as a sample at a position of 6 and a sample at a position of 15' may have the same x-coordinate as a sample at a position of 15.

Alternatively, an x-coordinate of a substituted sample may be set by adding or subtracting an offset to or from an x-coordinate of a base sample. In an example, when x-coordinates of a neighboring base sample and a non-neighboring block positioned at the top of a current block are the same, an x-coordinate of a substituted sample may be set by adding or subtracting an offset to or from an x-coordinate of a base sample. It is for preventing a substituted sample substituting a non-neighboring base sample from being at the same position of another non-neighboring base sample or neighboring base sample.

FIG. 12 is a diagram showing an example in which a position of a base sample is changed.

When a base sample which is included in a coding tree unit different from a current block and which is not adjacent to the boundary of a coding tree unit is substituted with a sample positioned on the boundary of a coding tree unit, a value adding or subtracting an offset to or from an x-coordinate of a base sample may be set as an x-coordinate of a substituted sample.

In an example, in an example shown in FIG. 12, a base sample at a position of 6 and a base sample at a position of 15 may be respectively substituted with a sample at a position of 6' and a sample at a position of 15' that a y-coordinate is the same as a row adjacent to the upper boundary of a coding tree unit. In this case, an x-coordinate of a sample at a position of 6' may be set as a value subtracting W/2 from an x-coordinate of a base sample at a position of 6 and an x-coordinate of a sample at a position of 15' may be set as a value subtracting W−1 from an x-coordinate of a base sample at a position of 15.

Unlike an example shown in FIG. 11 and FIG. 12, a y-coordinate of a row positioned at the top of the uppermost row of a current block or a y-coordinate on the upper boundary of a coding tree unit may be set as a y-coordinate of a substituted sample.

Not shown, but a sample substituting a base sample may be determined based on the left boundary of a coding tree unit. In an example, when a base sample is not included in the same coding tree unit as a current block and is not adjacent to the left boundary of a coding tree unit, the base sample may be substituted with a sample adjacent to the left boundary of a coding tree unit. In this case, a substituted sample may have the same y-coordinate of a base sample or may have a y-coordinate obtained by adding or subtracting an offset to or from a y-coordinate of a base sample.

After that, a block including a substituted sample may be set as a candidate block and a merge candidate of a current block may be derived based on the candidate block.

A merge candidate may be derived from a temporal neighboring block included in a picture different from a current block. In an example, a merge candidate may be derived from a collocated block included in a collocated picture. Any one of reference pictures included in a reference picture list may be set as a collocated picture. Index information identifying a collocated picture among reference pictures may be signaled in a bitstream. Alternatively, a reference picture with a predefined index among reference pictures may be determined as a collocated picture.

The motion information of a merge candidate may be set the same as the motion information of a candidate block. In an example, at least one of a motion vector, a reference picture index, a prediction direction or a bidirectional weight index of a candidate block may be set as the motion information of a merge candidate.

A merge candidate list including a merge candidate may be generated S702.

The index of merge candidates in a merge candidate list may be assigned according to the predetermined order. In an example, an index may be assigned in the order of a merge candidate derived from a left neighboring block, a merge candidate derived from a top neighboring block, a merge candidate derived from a right-top neighboring block, a merge candidate derived from a left-bottom neighboring block, a merge candidate derived from a left-top neighboring block and a merge candidate derived from a temporal neighboring block.

When a plurality of merge candidates are included in a merge candidate, at least one of a plurality of merge candidates may be selected S703. Concretely, information for specifying any one of a plurality of merge candidates may be signaled in a bitstream. In an example, information, merge_idx, representing an index of any one of merge candidates included in a merge candidate list may be signaled in a bitstream.

When the number of merge candidates included in a merge candidate list is less than the threshold, a motion information candidate included in a motion information table may be added to a merge candidate list as a merge candidate. In this connection, the threshold may be the maximum number of merge candidates which may be included in a merge candidate list or a value in which an offset is subtracted from the maximum number of merge candidates. An offset may be a natural number such as 1 or 2, etc.

A motion information table includes a motion information candidate derived from a block encoded/decoded based on inter-prediction in a current picture. In an example, the motion information of a motion information candidate included in a motion information table may be set the same as the motion information of a block encoded/decoded based on inter-prediction. In this connection, motion information may include at least one of a motion vector, a reference picture index, a prediction direction or a bidirectional weight index.

A motion information candidate included in a motion information table also can be referred to as a inter region merge candidate or a prediction region merge candidate.

The maximum number of a motion information candidate which may be included in a motion information table may be predefined in an encoder and a decoder. In an example, the maximum number of a motion information candidate which may be included in a motion information table may be 1, 2, 3, 4, 5, 6, 7, 8 or more (e.g. 16).

Alternatively, information representing the maximum number of a motion information candidate which may be included in a motion information table may be signaled in a bitstream. The information may be signaled in a sequence, a picture or a slice level. The information may represent the maximum number of a motion information candidate which may be included in a motion information table. Alternatively, the information may represent difference between the maximum number of a motion information candidate which may be included in a motion information table and the maximum number of a merge candidate which may be included in a merge candidate list.

Alternatively, the maximum number of a motion information candidate which may be included in a motion information table may be determined according to a picture size, a slice size or a coding tree unit size.

A motion information table may be initialized in a unit of a picture, a slice, a tile, a brick, a coding tree unit or a coding tree unit line (a row or a column). In an example, when a slice is initialized, a motion information table is also initialized thus a motion information table may not include any motion information candidate.

Alternatively, information representing whether a motion information table will be initialized may be signaled in a bitstream. The information may be signaled in a slice, a tile, a brick or a block level. Until the information indicates the initialization of a motion information table, a pre-configured motion information table may be used.

Alternatively, information on an initial motion information candidate may be signaled in a picture parameter set or a slice header. Although a slice is initialized, a motion information table may include an initial motion information candidate. Accordingly, an initial motion information candidate may be used for a block which is the first encoding/decoding target in a slice.

Alternatively, a motion information candidate included in the motion information table of a previous coding tree unit may be set as an initial motion information candidate. In an example, a motion information candidate with the smallest index or with the largest index among motion information candidates included in the motion information table of a previous coding tree unit may be set as an initial motion information candidate.

Blocks are encoded/decoded in the order of encoding/decoding, and blocks encoded/decoded based on inter-prediction may be sequentially set as a motion information candidate in the order of encoding/decoding.

FIG. 13 is a diagram to explain the update aspect of a motion information table.

For a current block, when inter-prediction is performed S1301, a motion information candidate may be derived based on a current block S1302. The motion information of a motion information candidate may be set the same as that of a current block.

When a motion information table is empty S1303, a motion information candidate derived based on a current block may be added to a motion information table S1304.

When a motion information table already includes a motion information candidate S1303, a redundancy check for the motion information of a current block (or, a motion information candidate derived based on it) may be performed S1305. A redundancy check is to determine whether the motion information of a pre-stored motion information candidate in a motion information table is the same as the motion information of a current block. A redundancy check may be performed for all pre-stored motion information candidates in a motion information table. Alternatively, a redundancy check may be performed for motion information candidates with an index over or below the threshold among pre-stored motion information candidates in a motion information table. Alternatively, a redundancy check may be performed for the predefined number of motion information candidates. In an example, 2 motion information candidates with smallest indexes or with largest indexes may be determined as targets for a redundancy check.

When a motion information candidate with the same motion information as a current block is not included, a motion information candidate derived based on a current block may be added to a motion information table S1308. Whether motion information candidates are identical may be determined based on whether the motion information (e.g. a motion vector/a reference picture index, etc.) of motion information candidates is identical.

In this connection, when the maximum number of motion information candidates are already stored in a motion information table S1306, the oldest motion information candidate may be deleted S1307 and a motion information candidate derived based on a current block may be added to a motion information table S1308. In this connection, the oldest motion information candidate may be a motion information candidate with the largest or the smallest index.

Motion information candidates may be identified by respective index. When a motion information candidate derived from a current block is added to a motion information table, the smallest index (e.g. 0) may be assigned to the motion information candidate and indexes of pre-stored motion information candidates may be increased by 1. In this connection, When the maximum number of motion information candidates are already stored in a motion information table, a motion information candidate with the largest index is removed.

Alternatively, when a motion information candidate derived from a current block is added to a motion information table, the largest index may be assigned to the motion information candidate. In an example, when the number of pre-stored motion information candidates in a motion information table is less than the maximum value, an index with the same value as the number of pre-stored motion information candidates may be assigned to the motion information candidate. Alternatively, when the number of pre-stored motion information candidates in a motion information table is equal to the maximum value, an index subtracting 1 from the maximum value may be assigned to the motion information candidate. Alternatively, a motion information candidate with the smallest index is removed and the indexes of residual pre-stored motion information candidates are decreased by 1.

FIG. 14 is a diagram showing the update aspect of a motion information table.

It is assumed that as a motion information candidate derived from a current block is added to a motion information table, the largest index is assigned to the motion information candidate. In addition, it is assumed that the maximum number of a motion information candidate is already stored in a motion information table.

When a motion information candidate HmvpCand[n+1] derived from a current block is added to a motion information table HmvpCandList, a motion information candidate HmvpCand[0] with the smallest index among pre-stored motion information candidates may be deleted and indexes of residual motion information candidates may be decreased by 1. In addition, the index of a motion information candidate HmvpCand[n+1] derived from a current block may be set to the maximum value (for an example shown in FIG. 14, n).

When a motion information candidate identical to a motion information candidate derived based on a current block is prestored S1305, a motion information candidate derived based on a current block may not be added to a motion information table S1309.

Alternatively, while a motion information candidate derived based on a current block is added to a motion information table, a pre-stored motion information candidate identical to the motion information candidate may be removed. In this case, it causes the same effect as when the index of a pre-stored motion information candidate is newly updated.

FIG. 15 is a diagram showing an example in which the index of a pre-stored motion information candidate is updated.

When the index of a pre-stored motion information candidate identical to a motion information candidate mvCand derived from a current block is hIdx, the pre-stored motion information candidate may be removed and the index of motion information candidates with an index larger than hIdx may be decreased by 1. In an example, an example shown in FIG. 15 showed that HmvpCand[2] identical to mvCand is deleted in a motion information table HvmpCandList and an index from HmvpCand[3] to HmvpCand[n] is decreased by 1.

And, a motion information candidate mvCand derived based on a current block may be added to the end of a motion information table.

Alternatively, an index assigned to a pre-stored motion information candidate identical to a motion information candidate derived based on a current block may be updated. For example, the index of a pre-stored motion information candidate may be changed to the minimum value or the maximum value.

The motion information of blocks included in a predetermined region may be set not to be added to a motion information table. In an example, a motion information candidate derived based on the motion information of a block included in a merge processing region may not be added to a motion information table. Since the encoding/decoding order for blocks included in a merge processing region is not defined, it is improper to use motion information of any one of them for the inter-prediction of another of them. Accordingly, motion information candidates derived based on blocks included in a merge processing region may not be added to a motion information table.

Alternatively, the motion information of a block smaller than a preset size may be set not to be added to a motion information table. In an example, a motion information candidate derived based on the motion information of a coding block whose width or height is smaller than 4 or 8 or the motion information of a 4×4 sized coding block may not be added to a motion information table.

When motion compensation prediction is performed per sub-block basis, a motion information candidate may be derived based on the motion information of a representative sub-block among a plurality of sub-blocks included in a current block. In an example, when a sub-block merge candidate is used for a current block, a motion information candidate may be derived based on the motion information of a representative sub-block among sub-blocks.

The motion vector of sub-blocks may be derived in the following order. First, any one of merge candidates included in the mere candidate list of a current block may be selected and an initial shift vector (shVector) may be derived based on the motion vector of a selected merge candidate. And, a shift sub-block that a base sample is at a position of (xColSb, yColSb) may be derived by adding an initial shift vector to the position (xSb, ySb) of the base sample of each sub-block in a coding block (e.g. a left-top sample or a center sample). The below Equation 1 shows a formula for deriving a shift sub-block.

$$(xColSb, yColSb) = (xSb + sh\text{Vector}[0] >> 4, ySb + sh\text{Vector}[1] >> 4)$$ [Equation 1]

Then, the motion vector of a collocated block corresponding to the center position of a sub-block including (xColSb, yColSb) may be set as the motion vector of a sub-block including (xSb, ySb).

A representative sub-block may mean a sub-block including the a top-left sample, a central sample, a bottom-right sample, a top-right sample or a bottom-left sample of a current block.

FIG. 16 is a diagram showing the position of a representative sub-block.

FIG. 16 (a) shows an example in which a sub-block positioned at the left-top of a current block is set as a representative sub-block and FIG. 16 (b) shows an example in which a sub-block positioned at the center of a current block is set as a representative sub-block. When motion compensation prediction is performed in a basis of a sub-block, the motion information candidate of a current block may be derived based on the motion vector of a sub-block including the left-top sample of a current block or including the central sample of a current block.

Based on the inter-prediction mode of a current block, it may be determined whether a current block will be used as a motion information candidate. In an example, a block encoded/decoded based on an affine motion model may be set to be unavailable as a motion information candidate. Accordingly, although a current block is encoded/decoded by inter-prediction, a motion information table may not be updated based on a current block when the inter-prediction mode of a current block is an affine prediction mode.

Alternatively, based on at least one of a motion vector resolution of a current block, whether a merge offset encoding method is applied, whether combined prediction is applied or whether triangular partitioning is applied, whether a current block will be used as a motion information candidate may be determined. In an example, a current block may be set to be unavailable as a motion information candidate in at least one of a case when a motion information resolution of a current block is equal to or greater than 2 integer-pel, a case when combined prediction is applied to a current block or a case when a merge offset encoding method is applied to a current block.

Alternatively, a motion information candidate may be derived based on at least one sub-block vector of a sub-block included in a block encoded/decoded based on an affine motion model. In an example, a motion information candidate may be derived by using a sub-block positioned at the left-top, the center or the right-top of a current block. Alternatively, the average value of the sub-block vectors of a plurality of sub-blocks may be set as the motion vector of a motion information candidate.

Alternatively, a motion information candidate may be derived based on the average value of the affine seed vectors of a block encoded/decoded based on an affine motion model. In an example, at least one average of the first affine seed vector, the second affine seed vector or the third affine seed vector of a current block may be set as the motion vector of a motion information candidate.

Alternatively, a motion information table may be configured per inter-prediction mode. In an example, at least one of a motion information table for a block encoded/decoded by an intra block copy, a motion information table for a block encoded/decoded based on a translation motion model or a motion information table for a block encoded/decoded based on an affine motion model may be defined. According to the inter-prediction mode of a current block, any one of a plurality of motion information tables may be selected.

FIG. 17 shows an example in which a motion information table is generated per inter-prediction mode.

When a block is encoded/decoded based on a non-affine motion model, a motion information candidate mvCand derived based on the block may be added to a non-affine motion information table HmvpCandList. On the other hand, when a block is encoded/decoded based on an affine motion model, a motion information candidate mvAfCand derived based on the above model may be added to an affine motion information table HmvpCandList.

The affine seed vectors of the above block may be stored in a motion information candidate derived from a block encoded/decoded based on an affine motion model. Accordingly, the motion information candidate may be used as a merge candidate for deriving the affine seed vectors of a current block.

Alternatively, a motion information table may be configured per motion vector resolution. In an example, at least one of a motion information table for storing motion information that a motion vector resolution is a 1/16 pel, a motion information table for storing motion information that a motion vector resolution is a 1/4 pel, a motion information table for storing motion information that a motion vector resolution is a 1/2 pel, a motion information table for storing motion information that a motion vector resolution is an integer-pel or a motion information table for storing motion information that a motion vector resolution is a 4 integer-pel may be defined.

FIG. 18 shows an example in which a motion information table is generated per motion vector resolution.

When a motion vector resolution of a block has a 1/4 pel, the motion information of a block, mvCand, may be stored in a quarter-pel motion information table HmvpQPCandList. On the other hand, when a motion vector resolution of a block has an integer-pel, the motion information of a block, mvCand, may be stored in an integer-pel motion information table HmvpIPCandList. When a motion vector resolution of a block has a 4 integer-pel, the motion information of a block, mvCand, may be stored in a 4 integer-pel motion information table Hmvp4IPCandList.

Based on a motion vector resolution of a current block, a merge candidate of a current block may be derived by selecting a motion information table. In an example, when a motion vector resolution of a current block is a 1/4 pel, a merge candidate of a current block may be derived by using a quarter-pel motion information table HmvpQPCandList. On the other hand, when a motion vector resolution of a current block is an integer-pel, a merge candidate of a current block may be derived by using an integer-pel motion information table HmvpIPCandList.

Alternatively, the motion information of a block to which a merge offset encoding method is applied may be stored in a separate motion information table.

FIG. 19 shows an example in which the motion information of a block to which a merge offset encoding method is applied is stored in a separate motion information table.

When a merge offset vector encoding method is not applied to a block, the motion information of a block, mvCand, may be stored in a motion information table HmvpCandList. On the other hand, when a merge offset vector encoding method is applied to a block, the motion information of a block, mvCand, may not be stored in a motion information table HmvpCandList, and may be stored in a merge offset motion information table HmvpMMVDCandList.

Based on whether a merge offset vector encoding method is applied to a current block, a motion information table may be selected. In an example, when a merge offset encoding method is not applied to a current block, a merge candidate of a current block may be derived by using a motion information table HmvpCandList. On the other hand, when a merge offset encoding method is applied to a current block, a merge candidate of a current block may be derived by using a merge offset motion information table HmvpMMVDCandList.

An additional motion information table may be defined in addition to the described motion information table. A long-term motion information table (hereinafter, referred to as the second motion information table) may be defined in addition to the above-described motion information table (hereinafter, referred to as the first motion information table). In this connection, a long-term motion information table includes long-term motion information candidates.

When both the first motion information table and the second motion information table are empty, first, a motion information candidate may be added to the second motion information table. After the number of motion information candidates available for the second motion information table reaches the maximum number, a motion information candidate may be added to the first motion information table.

Alternatively, one motion information candidate may be added to both the second motion information table and the first motion information table.

In this connection, a second motion information table which is fully filled may not perform an update any more. Alternatively, when a decoded region in a slice is over a predetermined ratio, the second motion information table may be updated. Alternatively, the second motion information table may be updated per N coding tree unit line.

On the other hand, the first motion information table may be updated whenever an encoded/decoded block is generated by inter-prediction. But, a motion information candidate added to the second motion information table may be set not to be used to update the first motion information table.

Information for selecting any one of the first motion information table or the second motion information table may be signaled in a bitstream. When the number of a merge candidate included in a merge candidate list is less than the threshold, motion information candidates included in a motion information table indicated by the information may be added to a merge candidate list as a merge candidate.

Alternatively, a motion information table may be selected based on a size of a current block, a shape of the current block, an inter-prediction mode of the current block, whether bidirectional prediction is applied to the current block, whether a motion vector is refined or whether a triangular partitioning is applied to the current block.

Alternatively, when the number of merge candidates included in a merge candidate list is less than the maximum number even though a motion information candidate included in the first motion information table is added, a motion information candidate included in the second motion information table may be added to a merge candidate list.

FIG. 20 is a diagram showing an example in which a motion information candidate included in a long-term motion information table is added to a merge candidate list.

In case that the number of a merge candidate included in a merge candidate list is less than the maximum number, a motion information candidate included in the first motion information table HmvpCandList may be added to a merge candidate list. In When the number of a merge candidate included in the merge candidate list is less than the maximum number even though motion information candidates included in the first motion information table is added to a merge candidate list, a motion information candidate included in a long-term motion information table HmvpLT-CandList may be added to the merge candidate list.

Table 1 shows a process in which motion information candidates included in a long-term information table are added to a merge candidate list.

TABLE 1

For each candidate in HMVPCandList with index HMVPLTIdx = 1..numHMVPLTCand, the following ordered steps are repeated until combStop is equal to true
  - sameMotion is set to FALSE
  - If hmvpStop is equal to FALSE and numCurrMergecand is less than (MaxNumMergeCand-1), hmvpLT is set to TRUE
  - If HMVPLTCandList[NumLTHmvp-HMVPLTIdx] have the same motion vectors and the same reference indices with any mergeCandList[i] with I being 0.. numOrigMergeCand-1 and HasBeenPruned[i] equal to false, sameMotion is set to true
  - If sameMotion is equal to false, mergeCandList[numCurrMergeCand++] is set to HMVPLTCandList[NumLTHmvp-HMVPLTIdx]
  - If numCurrMergeCand is equal to (MaxNumMergeCand-1), hmvpLTStop is set to TRUE A motion information candidate may be set to include additional information except for motion information. In an example, at least one of a size, shape or partition information of a block may be additionally stored in a motion information candidate. When the merge candidate list of a current block is configured, only motion information candidate whose a size, shape or partition information is identical or similar to a current block among motion information candidates may be used or a motion information candidate whose a size, shape or partition information is identical or similar to a current block may be added to a merge candidate list in advance. Alternatively, a motion information table may be generated per block size, shape or partition information. The merge candidate list of a current block may be configured by using a motion information table matching the shape, size or partition information of a current block among a plurality of motion information tables.

When the number of a merge candidate included in the merge candidate list of a current block is less than the threshold, a motion information candidate included in a motion information table may be added to a merge candidate list as a merge candidate. The additional process is performed in the order reflecting sorted order of indexes of motion information candidates in ascending or descending order. In an example, a motion information candidate with the largest index may be first added to the merge candidate list of a current block.

When a motion information candidate included in a motion information table is added to a merge candidate list, a redundancy check between a motion information candidate and pre-stored merge candidates in the merge candidate list may be performed. As a result of a redundancy check, a motion information candidate with the same motion information as a pre-stored merge candidate may not be added to the merge candidate list.

In an example, Table 2 shows a process in which a motion information candidate is added to a merge candidate list.

TABLE 2

For each candidate in HMVPCandList with index HMVPIdx = 1.. numCheckedHMVPCand, the following ordered steps are repeated until combStop is equal to true TABLE 2-continued

- sameMotion is set to false
- If HMVPCandList[NumHmvp-HMVPIdx] have the same motion vectors and the same reference indices with any mergeCandList[i] with I being 0.. numOrigMergeCand-1 and HasBeenPruned[i] equal to false, sameMotion is set to true
  - If sameMotion is equal to false, mergeCandList[numCurrMergeCand++] is set to HMVPCandList[NumHmvp-HMVPIdx]
- If numCurrMergeCand is equal to (MaxNumMergeCand-1), hmvpStop is set to TRUE A redundancy check may be performed only for a part of motion information candidates included in a motion information table. In an example, a redundancy check may be performed only for a motion information candidate with an index over or below the threshold. Alternatively, a redundancy check may be performed only for N motion information candidates with the largest index or the smallest index. Alternatively, a redundancy check may be performed only for a part of pre-stored merge candidates in a merge candidate list. In an example, a redundancy check may be performed only for a merge candidate whose index is over or below the threshold or a merge candidate derived from a block at a specific position. In this connection, a specific position may include at least one of the left neighboring block, the top neighboring block, the right-top neighboring block or the left-bottom neighboring block of a current block.

FIG. 21 is a diagram showing an example in which a redundancy check is performed only for a part of merge candidates.

When a motion information candidate HmvpCand[j] is added to a merge candidate list, a redundancy check with 2 merge candidates with the largest index, mergeCandList[NumMerge−2] and mergeCandList[NumMerge−1], may be performed for a motion information candidate. In this connection, NumMerge may show the number of an available spatial merge candidate and a temporal merge candidate.

Unlike a shown example, when a motion information candidate HmvpCand[j] is added to a merge candidate list, a redundancy check with 2 merge candidates with the smallest index may be performed for a motion information candidate. For example, it may be checked whether mergeCandList[0] and mergeCandList[1] are identical to HmvpCand[j].

Alternatively, a redundancy check may be performed only for a merge candidate derived from a specific position. In an example, a redundancy check may be performed for at least one of a merge candidate derived from a neighboring block positioned at the left of a current block or at the top of a current block. When there is no merge candidate derived from a specific position in a merge candidate list, a motion information candidate may be added to a merge candidate list without a redundancy check.

When a motion information candidate HmvpCand[j] is added to a merge candidate list, a redundancy check with 2 merge candidates with the largest index, mergeCandList[NumMerge−2] and mergeCandList[NumMerge−1], may be performed for a motion information candidate. In this connection, NumMerge may show the number of an available spatial merge candidate and a temporal merge candidate.

A redundancy check with a merge candidate may be performed only for a part of motion information candidates. In an example, a redundancy check may be performed only for N motion information candidates with a large or a small index among motion information candidates included in a motion information table. In an example, a redundancy check may be performed only for motion information candidates with an index that the number and difference of motion information candidates included in a motion information table are below the threshold. When the threshold is 2, a redundancy check may be performed only for 3 motion information candidates with the largest index value among motion information candidates included in a motion information table. A redundancy check may be omitted for motion information candidates except for the above 3 motion information candidates. When a redundancy check is omitted, a motion information candidate may be added to a merge candidate list regardless of whether the same motion information as a merge candidate is exist or not.

Conversely, a redundancy check is set to be performed only for motion information candidates with an index that the number and difference of motion information candidates included in a motion information table are over the threshold.

The number of a motion information candidate that a redundancy check is performed may be redefined in an encoder and a decoder. In an example, the threshold may be an integer such as 0, 1 or 2.

Alternatively, the threshold may be determined based on at least one of the number of a merge candidate included in a merge candidate list or the number of motion information candidates included in a motion information table.

When a merge candidate identical to the first motion information candidate is found, a redundancy check with the merge candidate identical to the first motion information candidate may be omitted in a redundancy check for the second motion information candidate.

FIG. 22 is a diagram showing an example in which a redundancy check with a specific merge candidate is omitted.

When a motion information candidate HmvpCand[i] whose index is i is added to a merge candidate list, a redundancy check between the motion information candidate and pre-stored merge candidates in a merge candidate list is performed. In this connection, when a merge candidate mergeCandlist[j] identical to a motion information candidate HmvpCand[i] is found, a redundancy check between a motion information candidate HmvpCand[i−1] whose index is i−1 and merge candidates may be performed without adding the motion information candidate HmvpCand[i] to a merge candidate list. In this connection, a redundancy check between the motion information candidate HmvpCand[i−1] and the merge candidate mergeCandList[j] may be omitted.

In an example, in an example shown in FIG. 22, it was determined that HmvpCand[i] and mergeCandList[2] are identical. Accordingly, a redundancy check for HmvpCand[i−1] may be performed without adding HmvpCand[i] to a merge candidate list. In this connection, a redundancy check between HmvpCand[i−1] and mergeCandList[2] may be omitted.

When the number of a merge candidate included in the merge candidate list of a current block is less than the threshold, at least one of a pairwise merge candidate or a zero merge candidate may be additionally included except for a motion information candidate. A pairwise merge candidate means a merge candidate having a value obtained from averaging the motion vectors of more than 2 merge candidates as a motion vector and a zero merge candidate means a merge candidate whose motion vector is 0.

For the merge candidate list of a current block, a merge candidate may be added in the following order.

Spatial merge candidate—Temporal merge candidate—Motion information candidate—(Affine motion information candidate)—Pairwise merge candidate—Zero merge candidate A spatial merge candidate means a merge candidate derived from at least one of a neighboring block or a non-neighboring block and a temporal merge candidate means a merge candidate derived from a previous reference picture. An affine motion information candidate represents a motion information candidate derived from a block encoded/decoded by an affine motion model.

A motion information table may be used in a motion vector prediction mode. In an example, when the number of a motion vector prediction candidate included in the motion vector prediction candidate list of a current block is less than the threshold, a motion information candidate included in a motion information table may be set as a motion vector prediction candidate for a current block. Concretely, the motion vector of a motion information candidate may be set as a motion vector prediction candidate.

If any one of motion vector prediction candidates included in the motion vector prediction candidate list of a current block is selected, a selected candidate may be set as a motion vector predictor of a current block. Then, after the motion vector residual value of a current block is decoded, the motion vector of a current block may be obtained by adding up the motion vector predictor and the motion vector residual value.

The motion vector prediction candidate list of a current block may be configured in the following order.

Spatial motion vector prediction candidate—Temporal motion vector prediction candidate—Motion information candidate—(Affine motion information candidate)—Zero motion vector prediction candidate A spatial motion vector prediction candidate means a motion vector prediction candidate derived from at least one of a neighboring block or a non-neighboring block and a temporal motion vector prediction candidate means a motion vector prediction candidate derived from a previous reference picture. An affine motion information candidate represents a motion information candidate derived from a block encoded/decoded by an affine motion model. A zero motion vector prediction candidate represents a candidate that the value of a motion vector is 0.

A merge processing region larger than a coding block may be defined. Coding blocks included in a merge processing region may be processed in parallel without being sequentially encoded/decoded. In this connection, not being sequentially encoded/decoded means the order of encoding/decoding is not defined. Accordingly, the encoding/decoding process of blocks included in a merge processing region may be independently processed. Alternatively, blocks included in a merge processing region may share merge candidates. In this connection, the merge candidates may be derived based on a merge processing region.

According to the above-mentioned feature, a merge processing region may be referred to as a parallel processing region, a shared merge region (SMR) or a merge estimation region (MER).

A merge candidate of a current block may be derived based on a coding block. However, when a current block is included in a merge processing region larger than the current block, a candidate block included in the same merge processing region as the current block may be set to be unavailable as a merge candidate.

FIG. 23 is a diagram showing an example in which a candidate block included in the same merge processing region as a current block is set to be unavailable as a merge candidate.

In an example shown in FIG. 23 (a), in the decoding/decoding of CU5, blocks including base samples adjacent to CU5 may be set as candidate blocks. In this connection, candidate blocks X3 and X4 included in the same merge processing region as CU5 may be set to be unavailable as a merge candidate of CU5. But, candidate blocks X0, X1 and X2 not included in the same merge processing region as CU5 may be set to be available as a merge candidate.

In an example shown in FIG. 23 (b), in the decoding/decoding of CU8, blocks including base samples adjacent to CU8 may be set as candidate blocks. In this connection, candidate blocks X6, X7 and X8 included in the same merge processing region as CU8 may be set to be unavailable as a merge candidate. However, candidate blocks X5 and X9 not included in the same merge processing region as CU8 may be set to be available as a merge candidate.

Alternatively, when a current block is included in a merge processing region, a neighboring block adjacent to a current block and to a merge processing region may be set as a candidate block.

FIG. 24 is a diagram showing an example which derives a merge candidate for a current block when a current block is included in a merge processing region.

As in an example shown in FIG. 24 (a), neighboring blocks adjacent to a current block may be set as candidate blocks for deriving the merge candidate of the current block. In this connection, a candidate block included in the same merge processing region as the current block may be set to be unavailable as a merge candidate. In an example, in deriving a merge candidate for a coding block CU3, a top neighboring block y3 and a right-top neighboring block y4 included in the same merge processing region as the coding block CU3 may be set to be unavailable as a merge candidate of the coding block CU3.

By scanning neighboring blocks adjacent to a current block in the predefined order, a merge candidate may be derived. In an example, the predefined order may be the order of y1, y3, y4, y0 and y2.

When the number of merge candidates which may be derived from neighboring blocks adjacent to a current block is less than a value that an offset is subtracted from the maximum number of merge candidates or the maximum number, a merge candidate for the current block may be derived by using neighboring blocks adjacent to a merge processing region like an example shown in FIG. 24 (b). In an example, neighboring blocks adjacent to a merge processing region including a coding block CU3 may be set as candidate blocks for the coding block CU3. In this connection, neighboring blocks adjacent to a merge processing region may include at least one of a left neighboring block x1, a top neighboring block x3, a left-bottom neighboring block x0, a right-top neighboring block x4 or a left-top neighboring block x2.

By scanning neighboring blocks adjacent to a merge processing region in the predefined order, a merge candidate may be derived. In an example, the predefined order may be the order of x1, x3, x4, x0 and x2.

In summary, a merge candidate on the coding block CU3 including in a merge processing region may be derived by scanning candidate blocks in the following scanning order.

(y1, y3, y4, y0, y2, x1, x3, x4, x0, x2)

But, the scanning order of the above-illustrated candidate blocks only shows the example of the present disclosure and candidate blocks may be scanned in the order different from the above example. Alternatively, the scanning order may be adaptively determined based on at least one of a size or a shape of a current block or a merge processing region.

A merge processing region may be square or non-square. Information for determining a merge processing region may be signaled in a bitstream. The information may include at least one of information representing the shape of a merge processing region or information representing the size of a merge processing region. When a merge processing region is non-square, at least one of information representing the size of a merge processing region, information representing the width or height of a merge processing region or information representing a ratio between the width and height of a merge processing region may be signaled in a bitstream.

The size of a merge processing region may be determined based on at least one of information signaled in a bitstream, picture resolution, the size of a slice or the size of a tile.

If motion compensation prediction is performed for a block included in a merge processing region, a motion information candidate derived based on the motion information of a block in which motion compensation prediction is performed may be added to a motion information table.

But, if a motion information candidate derived from a block included in a merge processing region is added to a motion information table, a case may occur where a motion information candidate derived from the block is used in the encoding/decoding of other block in the merge processing region whose encoding/decoding is actually slower than the block. In other words, although dependence between blocks should be excluded in the encoding/decoding of blocks included in a merge processing region, a case may occur where motion prediction compensation is performed by using the motion information of other block included in the merge processing region. To solve such a problem, although the encoding/decoding of a block included in a merge processing region is completed, the motion information of the block whose encoding/decoding is completed may not be added to a motion information table.

Alternatively, a motion information table may be updated by using only a block at a predefined position in a merge processing region. A predefined position may include at least one of a block at a top-left position, a block at a top-right position, a block at a bottom-left position, a block at a bottom-right position, a block at a central position, a block adjacent to the right boundary or a block adjacent to the lower boundary in a merge processing region. In an example, only the motion information of a block adjacent to a bottom-right corner in a merge processing region may be updated in a motion information table and the motion information of other blocks may not be updated in a motion information table.

Alternatively, after all blocks included in a merge processing region are decoded, a motion information candidate derived from the blocks may be added to a motion information table. In other words, while blocks included in a merge processing region are encoded/decoded, a motion information table may not be updated.

In an example, if motion compensation prediction is performed for blocks included in a merge processing region, a motion information candidate derived from the blocks may be added to a motion information table in the predefined order. In this connection, the predefined order may be determined in the scanning order of coding blocks in a merge processing region or a coding tree unit. The scanning order may be at least one of raster scanning, horizontal scanning, vertical scanning or zigzag scanning. Alternatively, the predefined order may be determined based on each block's motion information or the number of blocks with the same motion information.

Alternatively, a motion information candidate including a unidirectional motion information may be added to motion information table before a motion information candidate including bidirectional motion information. On the contrary, motion information candidate including bidirectional motion information may be added to a motion information table before a motion information candidate including unidirectional motion information.

Alternatively, a motion information candidate may be added to a motion information table in the order of high frequency of use or low frequency of use in a merge processing region or a coding tree unit.

When a current block is included in a merge processing region and the number of merge candidates included in a merge candidate list of the current block is less than the maximum number, a motion information candidate included in a motion information table may be added to the merge candidate list. In this connection, a motion information candidate derived from a block included in the same merge processing region as a current block may be set not to be added to the merge candidate list of the current block.

Alternatively, when a current block is included in a merge processing region, it may be set not to use a motion information candidate included in a motion information table. In other words, although the number of merge candidates included in a merge candidate list of the current block is less than the maximum number, a motion information candidate included in a motion information table may not be added to the merge candidate list.

In another example, a motion information table on a merge processing region or a coding tree unit may be configured. This motion information table plays a role of temporarily storing the motion information of blocks included in a merge processing region. To distinguish between a general motion information table and a motion information table for a merge processing region or a coding tree unit, the motion information table for the merge processing region or the coding tree unit is referred to as a temporary motion information table. And, a motion information candidate stored in the temporary motion information table is referred to as a temporary motion information candidate.

FIG. 25 is a diagram showing a temporary motion information table.

A temporary motion information table for a coding tree unit or a merge processing region may be configured. When motion compensation prediction is performed for a current block included in a coding tree unit or a merge processing region, the motion information of the block may not be added to a motion information table HmvpCandList. Instead, a temporary motion information candidate derived from the block may be added to a temporary motion information table HmvpMERCandList. In other words, a temporary motion information candidate added to a temporary motion information table may not be added to a motion information table. Accordingly, a motion information table may not include a motion information candidate derived based on motion information of blocks included in a coding tree unit or a merge processing region including a current block.

Alternatively, only the motion information of some blocks among blocks included in a merge processing region may be added to a temporary motion information table. In an example, only blocks at a predefined position in a merge processing region may be used to update a motion information table. A predefined position may include at least one of a block at a top-left position, a block at a top-right position, a block at a bottom-left position, a block at a bottom-right position, a block at a central position, a block adjacent to the right boundary or a block adjacent to the lower boundary in a merge processing region. In an example, only the motion information of a block adjacent to a bottom-right corner in a merge processing region may be added to a temporary motion information table and the motion information of other blocks may not be added to a temporary motion information table.

The maximum number of temporary motion information candidates which may be included by a temporary motion information table may be set the same as the maximum number of motion information candidates. Alternatively, the maximum number of temporary motion information candidates which may be included by a temporary motion information table may be determined according to a size of a coding tree unit or a merge processing region. Alternatively, the maximum number of temporary motion information candidates which may be included in a temporary motion information table may be set to be smaller than the maximum number of motion information candidates which may be included in a motion information table.

A current block included in a coding tree unit or a merge processing region may be set not to use a temporary motion information table on the corresponding coding tree unit or merge processing region. In other words, when the number of merge candidates included in the merge candidate list of the current block is less than the threshold, a motion information candidate included in a motion information table may be added to the merge candidate list and a temporary motion information candidate included in a temporary motion information table may not be added to the merge candidate list. Accordingly, the motion information of other block including in the same coding tree unit or the same merge processing region as the current block may not be used for the motion compensation prediction of the current block.

If the encoding/decoding of all blocks included in a coding tree unit or a merge processing region is completed, a motion information table and a temporary motion information table may be unified.

FIG. 26 is a diagram showing an example in which a motion information table and a temporary motion information table are unified.

If the encoding/decoding of all blocks included in a coding tree unit or a merge processing region is completed, a temporary motion information candidate included in a temporary motion information table may be updated in a motion information table as in an example shown in FIG. 26.

In this connection, temporary motion information candidates included in a temporary motion information table may be added to a motion information table in the order inserted in the temporary motion information table (In other words, in the ascending order or the descending order of the index value).

In another example, temporary motion information candidates included in a temporary motion information table may be added to a motion information table in the predefined order. In this connection, the predefined order may be determined in the scanning order of coding blocks in a merge processing region or a coding tree unit. The scanning order may be at least one of raster scanning, horizontal scanning, vertical scanning or zigzag scanning. Alternatively, the predefined order may be determined based on the motion information of each block or the number of blocks with the same motion information.

Alternatively, a temporary motion information candidate including a unidirectional motion information may be added to a motion information table before a temporary motion information candidate including a bidirectional motion information. On the contrary, a temporary motion information candidate including a bidirectional motion information may be added to a motion information table before a temporary motion information candidate including a unidirectional motion information.

Alternatively, a temporary motion information candidate may be added to a motion information table in the order of high frequency of use or low frequency of use in a merge processing region or a coding tree unit.

In case that a temporary motion information candidate included in a temporary motion information table is added to a motion information table, a redundancy check for a temporary motion information candidate may be performed. In an example, when the same motion information candidate as a temporary motion information candidate included in a temporary motion information table is prestored in a motion information table, the temporary motion information candidate may not be added to the motion information table. In this connection, a redundancy check may be performed for a part of motion information candidates included in a motion information table. In an example, a redundancy check may be performed for motion information candidates with an index over or below the threshold. In an example, when a temporary motion information candidate is equal to a motion information candidate with an index over the predefined value, the temporary motion information candidate may not be added to a motion information table.

It may limit the use of a motion information candidate derived from a block included in the same coding tree unit or the same merge processing region as a current block as the merge candidate of the current block. For it, the address information of a block may be additionally stored for a motion information candidate. The address information of a block may include at least one of the position of the block, the address of the block, the index of the block, the position of a merge processing region in which the block is included, the address of a merge processing region in which the block is included, the index of a merge processing region in which the block is included, the position of a coding tree region in which the block is included, the address of a coding tree region in which the block is included or the index of a coding tree region in which the block is included.

A coding block may be partitioned into a plurality of prediction units and prediction may be performed for each of partitioned prediction units. In this case, a prediction unit represents a base unit for performing prediction.

A coding block may be partitioned by using at least one of a vertical line, a horizontal line, an oblique line or a diagonal line. Prediction units partitioned by a partitioning line may have a shape such as a triangle, a quadrangle, a trapezoid or a pentagon. In an example, a coding block may be partitioned into two triangular prediction units, two trapezoidal prediction units, two quadrangular prediction units or one triangular prediction unit and one pentagonal prediction unit.

Information for determining at least one of the number, an angle or a position of a line partitioning a coding block may be signaled in a bitstream. In an example, information representing one of partition type candidates of a coding block may be signaled in a bitstream or information specifying one of a plurality of line candidates partitioning a coding block may be signaled in a bitstream. In an example, index information indicating one of a plurality of line candidates may be signaled in a bitstream.

For each of a plurality of line candidates, at least one of an angle or a position may be different. The number of line candidates which is available for a current block may be determined based on a size or a shape of a current block, the number of available merge candidates or whether a neighboring block at a specific position is available as a merge candidate.

Alternatively, information for determining the number or a type of line candidates may be signaled in a bitstream. In an example, whether an oblique line with an angle greater than a diagonal line and/or an oblique line with an angle smaller than a diagonal line is available as a line candidate may be determined by using a 1-bit flag. The information may be signaled at a sequence, a picture or a sequence level.

Alternatively, based on at least one of an intra prediction mode or an inter prediction mode of a coding block, a position of an available merge candidate or a partitioning type of a neighboring block, at least one of the number, an angle or a position of a line partitioning a coding block may be adaptively determined.

When a coding block is partitioned into a plurality of prediction units, intra prediction or inter prediction may be performed for each partitioned prediction unit.

FIG. 27 is a diagram showing an example in which a coding block is partitioned into a plurality of prediction units by using a diagonal line.

As in an example shown in FIGS. 27 (a) and (b), a coding block may be partitioned into two triangular prediction units by using a diagonal line.

FIGS. 27 (a) and (b) showed that a coding block is partitioned into two prediction units by using a diagonal line connecting two vertexes of a coding block. But, a coding block may be partitioned into two prediction units by using an oblique line that at least one end of a line does not pass a vertex of a coding block.

FIG. 28 is a diagram showing an example in which a coding block is partitioned into two prediction units.

As in an example shown in FIGS. 28 (a) and (b), a coding block may be partitioned into two prediction units by using an oblique line that both ends adjoin the upper and lower boundary of a coding block, respectively.

Alternatively, as in an example shown in FIGS. 28 (c) and (d), a coding block may be partitioned into two prediction units by using an oblique line that both ends adjoin the left and right boundary of a coding block, respectively.

Alternatively, a coding block may be partitioned into two prediction units with a different size. In an example, a coding block may be partitioned into two prediction units with a different size by setting an oblique line partitioning a coding block to meet two boundaries forming one vertex.

FIG. 29 shows examples in which a coding block is partitioned into a plurality of different-sized prediction blocks.

As in an example shown in FIGS. 29 (a) and (b), a coding block may be partitioned into two prediction units with a different size by setting a diagonal line connecting the top-left and bottom-right of a coding block to pass the left boundary, the right boundary, the upper boundary or the lower boundary instead of a top-left corner or a bottom-right corner of a coding block.

Alternatively, as in an example shown in FIGS. 29 (c) and (d), a coding block may be partitioned into two prediction units with a different size by setting a diagonal line connecting the top-right and the bottom-left of a coding block to pass the left boundary, the right boundary, the upper boundary or the lower boundary instead of a top-left corner or a bottom-right corner of a coding block.

Each of prediction units generated by partitioning a coding block is referred to as 'the N-th prediction unit'. In an example, in an example shown in FIG. 27 to FIG. 29, PU1 may be defined as the first prediction unit and PU2 may be defined as the second prediction unit. The first prediction unit may mean a prediction unit which includes a sample at a bottom-left position or a sample at a top-left position in a coding block and the second prediction unit may mean a prediction unit which includes a sample at a top-right position or a sample at a bottom-right position in a coding block.

Conversely, a prediction unit which includes a sample at a top-right position or a sample at a bottom-right position in a coding block may be defined as the first prediction unit and a prediction unit which includes a sample at a bottom-left position or a sample at a top-left position in a coding block may be defined as the second prediction unit.

When a coding block is partitioned by using a horizontal line, a vertical line, a diagonal line or an oblique line, it may be referred to as prediction unit partitioning. A prediction unit generated by applying the prediction unit partitioning may be referred to as a triangular prediction unit, a quadrangular prediction unit or a pentagonal prediction unit according to its shape.

In the embodiments in below, it will be assumed that a coding block is partitioned by using a diagonal line. In particular, when a coding block is partitioned into two prediction units by using a diagonal line, it is referred to as diagonal partitioning or triangular partitioning. But, even when a coding block is partitioned by using an oblique line with an angle different from a vertical line, a horizontal line or a diagonal line, prediction units may be encoded/decoded according to the below-described embodiments. In other words, matters related to the encoding/decoding of the below-described triangular prediction unit may be also applied to the encoding/decoding of a quadrangular prediction unit or a pentagonal prediction unit.

Whether prediction unit partitioning will be applied to a coding block may be determined based on at least one of a slice type, the maximum number of merge candidates which may be included in a merge candidate list, a size of a coding block, a shape of a coding block, a prediction encoding mode of a coding block or a partitioning aspect of a parent node.

In an example, whether prediction unit partitioning will be applied to a coding block may be determined based on whether a current slice is a B type. Prediction unit partitioning may be allowed only when a current slice is a B type.

Alternatively, whether prediction unit partitioning will be applied to a coding block may be determined based on whether the maximum number of merge candidates included in a merge candidate list is equal to or greater than 2. Prediction unit partitioning may be allowed only when the maximum number of merge candidates included in a merge candidate list is equal to or greater than 2.

Alternatively, when at least one of a width or a height is greater than 64, a disadvantage may be occurred during implementation of a hardware that a 64×64-sized data processing unit is redundantly accessed. Accordingly, when at least one of a width or a height of a coding block is greater than a threshold value, it may not be allowed to partition a coding block into a plurality of prediction units. In an example, when at least one of a width or a height of a coding block is greater than 64 (e.g., when at least one of a width or a height is 128), prediction unit partitioning may not be used.

Alternatively, by considering the maximum number of samples which may be simultaneously processed by implemented hardware, prediction unit partitioning may not be allowed for a coding block that the number of samples is greater than a threshold value. In an example, prediction unit partitioning may not be allowed for a coding tree block that the number of samples is greater than 4096.

Alternatively, prediction unit partitioning may not be allowed for a coding block that the number of samples included in a coding block is smaller than a threshold value. In an example, when the number of samples included in a coding block is smaller than 64, prediction unit partitioning may be set not to be applied to a coding block.

Alternatively, whether prediction unit partitioning will be applied to a coding block may be determined based on whether a width and height ratio of a coding block is smaller than the first threshold value or whether a width and height ratio of a coding block is greater than the second threshold value. In this case, a width and height ratio of a coding block, whRatio, may be determined as a ratio of a width CbW and a height CbH of a coding block as in the following Equation 2:

$$whRatio = CbW/CbH \quad [Equation\ 2]$$

The second threshold value may be an inverse number of the first threshold value. In an example, when the first threshold value is k, the second threshold value may be 1/k.

Only when a width and height ratio of a coding block is within a range between the first threshold value and the second threshold value, prediction unit partitioning may be applied to a coding block.

Alternatively, only when a width and height ratio of a coding block is smaller than the first threshold value or greater than the second threshold value, prediction unit partitioning may be used. In an example, when the first threshold value is 16, prediction unit partitioning may not be allowed for a 64×4 or 4×64-sized coding block.

Alternatively, based on a partitioning type of a parent node, whether prediction unit partitioning is allowed may be determined. In an example, when a coding block, a parent node, is partitioned based on quad tree partitioning, prediction unit partitioning may be applied to a coding block, a leaf node. On the other hand, when a coding block, a parent node, is partitioned based on binary tree or triple tree partitioning, prediction unit partitioning may be set to be unallowable for a coding block, a leaf node.

Alternatively, based on a prediction encoding mode of a coding block, whether prediction unit partitioning is allowed may be determined. In an example, prediction unit partitioning may be allowed only when a coding block is encoded by intra prediction, when a coding block is encoded by inter prediction or when a coding block is encoded by a predefined inter prediction mode. In this case, a predefined inter prediction mode may include at least one of a merge mode, a motion vector prediction mode, an affine merge mode or an affine motion vector prediction mode.

Alternatively, based on a size of a parallel processing region, whether prediction unit partitioning is allowed may be determined. In an example, when a size of a coding block is greater than that of a parallel processing region, prediction unit partitioning may not be used.

By considering two or more of the above-enumerated conditions, whether prediction unit partitioning will be applied to a coding block may be determined.

In another example, information representing whether prediction unit partitioning will be applied to a coding block may be signaled in a bitstream. The information may be signaled at a sequence, a picture, a slice or a block level. For example, a flag, triangle_partition_flag, representing whether prediction unit partitioning is applied to a coding block, may be signaled at a coding block level.

When it is determined to apply prediction unit partitioning to a coding block, information representing the number of lines partitioning a coding block or a position of a line may be signaled in a bitstream.

In an example, when a coding block is partitioned by a diagonal line, information representing a direction of a diagonal line partitioning a coding block may be signaled in a bitstream. In an example, a flag, triangle_partition_type_flag, representing a direction of a diagonal line, may be signaled in a bitstream. The flag represents whether a coding block is partitioned by a diagonal line connecting a top-left and a bottom-right or whether a coding block is partitioned by a diagonal line connecting a top-right and a bottom-left. When a coding block is partitioned by a diagonal line connecting a top-left and a bottom-right, it may be referred to as a left triangular partition type and when a coding block is partitioned by a diagonal line connecting a top-right and a bottom-left, it may be referred to as a right triangular partition type. In an example, when a value of the flag is 0, it may represent that a partition type of a coding block is a left triangular partition type and when a value of the flag is 1, it may represent that a partition type of a coding block is a right triangular partition type.

In addition, information representing whether sizes of prediction units are the same or information representing a position of a diagonal line partitioning a coding block may be signaled in a bitstream. In an example, when information representing sizes of prediction units represents that sizes of prediction units are the same, the encoding of information representing a position of a diagonal line may be omitted and a coding block may be partitioned into two prediction units by using a diagonal line which passes two vertexes of a coding block. On the other hand, when information representing sizes of prediction units represents that sizes of prediction units are not the same, a position of a diagonal line partitioning a coding block may be determined based on information representing a position of a diagonal line. In an example, when a left triangular partition type is applied to a coding block, the position information may represent whether a diagonal line meets the left boundary and the lower boundary of a coding block or whether a diagonal line meets the upper boundary and the right boundary. Alternatively, when a right triangular partition type is applied to a coding block, the position information may represent whether a diagonal line meets the right boundary and the lower boundary of a coding block or whether a diagonal line meets the upper boundary and the left boundary.

Information representing a partition type of a coding block may be signaled at a coding block level. Accordingly, a partition type may be determined per coding block to which prediction unit partitioning is applied.

In another example, information representing a partition type for a sequence, a picture, a slice, a tile or a coding tree unit may be signaled. In this case, partition types of coding blocks to which diagonal partitioning is applied in a sequence, a picture, a slice, a tile or a coding tree unit may be set the same.

Alternatively, information for determining a partition type for the first coding unit to which prediction unit partitioning is applied in a coding tree unit may be encoded and signaled, and coding units to which prediction unit partitioning is applied for the second or later may be set to use the same partition type as the first coding unit.

In another example, a partition type of a coding block may be determined based on a partition type of a neighboring block. In this case, a neighboring block may include at least one of a neighboring block adjacent to the top-left corner of a coding block, a neighboring block adjacent to the top-right corner, a neighboring block adjacent to the bottom-left corner, a neighboring block positioned at the top or a neighboring block positioned at the left. In an example, a partition type of a current block may be set the same as a partition type of a neighboring block. Alternatively, a partition type of a current block may be determined based on whether a left triangular partition type is applied to a top-left neighboring block or whether a right triangular partition type is applied to a top-right neighboring block or a bottom-left neighboring block.

To perform motion prediction compensation for the first prediction unit and the second prediction unit, the motion information of each of the first prediction unit and the second prediction unit may be derived. In this case, the motion information of the first prediction unit and the second prediction unit may be derived from merge candidates included in a merge candidate list. To distinguish between a general merge candidate list and a merge candidate list used to derive the motion information of prediction units, a merge candidate list for deriving the motion information of prediction units is referred to as a partitioning mode merge candidate list or a triangular merge candidate list. In addition, a merge candidate included in a partitioning mode merge candidate list is referred to as a partitioning mode merge candidate or a triangular merge candidate. But, applying the above-described method of deriving a merge candidate and the above-described method of constituting a merge candidate list to derive a partitioning mode merge candidate and to constitute a partitioning mode merge candidate list is also included in a scope of the preset disclosure.

Information for determining the maximum number of partitioning mode merge candidates which may be included in a partitioning mode merge candidate list may be signaled in a bitstream. The information may represent a difference between the maximum number of merge candidates which may be included in a merge candidate list and the maximum number of partitioning mode merge candidates which may be included in a partitioning mode merge candidate list.

A partitioning mode merge candidate may be derived from a spatial neighboring block and a temporal neighboring block of a coding block.

FIG. 30 is a diagram showing neighboring blocks used to derive a partitioning mode merge candidate.

A partitioning mode merge candidate may be derived by using at least one of a neighboring block positioned at the top of a coding block, a neighboring block positioned at the left of a coding block or a collocated block included in a picture different from a coding block. A top neighboring block may include at least one of a block including a sample (xCb+CbW−1, yCb−1) positioned at the top of a coding block, a block including a sample (xCb+CbW, yCb−1) positioned at the top of a coding block or a block including a sample (xCb−1, yCb−1) positioned at the top of a coding block. A left neighboring block may include at least one of a block including a sample (xCb−1, yCb+CbH−1) positioned at the left of a coding block or a block including a sample (xCb−1, yCb+CbH) positioned at the left of a coding block. A collocated block may be determined as one of a block including a sample (xCb+CbW, yCb+CbH) adjacent to the top-right corner of a coding block or a block including a sample (xCb/2, yCb/2) positioned at the center of a coding block in a collocated picture.

Neighboring blocks may be searched in a predefined order, and a partitioning mode merge candidate list may be configured with partitioning mode merge candidates according to the predefined order. In an example, a partitioning mode merge candidate may be searched in the order of B1, A1, B0, A0, C0, B2 and C1 to configure a partitioning mode merge candidate list.

The motion information of prediction units may be derived based on the partitioning mode merge candidate list. In other words, prediction units may share a single partitioning mode merge candidate list.

To derive the motion information of a prediction unit, information for specifying at least one of partitioning mode merge candidates included in a partitioning mode merge candidate list may be signaled in a bitstream. In an example, index information, merge_triangle_idx, for specifying at least one of partitioning mode merge candidates may be signaled in a bitstream.

Index information may specify a combination of a merge candidate of the first prediction unit and a merge candidate of the second prediction unit. In an example, the following table 3 is an example representing a combination of merge candidates according to index information, merge_triangle_idx.

TABLE 3

| merge_triangle_idx | 0 | 1 | 2 | 3 | 4 | 5 | 6 | 7 | 8 |
|---|---|---|---|---|---|---|---|---|---|
| First Prediction Unit | 1 | 0 | 0 | 0 | 2 | 0 | 0 | 1 | 3 |
| Second Prediction Unit | 0 | 1 | 2 | 1 | 0 | 3 | 4 | 0 | 0 |
| merge_triangle_idx | 9 | 10 | 11 | 12 | 13 | 14 | 15 | 16 | 17 |
| First Prediction Unit | 4 | 0 | 1 | 1 | 0 | 0 | 1 | 1 | 1 |
| Second Prediction Unit | 0 | 2 | 2 | 2 | 4 | 3 | 3 | 4 | 4 |
| merge_triangle_idx | 18 | 19 | 20 | 21 | 22 | 23 | 24 | 25 | 26 |
| First Prediction Unit | 1 | 2 | 2 | 2 | 4 | 3 | 3 | 3 | 4 |
| Second Prediction Unit | 3 | 1 | 0 | 1 | 3 | 0 | 2 | 1 | 0 |
| merge_triangle_idx | 27 | 28 | 29 | 30 | 31 | 32 | 33 | 34 | 35 |
| First Prediction Unit | 3 | 2 | 4 | 4 | 2 | 4 | 3 | 4 | 3 |
| Second Prediction Unit | 1 | 3 | 1 | 1 | 3 | 2 | 2 | 3 | 1 |
| merge_triangle_idx | 36 | | 37 | | 38 | | 39 | | |
| First Prediction Unit | 2 | | 2 | | 4 | | 3 | | |
| Second Prediction Unit | 4 | | 4 | | 2 | | 4 | | |

When a value of index information, merge_triangle_idx, is 1, it represents that the motion information of the first prediction unit is derived from a merge candidate whose index is 1 and the motion information of the second prediction unit is derived from a merge candidate whose index is 0. A partitioning mode merge candidate for deriving the motion information of the first prediction unit and a partitioning mode merge candidate for deriving the motion information of the second prediction unit may be determined by index information, merge_triangle_idx. It is also possible to determine based on the index information a partition type of a coding block to which diagonal partitioning is applied. In other words, index information may specify a combination of a merge candidate of the first prediction unit, a merge candidate of the second prediction unit and a partitioning direction of a coding block. When a partition type of a coding block is determined by index information, information, triangle_partition_type_flag, representing a direction of a diagonal line partitioning a coding block may not be encoded. Table 4 represents a partition type of a coding block for index information, merge_triangle_idx.

TABLE 4

| merge_triangle_idx | 0 | 1 | 2 | 3 | 4 | 5 | 6 | 7 | 8 |
|---|---|---|---|---|---|---|---|---|---|
| TriangleDir | 0 | 1 | 1 | 0 | 0 | 1 | 1 | 1 | 0 |
| merge_triangle_idx | 9 | 10 | 11 | 12 | 13 | 14 | 15 | 16 | 17 |
| TriangleDir | 0 | 0 | 0 | 1 | 0 | 0 | 0 | 0 | 1 |
| merge_triangle_idx | 18 | 19 | 20 | 21 | 22 | 23 | 24 | 25 | 26 |
| TriangleDir | 1 | 1 | 1 | 0 | 0 | 1 | 1 | 1 | 1 |
| merge_triangle_idx | 27 | 28 | 29 | 30 | 31 | 32 | 33 | 34 | 35 |
| TriangleDir | 1 | 1 | 1 | 0 | 0 | 1 | 0 | 1 | 0 |
| merge_triangle_idx | 36 | | 37 | | 38 | | 39 | | |
| TriangleDir | 0 | | 1 | | 0 | | 0 | | |

When a variable, TriangleDir, is 0, it represents that a left triangular partition type is applied to a coding block and when a variable, TriangleDir, is 1, it represents that a right triangular partition type is applied to a coding block. By combining Table 3 and Table 4, index information, merge_triangle_idx, may be set to specify a combination of a merge candidate of the first prediction unit, a merge candidate of the second prediction unit and a partitioning direction of a coding block. In another example, index information only for one of the first prediction unit and the second prediction unit may be signaled and an index of a merge candidate for the other of the first prediction unit and the second prediction unit may be determined based on the index information. In an example, a merge candidate of the first prediction unit may be determined based on index information, merge_triangle_idx, representing an index of one of partitioning mode merge candidates. And, a merge candidate of the second prediction unit may be specified based on the merge_triangle_idx. In an example, a merge candidate of the second prediction unit may be derived by adding or subtracting an offset to or from the index information, merge_triangle_idx. An offset may be an integer such as 1 or 2. In an example, a merge candidate of the second prediction unit may be determined as a partitioning mode merge candidate having a value obtained by adding 1 to merge_triangle_idx as an index. When merge_triangle_idx indicates a partitioning mode merge candidate with the largest index value among partitioning mode merge candidates, the motion information of the second prediction unit may be derived from a partitioning mode merge candidate whose index is 0 or a partitioning mode merge candidate having a value subtracting 1 from merge_triangle_idx as an index.

Alternatively, the motion information of the second prediction unit may be derived from a partitioning mode merge candidate with the same reference picture as a partitioning mode merge candidate of the first prediction unit specified by index information. In this case, a partitioning mode merge candidate with the same reference picture as a partitioning mode merge candidate of the first prediction unit may represent a partitioning mode merge candidate that at least one of a L0 reference picture or a L1 reference picture is the same as a partitioning mode merge candidate of the first prediction unit. When there are a plurality of partitioning mode merge candidates with the same reference picture as a partitioning mode merge candidate of the first prediction unit, any one may be selected based on at least one of whether a merge candidate includes bi-directional motion information or a difference value between an index of a merge candidate and index information.

In another example, index information may be signaled for each of the first prediction unit and the second prediction unit. In an example, the first index information, 1st_merge_idx, for determining a partitioning mode merge candidate of the first prediction unit, and the second index information, 2nd_merge_idx, for determining a partitioning mode merge candidate of the second prediction unit, may be signaled in a bitstream. The motion information of the first prediction unit may be derived from a partitioning mode merge candidate determined based on the first index information, 1st_merge_idx, and the motion information of the second prediction unit may be derived from a partitioning mode merge candidate determined based on the second index information, 2nd_merge_idx.

The first index information, 1st_merge_idx, may represent an index of one of partitioning mode merge candidates included in a partitioning mode merge candidate list. A partitioning mode merge candidate of the first prediction unit may be determined as a partitioning mode merge candidate indicated by the first index information, 1st_merge_idx.

A partitioning mode merge candidate indicated by the first index information, 1st_merge_idx, may be set to be unavailable as a partitioning mode merge candidate of the second prediction unit. Accordingly, the second index information of the second prediction unit, 2nd_merge_idx, may represent an index of any one of remaining partitioning mode merge candidates except for a partitioning mode merge candidate indicated by the first index information. When a value of the second index information, 2nd_merge_idx, is smaller than that of the first index information, 1st_merge_idx, a partitioning mode merge candidate of the second prediction unit may be determined as a partitioning mode merge candidate having index information represented by the second index information, 2nd_merge_idx. On the other hand, when a value of the second index information, 2nd_merge_idx, is the same as or greater than that of the first index information, 1st_merge_idx, a partitioning mode merge candidate of the second prediction unit may be determined as a partitioning mode merge candidate having a value obtained by adding 1 to a value of the second index information, 2nd_merge_idx, as an index.

Alternatively, according to the number of partitioning mode merge candidates included in a partitioning mode merge candidate list, whether the second index information is signaled or not may be determined. In an example, when the maximum number of partitioning mode merge candidates which may be included in a partitioning mode merge candidate list does not exceed 2, the signaling of the second index information may be omitted. When the signaling of the second index information is omitted, the second partitioning mode merge candidate may be derived by adding or subtracting an offset to or from the first index information. In an example, when the maximum number of partitioning mode merge candidates which may be included in a partitioning mode merge candidate list is 2 and the first index information indicates an index of 0, the second partitioning mode merge candidate may be derived by adding 1 to the first index information. Alternatively, when the maximum number of partitioning mode merge candidates which may be included in a partitioning mode merge candidate list is 2 and the first index information indicates 1, the second partitioning mode merge candidate may be derived by subtracting 1 from the first index information.

Alternatively, when the signaling of the second index information is omitted, the second index information may be inferred as a default value. In this case, a default value may be 0. The second partitioning mode merge candidate may be derived by comparing the first index information with the second index information. In an example, when the second index information is smaller than the first index information, a merge candidate whose index is 0 may be set as the second partitioning mode merge candidate and when the second index information is the same as or greater than the first index information, a merge candidate whose index is 1 may be set as the second partitioning mode merge candidate.

When a partitioning mode merge candidate has unidirectional motion information, the unidirectional motion information of a partitioning mode merge candidate may be set as the motion information of a prediction unit. On the other hand, when a partitioning mode merge candidate has bidirectional motion information, only one of L0 motion information or L1 motion information may be set as the motion information of a prediction unit. Which of L0 motion information or L1 motion information will be taken may be determined based on an index of a partitioning mode merge candidate or the motion information of the other prediction unit.

In an example, when an index of a partitioning mode merge candidate is an even number, the L0 motion information of a prediction unit may be set to be 0 and the L1 motion information of a partitioning mode merge candidate may be set as the L1 motion information of a prediction unit. On the other hand, when an index of a partitioning mode merge candidate is an odd number, the L1 motion information of a prediction unit may be set to be 0 and the L0 motion information of a partitioning mode merge candidate may be set to be 0. Conversely, when an index of a partitioning mode merge candidate is an even number, the L0 motion information of a partitioning mode merge candidate may be set as the L0 motion information of a prediction unit and when an index of a partitioning mode merge candidate is an odd number, the L1 motion information of a partitioning mode merge candidate may be set as the L1 motion information of a prediction unit. Alternatively, for a first prediction unit, the L0 motion information of a partitioning mode merge candidate may be set as the L0 motion information of the first prediction unit when a partitioning mode merge candidate for the first prediction unit is an even number, but, for a second prediction unit, the L1 motion information of a partitioning mode merge candidate may be set as the L1 motion information of the second prediction unit when a partitioning mode merge candidate for the second prediction unit is an odd number.

Alternatively, when the first prediction unit has L0 motion information, the L0 motion information of the second prediction unit may be set to be 0 and the L1 motion information of a partitioning mode merge candidate may be set as the L1 information of the second prediction unit. On the other hand, when the first prediction unit has L1 motion information, the L1 motion information of the second prediction unit may be set to be 0 and the L0 motion information of a partitioning mode merge candidate may be set as the L0 motion information of the second prediction unit.

A partitioning mode merge candidate list for deriving the motion information of the first prediction unit may be set to be different from a partitioning mode merge candidate list for deriving the motion information of the second prediction unit.

In an example, when a partitioning mode merge candidate for deriving the motion information of the first prediction unit in a partitioning mode merge candidate list is specified based on index information for the first prediction unit, the motion information of the second prediction unit may be derived by using a partitioning mode merge list including remaining partitioning mode merge candidates except for the partitioning mode merge candidate indicated by the index information. Concretely, the motion information of the second prediction unit may be derived from one of remaining partitioning mode merge candidates.

Accordingly, the maximum number of partitioning mode merge candidates included in a partitioning mode merge candidate list of the first prediction unit may be different from the maximum number of partitioning mode merge candidates included in a partitioning mode merge candidate list of the second prediction unit. In an example, when a partitioning mode merge candidate list of the first prediction unit includes M merge candidates, a partitioning mode merge candidate list of the second prediction unit may include M−1 merge candidates except for the partitioning mode merge candidate indicated by the index information of the first prediction unit.

In another example, the availability of a neighboring block may be determined by deriving a merge candidate of each prediction unit based on neighboring blocks adjacent to a coding block, but by considering a shape or a position of a prediction unit.

FIG. 31 is a diagram for explaining an example in which the availability of a neighboring block is determined per prediction unit.

A neighboring block which is not adjacent to the first prediction unit may be set to be unavailable for the first prediction unit and a neighboring block which is not adjacent to the second prediction unit may be set to be unavailable for the second prediction unit.

In an example, as in an example shown in FIG. 31 (a), when a left triangular partition type is applied to a coding block, blocks A1, A0 and A2 adjacent to the first prediction unit among neighboring blocks adjacent to a coding block may be determined to be available for the first prediction unit, but blocks B0 and B1 may be determined to be unavailable for the first prediction unit. Accordingly, a partitioning mode merge candidate list for the first prediction unit may include partitioning mode merge candidates derived from blocks A1, A0 and A2, but it may not include partitioning mode merge candidates derived from blocks B0 and B1.

As in an example shown in FIG. 31 (b), when a left triangular partition type is applied to a coding block, blocks B0 and B1 adjacent to the second prediction unit may be determined to be available for the second prediction unit, but blocks A1, A0 and A2 may be determined to be unavailable for the second prediction unit. Accordingly, a partitioning mode merge candidate list for the second prediction unit may include partitioning mode merge candidates derived from blocks B0 and B1, but it may not include partitioning mode merge candidates derived from blocks A1, A0 and A2.

Accordingly, the number of partitioning mode merge candidates which may be used by a prediction unit or a range of partitioning mode merge candidates may be determined based on at least one of a position of a prediction unit or a partition type of a coding block.

In another example, a merge mode may be applied to only one of the first prediction unit and the second prediction unit. And, the motion information of the other of the first prediction unit and the second prediction unit may be set the same as the motion information of a prediction unit to which the merge mode is applied or may be derived by refining the motion information of a prediction unit to which the merge mode is applied.

In an example, a motion vector and a reference picture index of the first prediction unit may be derived based on a partitioning mode merge candidate, and a motion vector of the second prediction unit may be derived by refining a motion vector of the first prediction unit. In an example, a motion vector of the second prediction unit may be derived by adding or subtracting a refine motion vector {Rx, Ry} to or from a motion vector of the first prediction unit, {mvD1LXx, mvD1LXy}. A reference picture index of the second prediction unit may be set the same as a reference picture index of the first prediction unit.

Information for determining a refine motion vector representing a difference between a motion vector of the first prediction unit and a motion vector of the second prediction unit may be signaled in a bitstream. The information may include at least one of information representing a size of a refine motion vector or information representing a sign of a refine motion vector.

Alternatively, a sign of a refine motion vector may be derived based on at least one of a position or an index of a prediction unit or a partition type which is applied to a coding block.

In another example, a motion vector and a reference picture index of one of the first prediction unit and the second prediction unit may be signaled. A motion vector of the other of the first prediction unit and the second prediction unit may be derived by refining the signaled motion vector.

In an example, based on information signaled in a bitstream, a motion vector and a reference picture index of the first prediction unit may be determined. And, a motion vector of the second prediction unit may be derived by refining a motion vector of the first prediction unit. In an example, a motion vector of the second prediction unit may be derived by adding or subtracting a refine motion vector {Rx, Ry} to or from a motion vector of the first prediction unit, {mvD1LXx, mvD1LXy}. A reference picture index of the second prediction unit may be set the same as a reference picture index of the first prediction unit.

In another example, a merge mode may be applied to only one of the first prediction unit and the second prediction unit. And, the motion information of the other of the first prediction unit and the second prediction unit may be derived based on the motion information of a prediction unit to which the merge mode is applied. In an example, a symmetric motion vector of a motion vector of the first prediction unit may be set as a motion vector of the second prediction unit. In this case, a symmetric motion vector may mean a motion vector which has the same magnitude as a motion vector of the first prediction unit, but has at least one opposite sign of an x-axis or a y-axis component, or a motion vector which has the same magnitude as a scaled vector obtained by scaling a motion vector of the first prediction unit, but has at least one opposite sign of an x-axis or a y-axis component. In an example, when a motion vector of the first prediction unit is (MVx, MVy), a motion vector of the second prediction unit may be set to be (MVx, −MVy), (−MVx, MVy) or (−MVx, −MVy) which is a symmetric motion vector of the motion vector.

A reference picture index of a prediction unit to which a merge mode is not applied among the first prediction unit and the second prediction unit may be set the same as a reference picture index of a prediction unit to which a merge mode is applied. Alternatively, a reference picture index of a prediction unit to which a merge mode is not applied may be set as a predefined value. In this case, a predefined value may be the smallest index or the largest index in a reference picture list. Alternatively, information specifying a reference picture index of a prediction unit to which a merge mode is not applied may be signaled in a bitstream. Alternatively, a reference picture of a prediction unit to which a merge mode is not applied may be selected from a reference picture list different from a reference picture list to which a reference picture of a prediction unit to which a merge mode is applied belongs. In an example, when a reference picture of a prediction unit to which a merge mode is applied is selected from an L0 reference picture list, a reference picture of a prediction unit to which a merge mode is not applied may be selected from an L1 reference picture list. In this case, a reference picture of a prediction unit to which a merge mode is not applied may be derived based on a picture order count (POC) difference between a reference picture of a prediction unit to which a merge mode is applied and a current picture. In an example, when a reference picture of a prediction unit to which a merge mode is applied is selected from a L0 reference picture list, a reference picture that a difference value with a current picture in a L1 reference picture list is the same as or similar to a difference value between a reference picture of a prediction unit to which a merge mode is applied and a current picture may be selected as a reference picture of a prediction unit to which a merge mode is not applied.

When a picture order count difference value between a reference picture of the first prediction unit and a current picture is different from a picture order count difference value between a reference picture of the second prediction unit and a current picture, a symmetric motion vector of a scaled motion vector of a prediction unit to which a merge mode is applied may be set as a motion vector of a prediction unit to which a merge mode is not applied. In this case, scaling may be performed based on a picture order count difference value between each reference picture and a current picture.

In another example, after deriving a motion vector of each of the first prediction unit and the second prediction unit, a refine vector may be added to or subtracted from a derived motion vector. In an example, a motion vector of the first prediction unit may be derived by adding or subtracting the first refine vector to or from the first motion vector derived based on the first merge candidate and a motion vector of the second prediction unit may be derived by adding or subtracting the second refine vector to or from the second motion vector derived based on the second merge candidate. Information for determining at least one of the first refine vector or the second refine vector may be signaled in a bitstream. The information may include at least one of information for determining a magnitude of a refine vector or information for determining a sign of a refine vector.

The second refine vector may be a symmetric motion vector of the first refine vector. In this case, information for determining a refine vector may be signaled only for one of the first refine vector and the second refine vector. In an example, when the first refine vector is determined to be (MVDx, MVDy) by information signaled in a bitstream, (−MVDx, MVDy), (MVDx, −MVDy) or (−MVDx, −MVDy) which is a symmetric motion vector of the first refine vector may be set as the second refine vector. According to the picture order count of a reference picture of each prediction unit, a symmetric motion vector of a scaled motion vector obtained by scaling the first refine vector may be set as the second refine vector.

In another example, information of one of the first prediction unit and the second prediction unit may be derived based on a merge candidate and the motion information of the other may be determined based on information signaled in a bitstream. In an example, a merge index may be signaled for the first prediction unit and at least one of information for determining a motion vector and information for determining a reference picture may be signaled for the second prediction unit. The motion information of the first prediction unit may be set the same as the motion information of a merge candidate specified by a merge index. The motion information of the second prediction unit may be specified by at least one of information for determining a motion vector signaled in a bitstream and information for determining a reference picture.

A motion prediction compensation prediction for each coding block may be performed based on the motion information of the first prediction unit and the motion information of the second prediction unit. In this case, quality degradation may be generated on the boundary of the first prediction unit and the second prediction unit. In an example, quality continuity may deteriorate around an edge on the boundary of the first prediction unit and the second prediction unit. To reduce quality degradation on the boundary, a prediction sample may be derived by a smoothing filter or a weighted prediction.

A prediction sample in a coding block to which diagonal partitioning is applied may be derived based on a weighted sum operation of the first prediction sample obtained based on the motion information of the first prediction unit and the second prediction sample obtained based on the motion information of the second prediction unit. Alternatively, a prediction sample of the first prediction unit may be derived from the first prediction block determined based on the motion information of the first prediction unit and a prediction sample of the second prediction unit may be derived from the second prediction block determined based on the motion information of the second prediction unit, but a prediction sample on the boundary region of the first prediction unit and the second prediction unit may be derived based on a weighted sum operation of the first prediction sample included in the first prediction block and the second prediction sample included in the second prediction block. In an example, the following Equation 3 represents an example of deriving a prediction sample of the first prediction unit and the second prediction unit.

$$P(x,y) = w1 * P1(x,y) + (1-w1) * P2(x,y) \quad \text{[Equation 3]}$$

In the Equation 3, P1 represents the first prediction sample and P2 represents the second prediction sample. w1 represents a weight which is applied to the first prediction sample and (1−w1) represents a weight which is applied to the second prediction sample. As in an example shown in Equation 3, a weight which is applied to the second prediction sample may be derived by subtracting a weight which is applied to the first prediction sample from a constant value.

When a left triangular partition type is applied to a coding block, a boundary region may include prediction samples with the same x-axis coordinate and y-axis coordinate. On the other hand, when a right triangular partition type is applied to a coding block, a boundary region may include prediction samples that a sum of an x-axis coordinate and a y-axis coordinate is equal to or greater than the first threshold value and is equal to or less than the second threshold value.

A size of a boundary region may be determined based on at least one of a size of a coding block, a shape of a coding block, the motion information of prediction units, a motion vector difference value of prediction units, a picture order count of a reference picture or a difference value between the first prediction sample and the second prediction sample on a diagonal boundary.

FIGS. 32 and 33 are diagrams showing an example in which a prediction sample is derived based on a weighted sum operation of the first prediction sample and the second prediction sample. FIG. 32 illustrates a case in which a left triangular partition type is applied to a coding block and FIG. 33 illustrates a case in which a right triangular partition type is applied to a coding block. In addition, FIG. 32 (a) and FIG. 33 (a) are diagrams representing a prediction aspect for a luma component and FIG. 32 (b) and the FIG. 33 (b) are diagrams representing a prediction aspect for a chroma component.

In shown diagrams, a number marked on a prediction sample around the boundary of the first prediction unit and the second prediction unit represents a weight which is applied to the first prediction sample. In an example, when a number marked on a prediction sample is N, the prediction sample may be derived by applying a weight of N/8 to the first prediction sample and applying a weight of (1−(N/8)) to the second prediction sample.

In a non-boundary region, the first prediction sample or the second prediction sample may be determined as a prediction sample. Looking at an example in FIG. 32, the first prediction sample derived based on the motion information of the first prediction unit may be determined as a prediction sample in a region belonging to the first prediction unit. On the other hand, the second prediction sample derived based on the motion information of the second prediction unit may be determined as a prediction sample in a region belonging to the second prediction unit.

Looking at an example in FIG. 33, the first prediction sample derived based on the motion information of the first prediction unit may be determined as a prediction sample in a region where a sum of an x-axis coordinate and a y-axis coordinate is smaller than the first threshold value. On the other hand, the second prediction sample derived based on the motion information of the second prediction unit may be determined as a prediction sample in a region where a sum of an x-axis coordinate and a y-axis coordinate is greater than the second threshold value.

A threshold value determining a non-boundary region may be determined based on at least one of a size of a coding block, a shape of a coding block or a color component. In an example, when a threshold value for a luma component is set to be N, a threshold value for a chroma component may be set to be N/2.

Prediction samples included in a boundary region may be derived based on a weighted sum operation of the first prediction sample and the second prediction sample. In this case, weights applied to the first prediction sample and the second prediction sample may be determined based on at least one of a position of a prediction sample, a size of a coding block, a shape of a coding block or a color component.

In an example, as in an example shown in FIG. 32 (a), prediction samples with the same x-axis coordinate and y-axis coordinate may be derived by applying the same weight to the first prediction sample and the second prediction sample. Prediction samples that an absolute value of a difference between an x-axis coordinate and a y-axis coordinate is 1 may be derived by setting a weight ratio applied to the first prediction sample and the second prediction sample as (3:1) or (1:3). In addition, prediction samples that an absolute value of a difference between an x-axis coordinate and a y-axis coordinate is 2 may be derived by setting a weight ratio applied to the first prediction sample and the second prediction sample as (7:1) or (1:7).

Alternatively, as in an example shown in FIG. 32 (b), prediction samples with the same x-axis coordinate and y-axis coordinate may be derived by applying the same weight to the first prediction sample and the second prediction sample and prediction samples that an absolute value of a difference between an x-axis coordinate and a y-axis coordinate is 1 may be derived by setting a weight ratio applied to the first prediction sample and the second prediction sample as (7:1) or (1:7).

In an example, as in an example shown in FIG. 33 (a), prediction samples that a sum of an x-axis coordinate and a y-axis coordinate is smaller than a width or a height of a coding block by 1 may be derived by applying the sample weight to the first prediction sample and the second prediction sample. Prediction samples that a sum of an x-axis coordinate and a y-axis coordinate is the same as or smaller than a width or a height of a coding block by 2 may be derived by setting a weight ratio applied to the first prediction sample and the second prediction sample as (3:1) or (1:3). Prediction samples that a sum of an x-axis coordinate and a y-axis coordinate is greater than a width or a height of a coding block by 1 or smaller than a width or a height of a coding block by 3 may be derived by setting a weight ratio applied to the first prediction sample and the second prediction sample as (7:1) or (1:7).

Alternatively, as in an example shown in FIG. 33 (b), prediction samples that a sum of an x-axis coordinate and a y-axis coordinate is smaller than a width or a height of a coding block by 1 may be derived by applying the sample weight to the first prediction sample and the second prediction sample. Prediction samples that a sum of an x-axis coordinate and a y-axis coordinate is the same as or smaller than a width or a height of a coding block by 2 may be derived by setting a weight ratio applied to the first prediction sample and the second prediction sample as (7:1) or (1:7).

In another example, a weight may be determined by considering a position of a prediction sample or a shape of a coding block. Equation 4 to Equation 6 represent an example in which a weight is derived when a left triangular partition type is applied to a coding block. Equation 4 represents an example of deriving a weight applied to the first prediction sample when a coding block is square.

$$w1=(x-y+4)/8 \quad \text{[Equation 4]}$$

In Equation 4, x and y represent a position of a prediction sample. When a coding block is non-square, a weight applied to the first prediction sample may be derived as in the following Equation 5 or Equation 6. Equation 5 represents a case in which a width of a coding block is greater than a height and Equation 6 represents a case in which a width of a coding block is smaller than a height.

$$w1=(x/whRatio)-y+4)/8 \quad \text{[Equation 5]}$$

$$w1=(x-(y*whRatio)+4)/8 \quad \text{[Equation 6]}$$

When a right triangular partition type is applied to a coding block, a weight applied to the first prediction sample may be determined as in Equation 7 to Equation 9. Equation 7 represents an example of deriving a weight applied to the first prediction sample when a coding block is square.

$$w1=(CbW-1-x-y)+4)/8 \quad \text{[Equation 7]}$$

In Equation 7, CbW represents a width of a coding block. When a coding block is non-square, a weight applied to the first prediction sample may be derived as in the following Equation 8 or Equation 9. Equation 8 represents a case in which a width of a coding block is greater than a height and Equation 9 represents a case in which a width of a coding block is smaller than a height.

$$w1=(CbH-1-(x/whRatio)-y)+4)/8 \quad \text{[Equation 8]}$$

$$w1=(CbW-1-x-(y*whRatio)+4)/8 \quad \text{[Equation 9]}$$

In Equation 8, CbH represents a height of a coding block.

As in a shown example, prediction samples included in the first prediction unit among prediction samples in a boundary region may be derived by giving a larger weight to the first prediction sample than the second prediction sample and prediction samples included in the second prediction unit among prediction samples in the boundary region may be derived by giving a larger weight to the second prediction sample than the first prediction sample.

When diagonal partitioning is applied to a coding block, a combined prediction mode that an intra prediction mode and a merge mode are combined may be set not to be applied to a coding block.

When encoding/decoding of a coding block is completed, the motion information of a coding block that encoding/decoding is completed may be stored for the encoding/decoding of a subsequent coding block. Motion information may be stored in a unit of a sub-block with a preset size. In an example, a sub-block with a preset size may have a 4×4 size. Alternatively, according to a size or a shape of a coding block, a size or a shape of a sub-block may be differently determined.

When a sub-block belongs to the first prediction unit, the motion information of the first prediction unit may be stored as the motion information of a sub-block. On the other hand, when a sub-block belongs to the second prediction unit, the motion information of the second prediction unit may be stored as the motion information of a sub-block.

When a sub-block is on the boundary of the first prediction unit and the second prediction unit, any one of the motion information of the first prediction unit and the motion information of the second prediction unit may be set as the motion information of a sub-block. In an example, the motion information of the first prediction unit may be set as the motion information of a sub-block or the motion information of the second prediction unit may be set as the motion information of a sub-block.

In another example, when a sub-block is on the boundary of the first prediction unit and the second prediction unit, any one of L0 motion information and L1 motion information of a sub-block may be derived from the first prediction unit and the other of L0 motion information and L1 motion information of a sub-block may be derived from the second prediction unit. In an example, the L0 motion information of the first prediction unit may be set as the L0 motion information of a sub-block and the L1 motion information of the second prediction unit may be set as the L1 motion information of a sub-block. But, when the first prediction unit and the second prediction unit have only L0 motion information or only L1 motion information, the motion information of a sub-block may be determined by selecting any one of the first prediction unit or the second prediction unit. Alternatively, a motion vector average value of the first prediction unit and the second prediction unit may be set as a motion vector of a sub-block.

The motion information of a coding block that encoding/decoding is completed may be updated in a motion information table. In this case, the motion information of a coding block to which prediction unit partitioning is applied may be set not to be added to a motion information table.

Alternatively, only the motion information of any one of a plurality of prediction units generated by partitioning a coding block may be added to a motion information table. In an example, while the motion information of the first prediction unit may be added to a motion information table, the motion information of the second prediction unit may not be added to a motion information table. In this case, a prediction unit which will be added to a motion information table may be selected based on at least one of a size of a coding block, a shape of a coding block, a size of a prediction unit, a shape of a prediction unit or whether a bidirectional prediction is performed for a prediction unit.

Alternatively, the motion information of each of a plurality of prediction units generated by partitioning a coding block may be added to a motion information table. In this case, the adding order for a motion information table may be predefined in an encoding device and a decoding device. In an example, the motion information of a prediction unit including a top-left sample or a bottom-left corner sample may be added to a motion information table before the motion information of the other prediction unit. Alternatively, the adding order for a motion information table may be determined based on at least one of a merge index or a reference picture index of each prediction unit or a magnitude of a motion vector.

Alternatively, motion information combining the motion information of the first prediction unit and the motion information of the second prediction unit may be added to a motion information table. Any one of L0 motion information and L1 motion information of combined motion information may be derived from the first prediction unit and the other of L0 motion information and L1 motion information may be derived from the second prediction unit.

Alternatively, based on whether a reference picture of the first prediction unit is the same as a reference picture of the second prediction unit, motion information which will be added to a motion information table may be determined. In an example, when a reference picture of the first prediction unit is different from a reference picture of the second prediction unit, the motion information of any one of the first prediction unit and the second prediction unit or motion information combining the first prediction unit and the second prediction unit may be added to a motion information table. On the other hand, when a reference picture of the first prediction unit is the same as a reference picture of the second prediction unit, an average of a motion vector of the first prediction unit and a motion vector of the second prediction unit may be added to a motion information table.

Alternatively, based on a size of a coding block, a shape of a coding block or a partitioning shape of a coding block, a motion vector which will be added to a motion information table may be determined. In an example, when right triangular partitioning is applied to a coding block, the motion information of the first prediction unit may be added to a motion information table. On the other hand, when left triangular partitioning is applied to a coding block, the motion information of the second prediction unit may be added to a motion information table or motion information combining the motion information of the first prediction unit and the motion information of the second prediction unit may be added to a motion information table.

A motion information table for storing the motion information of a coding block to which prediction unit partitioning is applied may be separately defined. In an example, the motion information of a coding block to which prediction unit partitioning is applied may be stored in a partitioning mode motion information table. A partitioning mode motion information table may be referred to as a triangular motion information table. In other words, the motion information of a coding block to which prediction unit partitioning is not applied may be stored in a general motion information table and the motion information of a coding block to which prediction unit partitioning is applied may be stored in a partitioning mode motion information table. Embodiments that motion information of a coding block to which prediction unit partitioning described above is applied is added to a motion information table may be applied for updating a partitioning mode motion information table. In an example, the motion information of the first prediction unit, the motion information of the second prediction unit, motion information combining the motion information of the first prediction unit and the motion information of the second prediction unit and motion information averaging a motion vector of the first prediction unit and a motion vector of the second prediction unit may be added to a partitioning mode motion information table.

When prediction mode partitioning is not applied to a coding block, a merge candidate may be derived by using a general motion information table. On the other hand, when prediction mode partitioning is applied to a coding block, a merge candidate may be derived by using a prediction mode motion information table.

When a merge candidate of a current block is selected, a motion vector of a selected merge candidate may be set as an initial motion vector and motion compensation prediction for a current block may be performed by using a motion vector derived by adding or subtracting an offset vector to or from an initial motion vector. A method of deriving a new motion vector by adding or subtracting an offset vector to or from a motion vector of a merge candidate may be defined as a merge offset vector encoding method.

Information representing whether a merge offset encoding method will be used may be signaled in a bitstream. The information may be a 1-bit flag, merge_offset_vector_flag. In an example, when a value of merge_offset_vector_flag is 1, it represents that a merge offset vector encoding method is applied to a current block. When a merge offset vector encoding method is applied to a current block, a motion vector of a current block may be derived by adding or subtracting an offset vector to or from a motion vector of a merge candidate. When a value of merge_offset_vector_flag is 0, it represents that a merge offset vector encoding method is not applied to a current block. When a merge offset encoding method is not applied, a motion vector of a merge candidate may be set as a motion vector of a current block.

The flag may be signaled only when a value of a skip flag representing whether a skip mode is applied is true or when a value of a merge flag representing whether a merge mode is applied is true. In an example, when a value of skip flag representing that a skip mode is applied to a current block is 1 or when a value of merge_flag representing that a merge mode is applied to a current block is 1, merge_offset_vector_flag may be encoded and signaled.

When a merge offset encoding method is determined to be applied to a current block, at least one of information specifying any one of merge candidates included in a merge candidate list, information representing a magnitude of an offset vector or information representing a direction of an offset vector may be additionally signaled.

Information for determining the maximum number of merge candidates which may be included in a merge candidate list may be signaled in a bitstream. In an example, the maximum number of merge candidates which may be included in a merge candidate list may be set as a natural number equal to or less than 6.

When a merge offset encoding method is determined to be applied to a current block, only the preset maximum number of merge candidates may be set as an initial motion vector of a current block. In other words, according to whether a merge offset encoding method is applied, the number of merge candidates which are available to a current block may be adaptively determined. In an example, when a value of merge_offset_vector_flag is set to be 0, the maximum number of merge candidates which are available to a current block may be set to be M, but when a value of merge_offset_vector_flag is set to 1, the maximum number of merge candidates which are available to a current block may be set to be N. In this case, M represents the maximum number of merge candidates which may be included in a merge candidate list and N represents a natural number which is the same as or smaller than M.

In an example, when M is 6 and N is 2, two merge candidates with the smallest index among merge candidates included in a merge candidate list may be set to be available for a current block. Accordingly, a motion vector of a merge candidate that an index value is 0 or a motion vector of a merge candidate that an index value is 1 may be set as an initial motion vector of a current block. When M and N are the same (e.g., when M and N are 2), all merge candidates included in a merge candidate list may be set to be available for a current block.

Alternatively, whether a neighboring block is available as a merge candidate may be determined based on whether a merge offset vector encoding method is applied to a current block. In an example, when a value of merge_offset_vector_flag is 1, at least one of a neighboring block adjacent to the top-right corner of a current block, a neighboring block adjacent to the bottom-left corner or a neighboring block adjacent to the bottom-left corner may be set to be unavailable as a merge candidate. Accordingly, when a merge offset vector encoding method is applied to a current block, a motion vector of at least one of a neighboring block adjacent to the top-right corner of a current block, a neighboring block adjacent to the bottom-left corner or a neighboring block adjacent to the bottom-left corner may not be set as an initial motion vector. Alternatively, when a value of merge_offset_vector_flag is 1, a temporal neighboring block of a current block may be set to be unavailable as a merge candidate.

When a merge offset vector encoding method is applied to a current block, it may be set not to use at least one of a pairwise merge candidate or a zero merge candidate. Accordingly, when a value of merge_offset_vector_flag is 1, at least one of a pairwise merge candidate or a zero merge candidate may not be added to a merge candidate list although the number of merge candidates included in a merge candidate list is smaller than the maximum number.

A motion vector of a merge candidate may be set as an initial motion vector of a current block. In this case, when the number of merge candidates which is available to a current block is plural, information specifying any one of a plurality of merge candidates may be signaled in a bitstream. In an example, when the maximum number of merge candidates which may be included in a merge candidate list is greater than 1, information, merge_idx, indicating one of a plurality of merge candidates may be signaled in a bitstream. In other words, a merge candidate may be specified by information, merge_idx, for specifying one of a plurality of merge candidates in a merge offset encoding method. An initial motion vector of a current block may be set as a motion vector of a merge candidate indicated by merge_idx.

On the other hand, when the number of merge candidates which is available to a current block is 1, signaling of information for specifying a merge candidate may be omitted. In an example, when the maximum number of merge candidates which may be included in a merge candidate list is not larger than 1, signaling of information, merge_idx, for specifying a merge candidate may be omitted. In other words, in a merge offset encoding method, when 1 merge candidate is included in a merge candidate list, encoding of information, merge_idx, for specifying a merge candidate may be omitted and an initial motion vector may be determined based on a merge candidate included in a merge candidate list. A motion vector of the merge candidate may be set as an initial motion vector of a current block.

In another example, after determining a merge candidate of a current block, whether a merge offset vector encoding method will be applied to a current block may be determined. In an example, when the maximum number of merge candidates which may be included in a merge candidate is larger than 1, information, merge_idx, for specifying one of merge candidates, may be signaled. After selecting a merge candidate based on merge_idx, merge_offset_vector_flag representing whether a merge offset vector encoding method is applied to a current block may be decoded. Table 3 is a diagram representing a syntax table according to the above-described embodiment.

TABLE 5

| | Descriptor |
|---|---|
| coding_unit ( x0, y0, cbWidth, cbHeight, treeType ) { | |
|   if( slice_type != I ) { | |
|     cu_skip_flag[ x0 ][ y0 ] | ae(v) |
|     if( cu_skip_flag[ x0 ][ y0 ] = = 0 ) | |
|       pred_mode_flag | ae(v) |
|   } | |
|   if( CuPredMode[ x0 ] [ y0 ] = = MODE_INTRA ) { | |
|     if( treeType = = SINGLE_TREE \|\| treeType = = DUAL_TREE_LUMA ) { | |
|       intra_luma_mpm_flag[ x0 ][ y0 ] | |
|       if( intra_luma_mpm_flag[ x0 ][ y0] ) | |
|         intra_luma_mpm_idx[ x0 ][ y0 ] | ae(v) |
|       else | |
|         intra_luma_mpm_remainder[ x0 ][ y0 ] | ae(v) |
|     } | |
|     if( treeType = = SINGLE_TREE \|\| treeType = = DUAL_TREE_CHROMA ) | |
|       intra_chroma_pred_mode[ x0 ][ y0 ] | ae(v) |
|   } else { /* MODE_INTER */ | |
|     if( cu_skip_flag[ x0 ][ y0 ] ) { | |
|       if( merge_affine_flag[ x0 ][ y0 ]  = =  0  && MaxNumMergeCand > 1 ) { | |
|         merge_idx[ x0 ][ y0 ] | ae(v) |

TABLE 5-continued

| | Descriptor |
|---|---|
| merge_offset_vector_flag | ae(v) |
| if (merge_idx < 2 && merge_offset_vector_flag) { | |
|     distance_idx[ x0 ][ y0 ] | ae(v) |
|     direction_idx[ x0 ][ y0 ] | ae(v) |
|     } | |
| } | |
| } else { | |
|   merge_flag[ x0 ][ y0 ] | ae(v) |
|   if( merge_flag[ x0 ][ y0 ] ) { | |
|     if( merge_affine_flag[ x0 ][ y0 ] == 0 && MaxNumMergeCand > 1 ) { | |
|       merge_idx[ x0 ][ y0 ] | ae(v) |
|       merge_offset_vector_flag | ae(v) |
|       if (merge_idx < 2 && merge_offset_vector_flag) { | |
|         distance_idx[ x0 ][ y0 ] | ae(v) |
|         direction_idx[ x0 ][ y0 ] | ae(v) |
|       } | |
| } | |
|   } else { | |
|     if( slice_type = = B ) | |
|       inter_pred_idc[ x0 ][ y0 ] | ae(v) |
|     if( sps_affine_enabled_flag && cbWidth >= 16 && cbHeight >= 16 ) { | |
|       inter_affine_flag[ x0 ][ y0 ] | ae(v) |
|       if( sps_affine_type_flag && inter_affine_flag[ x0 ][ y0 ] ) | |
|         cu_affine_type_flag[ x0 ][ y0 ] | ae(v) |
|     } | |
| } | |

In another example, after determining a merge candidate of a current block, whether a merge offset vector encoding method will be applied to a current block may be determined only when an index of a determined merge candidate is smaller than the maximum number of merge candidates which is available under a merge offset vector encoding method. In an example, only when a value of index information, merge_idx, is smaller than N, merge_offset_vector_flag representing whether a merge offset vector encoding method will be applied to a current block may be encoded and signaled. When a value of index information, merge_idx, is the same as or greater than N, encoding of merge_offset_vector_flag may be omitted. When encoding of merge_offset_vector_flag is omitted, a merge offset vector encoding method may be set not to be applied to a current block. Alternatively, after determining a merge candidate of a current block, whether a merge offset vector encoding method will be applied to a current block may be determined by considering whether a determined merge candidate has bidirectional motion information or unidirectional motion information. In an example, only when a value of index information, merge_idx, is smaller than N and a merge candidate selected by the index information has bidirectional motion information, merge_offset_vector_flag representing whether a merge offset vector encoding method will be applied to a current block may be encoded and signaled. Alternatively, only when a value of index information, merge_idx, is smaller than N and a merge candidate selected by the index information has unidirectional motion information, merge_offset_vector_flag representing whether a merge offset vector encoding method will be applied to a current block may be encoded and signaled.

Alternatively, whether a merge offset vector encoding method will be applied may be determined based on at least one of a size or a shape of a current block or whether a current block adjoins the boundary of a coding tree unit. When at least one of a size or a shape of a current block or whether a current block adjoins the boundary of a coding tree unit does not satisfy a preset condition, encoding of merge_offset_vector_flag representing whether a merge offset vector encoding method will be applied to a current block may be omitted.

When a merge candidate is selected, a motion vector of a merge candidate may be set as an initial motion vector of a current block. And, an offset vector may be determined by decoding information representing a magnitude of an offset vector and information representing a direction of an offset vector. An offset vector may have a horizontal directional component or a vertical directional component.

Information representing a magnitude of an offset vector may be index information representing one of vector magnitude candidates. In an example, distance_idx, index information representing one of vector magnitude candidates, may be signaled in a bitstream. Table 4 represents the binarization of index information, distance_idx, and a value of a variable, DistFromMergeMV, for determining a magnitude of an offset vector according to distance_idx.

TABLE 6

| distance_idx[x][y] | binarization | DistFromMergeMV[x0][y0] |
|---|---|---|
| 0 | 0 | 1 |
| 1 | 10 | 2 |
| 2 | 110 | 4 |
| 3 | 1110 | 8 |
| 4 | 11110 | 16 |
| 5 | 111110 | 32 |
| 6 | 1111110 | 64 |
| 7 | 1111111 | 128 |

A magnitude of an offset vector may be derived by dividing a variable, DistFromMergeMV, by a preset value. Equation 10 represents an example of determining a magnitude of an offset vector.

$$\text{abs}(\text{offset}MV) = \text{DistFromMerge}MV << 2 \quad \text{[Equation 10]}$$

According to the Equation 10, a value obtained by dividing a variable, DistFromMergeMV, by 4 or a value obtained by bit shifting a variable, DistFromMergeMV, to the left by 2 may be set as a magnitude of an offset vector.

It is possible to use more vector magnitude candidates or less vector magnitude candidates than an example shown in Table 6 or to set a range of motion vector offset magnitude candidates to be different from an example shown in Table 6. In an example, a size of a horizontal directional component or a vertical directional component of an offset vector may be set to be not larger than a sample distance 2. Table 7 represents the binarization of index information, distance_idx, and a value of DistFromMergeMV, a variable for determining a size of an offset vector according to distance_idx.

TABLE 7

| distance_idx[x][y] | binarization | DistFromMergeMV[x0][y0] |
|---|---|---|
| 0 | 0 | 1 |
| 1 | 10 | 2 |
| 2 | 110 | 4 |
| 3 | 111 | 8 |

Alternatively, based on motion vector precision, a range of motion vector offset magnitude candidates may be differently set. In an example, when motion vector precision for a current block is a decimal-pel (fractional-pel), values of a variable, DistFromMergeMV, corresponding to values of index information, distance_idx, may be set to be 1, 2, 4, 8, 16, etc. In this case, a decimal pel includes at least one of a 1/16 pel, an octo-pel, a quarter-pel or a half-pel. On the other hand, when motion vector precision for a current block is an integer-pel, values of a variable DistFromMergeMV, corresponding to values of index information, distance_idx, may be set to be 4, 8, 16, 32, 64, etc. In other words, according to motion vector precision for a current block, a table referenced to determine a variable, DistFromMergeMV, may be differently set. In an example, when the motion vector precision of a current block or a merge candidate is a quarter-pel, a variable, DistFromMergeMV, indicated by distance_idx, may be derived by using Table 6. On the other hand, when the motion vector precision of a current block or a merge candidate is an integer-pel, a value multiplying a value of a variable, DistFromMergeMV, indicated by distance_idx in Table 6, by N times (e.g., 4 times) may be derived as a value of DistFromMergeMV.

Information for determining motion vector precision may be signaled in a bitstream. In an example, the information may be signaled at a sequence, a picture, a slice or a block level. Accordingly, a range of vector magnitude candidates may be set differently by information related to motion vector precision signaled in a bitstream. Alternatively, based on a merge candidate of a current block, motion vector precision may be determined. In an example, the motion vector precision of a current block may be set the same as the motion vector precision of a merge candidate.

Alternatively, information for determining a search range of an offset vector may be signaled in a bitstream. At least one of the number of vector magnitude candidates, the minimum value or the maximum number of vector magnitude candidates may be determined based on a search range. In an example, a flag, merge_offset_vector_flag, for determining a search range of an offset vector may be signaled in a bitstream. The information may be signaled in a sequence header, a picture header or a slice header.

In an example, when a value of merge_offset_extend_range_flag is 0, a magnitude of an offset vector may be set not to exceed 2. Accordingly, the maximum value of DistFromMergeMV may be set to be 8. On the other hand, when a value of merge_offset_extend_range_flag is 1, a magnitude of an offset vector may be set not to exceed a sample distance 32. Accordingly, the maximum value of DistFromMergeMV may be set to be 128.

A magnitude of an offset vector may be determined by using a flag representing whether a magnitude of an offset vector is greater than a threshold value. In an example, a flag, distance_flag, representing whether a magnitude of an offset vector is greater than a threshold value, may be signaled in a bitstream. A threshold value may be 1, 2, 4, 8 or 16. In an example, when distance_flag is 1, it represents that a magnitude of an offset vector is greater than 4. On the other hand, when distance_flag is 0, it represents that a magnitude of an offset vector is equal to or less than 4.

When a magnitude of an offset vector is greater than a threshold value, a difference value between a magnitude of an offset vector and a threshold value may be derived by using index information, distance_idx. Alternatively, when a magnitude of an offset vector is equal to or less than a threshold value, a magnitude of an offset vector may be determined by using index information, distance_idx. Table 8 is a syntax table representing an encoding aspect of distance_flag and distance_idx.

TABLE 8

| | Descriptor |
|---|---|
| coding_unit ( x0, y0, cbWidth, cbHeight, treeType ) { | |
|   if( slice_type != I ) { | |
|     cu_skip_flag[ x0 ][ y0 ] | ae(v) |
|     if( cu_skip_flag[ x0 ][ y0 ] = = 0 ) | |
|       pred_mode_flag | ae(v) |
|   } | |
|   if( CuPredMode[ x0 ][ y0 ] = = MODE_INTRA ) { | |
|     if( treeType = = SINGLE_TREE || treeType = = DUAL_TREE_LUMA ) { | |
|       intra_luma_mpm_flag[ x0 ][ y0 ] | |
|       if( intra_luma_mpm_flag[ x0 ][ y0 ] ) | |
|         intra_luma_mpm_idx[ x0 ][ y0 ] | ae(v) |
|       else | |
|         intra_luma_mpm_remainder[ x0 ][ y0 ] | ae(v) |
|     } | |
|     if( treeType = = SINGLE_TREE || treeType = = DUAL_TREE_CHROMA ) | |
|       intra_chroma_pred_mode[ x0 ][ y0 ] | ae(v) |
|   } else { /* MODE_INTER */ | |
|     if( cu_skip_flag[ x0 ][ y0 ] ) { | |
|       if( merge_affine_flag[ x0 ][ y0 ] = = 0 && MaxNumMergeCand > 1 ) { | |
|         merge_idx[ x0 ][ y0 ] | ae(v) |
|         merge_offset_vector_flag | ae(v) |
|         if (merge_idx < 2 && merge_offset_vector_flag) { | |
|           distance_flag[ x0 ][ y0 ] | ae(v) |
|           distance_idx[ x0 ][ y0 ] | |
|           direction_idx[ x0 ][ y0 ] | ae(v) |
|         } | |
|       } | |
|     } else { | |
|       merge_flag[ x0 ][ y0 ] | ae(v) |
|       if( merge_flag[ x0 ][ y0 ] ) { | |
|         if( merge_affine_flag[ x0 ][ y0 ] = = 0 && MaxNumMergeCand > 1 ) { | |
|           merge_idx[ x0 ][ y0 ] | ae(v) |
|           merge_offset_vector_flag | ae(v) |

TABLE 8-continued

| | Descriptor |
|---|---|
|       if (merge_idx < 2 && merge_offset_vector_flag) { | |
|         distance_flag[ x0 ][ y0 ] | ae(v) |
|         distance_idx[ x0 ][ y0 ] | ae(v) |
|         direction_idx[ x0 ][ y0 ] | ae(v) |
|       } | |
| } | |
|     } else { | |
|       if( slice_type = = B ) | |
|         inter_pred_idc[ x0 ][ y0 ] | ae(v) |
|       if( sps_affine_enabled_flag  &&  cbWidth >= 16  && cbHeight >= 16 ) { | |
|         inter_affine_flag[ x0 ][ y0 ] | ae(v) |
|         if(  sps_affine_type_flag  && inter_affine_flag[ x0 ][ y0 ] ) | |
|           cu_affine_type_flag[ x0 ][ y0 ] | ae(v) |
|       } | |
| } | |

Equation 11 represents an example of deriving a variable, DistFromMYergeMV, for determining a magnitude of an offset vector, by using distance_flag and distance_idx.

$$\text{DistFromMerge}MV = N^* \text{distance\_flag} + (1 << \text{distance\_idx}) \qquad \text{[Equation 11]}$$

In Equation 11, a value of distance_flag may be set to be 1 or 0. A value of distance_idx may be set to be 1, 2, 4, 8, 16, 32, 64, 128, etc. N represents a coefficient determined by a threshold value. In an example, when a threshold value is 4, N may be set to be 16.

Information representing a direction of an offset vector may be index information representing one of vector direction candidates. In an example, index information, direction_idx, representing one of vector direction candidates may be signaled in a bitstream. Table 9 represents the binarization of index information, direction_idx, and a direction of an offset vector according to direction_idx.

TABLE 9

| direction_idx[x][y] | binarization | sign[x][y][0] | sign[x][y][1] |
|---|---|---|---|
| 0 | 00 | +1 | 0 |
| 1 | 01 | −1 | 0 |
| 2 | 10 | 0 | +1 |
| 3 | 11 | 0 | −1 |

In Table 9, sign[0] represents a horizontal direction and sign[1] represents a vertical direction. +1 represents that a value of a x component or a y component of an offset vector is positive and −1 represents that a value of a x component or a y component of an offset vector is negative. Equation 12 represents an example in which an offset vector is determined based on a magnitude and a direction of an offset vector.

$$\text{offset}MV[0] = \text{abs}(\text{offset}MV)^* \text{sign}[0]$$

$$\text{offset}MV[1] = \text{abs}(\text{offset}MV)^* \text{sign}[1] \qquad \text{[Equation 12]}$$

In Equation 12, offsetMV[0] represents a vertical directional component of an offset vector and offsetMV[1] represents a horizontal directional component of an offset vector.

FIG. 34 is a diagram showing an offset vector according to a value of distance_idx showing a magnitude of an offset vector and direction_idx showing a direction of an offset vector.

As in an example shown in FIG. 34, a magnitude and a direction of an offset vector may be determined according to a value of distance_idx and direction_idx. The maximum magnitude of an offset vector may be set not to exceed a threshold value. In this case, a threshold value may have a predefined value in an encoding device and a decoding device. In an example, a threshold value may be a sample distance 32. Alternatively, according to a size of an initial motion vector, a threshold value may be determined. In an example, a threshold value for a horizontal direction may be set based on a magnitude of a horizontal directional component of an initial motion vector and a threshold value for a vertical direction may be set based on a magnitude of a vertical directional component of an initial motion vector.

When a merge candidate has bidirectional motion information, an L0 motion vector of a merge candidate may be set as an L0 initial motion vector of a current block and an L1 motion vector of a merge candidate may be set as an L1 initial motion vector of a current block. In this case, an L0 offset vector and an L1 offset vector may be determined by considering a picture order count difference value between an L0 reference picture of a merge candidate and a current picture (hereinafter, referred to as an L0 difference value) and a picture order count difference value between an L1 reference picture of a merge candidate and a current picture (hereinafter, referred to as an L1 difference value).

First, when a sign of an L0 difference value is the same as a sign of an L1 difference value, an L0 offset vector and an L1 offset vector may be set to be the same. On the other hand, when a sign of an L0 difference value is different from a sign of an L1 difference value, an L1 offset vector may be set in a direction opposite to an L0 offset vector.

A magnitude of an L0 offset vector may be set the same as a magnitude of an L1 offset vector. Alternatively, a magnitude of an L1 offset vector may be determined by scaling an L0 offset vector based on an L0 difference value and an L1 difference value.

In an example, Equation 13 represents an L0 offset vector and an L1 offset vector when a sign of an L0 difference value and an sign of a L1 difference value are the same.

$$\text{offset}MVL0[0] = \text{abs}(\text{offset}MV)^* \text{sign}[0]$$

$$\text{offset}MVL0[1] = \text{abs}(\text{offset}MV)^* \text{sign}[1]$$

$$\text{offset}MVL1[0] = \text{abs}(\text{offset}MV)^* \text{sign}[0]$$

$$\text{offset}MVL1[1] = \text{abs}(\text{offset}MV)^* \text{sign}[1] \qquad \text{[Equation 13]}$$

In Equation 13, offsetMVL0 [0] represents a horizontal directional component of an L0 offset vector and offsetMVL0 [1] represents a vertical directional component of an L0 offset vector. offsetMVL1[0] represents a horizontal directional component of an L1 offset vector and offsetMVL1[1] represents a vertical directional component of an L1 offset vector.

Equation 14 represents an L0 offset vector and an L1 offset vector when a sign of an L0 difference value and a sign of an L1 difference value are different.

$$offseMVL0[0]=abs(\text{offsetMV})*sign[0]$$

$$offsetMVL0[1]=abs(\text{offsetMV})*sign[1]$$

$$offsetMVL1[0]*=-1*abs(\text{offsetMV})*sign[0]$$

$$offsetMVL1[1]=-1*abs(\text{offsetMV})*sign[1] \quad \text{[Equation 14]}$$

Four or more vector direction candidates may be defined. Table 10 and Table 11 represent an example in which 8 vector direction candidates are defined.

TABLE 10

| direction_idx[x][y] | binarization | sign[x][y][0] | sign[x][y][1] |
|---|---|---|---|
| 0 | 000 | +1 | 0 |
| 1 | 001 | −1 | 0 |
| 2 | 010 | 0 | +1 |
| 3 | 011 | 0 | −1 |
| 4 | 100 | +1 | +1 |
| 5 | 101 | +1 | −1 |
| 6 | 110 | −1 | +1 |
| 7 | 111 | −1 | −1 |

TABLE 11

| direction_idx[x][y] | binarization | sign[x][y][0] | sign[x][y][1] |
|---|---|---|---|
| 0 | 000 | +1 | 0 |
| 1 | 001 | −1 | 0 |
| 2 | 010 | 0 | +1 |
| 3 | 011 | 0 | −1 |
| 1 | 100 | +½ | +½ |
| 5 | 101 | +½ | −½ |
| 6 | 110 | −½ | +½ |
| 7 | 111 | −½ | −½ |

In Table 10 and Table 11, when an absolute value of sign [0] and sign[1] is greater than 0, it represents that an offset vector has a diagonal direction. While a size of an x-axis and a y-axis component of an offset vector in a diagonal direction may be set to be abs(offsetMV) when Table 9 is used, a size of an x-axis and a y-axis component of an offset vector in a diagonal direction may be set to be abs(offsetMV/2) when Table 10 is used.

FIG. 35 is a diagram showing an offset vector according to a value of distance_idx showing a magnitude of an offset vector and direction_idx showing a direction of an offset vector.

FIG. 35 (a) is an example of a case in which Table 9 is applied and FIG. 35 (b) is an example of a case in which Table 10 is applied.

Information for determining at least one of the number or a size of vector direction candidates may be signaled in a bitstream. In an example, a flag, merge_offset_direction_range_flag, for determining vector direction candidates, may be signaled in a bitstream. The flag may be signaled at a sequence, a picture or a slice level. In an example, when a value of the flag is 0, four vector direction candidates illustrated in Table 9 may be used. On the other hand, when a value of the flag is 1, eight vector direction candidates illustrated in Table 10 or Table 11 may be used.

Alternatively, based on a magnitude of an offset vector, at least one of the number or a size of vector direction candidates may be determined. In an example, when a value of a variable, DistFromMergeMV, for determining a magnitude of an offset vector is the same as or smaller than a threshold value, eight vector direction candidates illustrated in Table 10 or Table 11 may be used. On the other hand, when a value of a variable, DistFromMergeMV, is greater than a threshold value, four vector direction candidates illustrated in Table 9 may be used.

Alternatively, based on an x-component value of an initial motion vector, MVx, and a y-component value of an initial motion vector, MVy, at least one of the number or a size of vector direction candidates may be determined. In an example, when a difference between MVx and MVy or an absolute value of a difference is equal to or less than a threshold value, eight vector direction candidates illustrated in Table 10 or Table 11 may be used. On the other hand, when a difference between MVx and MVy or an absolute value of a difference is greater than a threshold value, four vector direction candidates illustrated in Table 9 may be used.

A motion vector of a current block may be derived by adding an offset vector to an initial motion vector. Equation 15 represents an example in which a motion vector of a current block is determined.

$$mvL0[0]=mergeMVL0[0]+\text{offset}MVL0[0]$$

$$mvL0[1]=mergeMVL0[1]+\text{offset}MVL0[1]$$

$$mvL1[0]=mergeMVL1[0]+\text{offset}MVL1[0]$$

$$mvL1[1]=mergeMVL1[1]+\text{offset}MVL1[1] \quad \text{[Equation 15]}$$

In Equation 15, mvL0 represents an L0 motion vector of a current block and mvL1 represents an L1 motion vector of a current block. mergeMVL0 represents an L0 initial motion vector of a current block (i.e., an L0 motion vector of a merge candidate) and mergeMVL1 represents an L1 initial motion vector of a current block. [0] represents a horizontal directional component of a motion vector and [1] represents a vertical directional component of a motion vector.

An affine seed vector derived based on an affine merge mode or an affine motion vector prediction mode or a motion vector of a sub-block (a sub-block motion vector or an affine sub-block vector) may be updated based on an offset vector. Concretely, an updated affine seed vector or an updated sub-block motion vector may be derived by adding or subtracting an offset to or from an affine seed vector or a motion vector of a sub-block. When an affine seed vector or a motion vector of a sub-block is refined in an affine motion model, it may be referred to as an affine merge offset encoding method.

When an affine motion model is applied to a coding block and a value of a flag, merge_offset_vector_flag, representing whether a merge offset encoding method is used is 1, an affine merge offset encoding method may be applied to a coding block.

When an affine merge offset encoding method is determined to be applied, a merge index (merge_idx) for determining an initial motion vector of a current block, index information, distance_idx, for determining a magnitude of an offset vector, and index information, direction_idx, for determining a direction of an offset vector may be signaled.

Index information, distance_idx, for determining a magnitude indicates one of a plurality of magnitude candidates and index information, direction_idx, for determining a direction indicates one of a plurality of direction candidates. Based on index information, distance_idx, for determining a magnitude, and index information, direction_idx, for determining a direction, an offset vector (offsetAffice[0], offsetAffine[1]) may be determined.

An updated affine seed vector may be derived by adding or subtracting an offset vector to or from an affine seed vector. In this case, a sign of an offset vector applied to each affine seed vector may be determined according to a direction of a reference picture. In an example, when a bidirectional prediction is applied to a coding block and a temporal direction of an L0 reference picture is the same as a temporal direction of an L1 reference picture, an offset vector may be added to each affine seed vector as in the following Equation 16. In this case, a temporal direction may be determined based on a picture order count (POC) difference between a current picture and a reference picture. In an example, when both a picture order count (POC) difference between a current picture and an L0 reference picture and a picture order count (POC) difference between a current picture and an L1 reference picture are a negative number, or when both a picture order count (POC) difference between a current picture and an L0 reference picture and a picture order count (POC) difference between a current picture and a L1 reference picture are a positive number, a temporal direction of an L0 reference picture may be determined to be the same as a temporal direction of an L1 reference picture.

$$CpMV[0] \cdot mvL0[0] = CpMV[0] \cdot mvL0[0] + \text{offsetAffine}[0]$$

$$CpMV[0] \cdot mvL0[1] = CpMV[0] \cdot mvL0[1] + \text{offsetAffine}[1]$$

$$CpMV[1] \cdot mvL0[0] = CpMV[1] \cdot mvL0[0] + \text{offsetAffine}[0]$$

$$CpMV[1] \cdot mvL0[1] = CpMV[1] \cdot mvL0[1] + \text{offsetAffine}[1]$$

$$CpMV[2] \cdot mvL0[0] = CpMV[2] \cdot mvL0[0] + \text{offsetAffine}[0]$$

$$CpMV[2] \cdot mvL0[1] = CpMV[2] \cdot mvL0[1] + \text{offsetAffine}[1] \quad \text{[Equation 16]}$$

On the other hand, when a temporal direction of an L0 reference picture is different from a temporal direction of an L1 reference picture, an updated affine seed vector may be derived by adding or subtracting an offset vector to or from each affine seed vector as in the following Equation 17. In an example, when a picture order count (POC) difference between a current picture and an L0 reference picture is a negative number, but a picture order count (POC) difference between a current picture and an L1 reference picture are a positive number, or when a picture order count (POC) difference between a current picture and an L0 reference picture is a positive number, but a picture order count (POC) difference between a current picture and an L1 reference picture is a negative number, a temporal direction of an L0 reference picture may be determined to be different from a temporal direction of an L1 reference picture.

$$CpMV[0] \cdot mvL0[0] = CpMV[0] \cdot mvL0[0] + \text{offsetAffine}[0]$$

$$CpMV[0] \cdot mvL0[1] = CpMV[0] \cdot mvL0[1] - \text{offsetAffine}[1]$$

$$CpMV[1] \cdot mvL0[0] = CpMV[1] \cdot mvL0[0] + \text{offsetAffine}[0]$$

$$CpMV[1] \cdot mvL0[1] = CpMV[1] \cdot mvL0[1] - \text{offsetAffine}[1]$$

$$CpMV[2] \cdot mvL0[0] = CpMV[2] \cdot mvL0[0] + \text{offsetAffine}[0]$$

$$CpMV[2] \cdot mvL0[1] = CpMV[2J] \cdot mvL0[1] - \text{offsetAffine}[1] \quad \text{[Equation 17]}$$

Equations 16 and 17 illustrate that the same offset vector is applied to all affine seed vectors, but the present disclosure is not limited thereto. It is also possible to separately determine an offset vector of each affine seed vector.

Alternatively, an offset vector may be set per sub-block. A motion vector of a sub-block may be updated by using an offset vector of the corresponding sub-block.

According to the motion vector precision of a current block or a neighboring block, a range of offset vector magnitude candidates may be differently determined. In other words, according to the motion vector precision of a current block or a neighboring block, at least one of the number, the minimum value or the maximum value of an offset vector magnitude candidate may be different. In an example, when an affine motion model is applied to a current block and the motion vector precision of a current block is a ¼ pel, a value of a variable, DistFromMergeMV, may be determined as one of 1, 2, 4, 8, 16, 32, 64 and 128 by distance_idx. On the other hand, when the motion vector precision of a current block is an integer-pel, a value of a variable, DistFromMergeMV, may be determined as one of 4, 8, 16, 32, 64, 128, 256 and 512 by distance_idx.

In another example, information for specifying one of a plurality of offset vector magnitude candidate sets may be signaled in a bitstream. At least one of the number or a type of offset vector magnitude candidates included in each offset vector size candidate set may be different. In an example, when the first offset vector magnitude candidate set is selected, a variable, DistFromMergeMV, may be determined as one of {1, 2, 4, 8, 16, 32, 64, 128} and when the second offset vector magnitude candidate set is selected, a variable, DistFromMergeMV, may be determined as one of {4, 8, 16, 32, 64, 128, 256, 512}.

Index information, DistMV_idx, specifying one of a plurality of offset vector magnitude candidate sets, may be signaled in a bitstream. In an example, when DistMV_idx is 0, it represents that the first offset vector magnitude candidate set is selected and when DistMV_idx is 1, it represents that the second offset vector magnitude candidate set is selected.

An offset vector may be set per sub-block or per sample. In other words, an offset vector (or a difference vector) or an offset vector array (or a difference vector array) for sub-blocks or samples may be defined as offset data.

For example, when a sub-block motion vector is derived based on affine seed vectors, motion compensation for a sub-block may be performed by using a derived sub-block motion vector. In this case, an offset vector per sub-block or per sample may be additionally used in performing the motion compensation.

An offset vector for a sub-block may be derived by using an offset vector candidate. A sub-block motion vector may be updated based on an offset vector and motion compensation for a sub-block may be performed based on an updated sub-block motion vector.

An offset vector may be derived per prediction sample in a sub-block. Concretely, an offset vector for each prediction sample may be derived based on a position of each prediction sample in a sub-block. In this case, a position of a prediction sample may be determined based on a top-left sample of a sub-block.

An x-component of an offset vector for a prediction sample may be derived based on a value multiplying a difference value between an x-component of the second affine seed vector and an x-component of the first affine seed vector by an x-axis coordinate of a prediction sample and a value multiplying a difference value between a y-component of the second affine seed vector and a y-component of the first affine seed vector by a y-axis coordinate of a prediction sample. In addition, a y-component of an offset vector for a prediction sample may be derived based on a value multiplying a difference value between an x-component of the third affine seed vector and an x-component of the first affine seed vector by an x-axis coordinate of a prediction sample and a value multiplying a difference value between a y-component of the third affine seed vector and a y-component of the second affine seed vector by a y-axis coordinate of a prediction sample.

When a 4-parameter motion model is applied to a current block, a y-component of an offset vector may be derived based on a value multiplying a difference value between an x-component of the first affine seed vector and an x-component of the second affine seed vector by an x-axis coordinate of a prediction sample and a value multiplying a difference value between a y-component of the second affine seed vector and a y-component of the first affine seed vector by a y-axis coordinate of a prediction sample.

As described above, offset vectors of prediction samples in a sub-block may have a different value, respectively. But, an offset vector array for prediction samples may be commonly applied to all sub-blocks. In other words, an offset vector array applied to the first sub-block may be the same as an offset vector array applied to the second sub-block.

Alternatively, an offset vector array per sample may be derived by further considering a position of a sub-block. In this case, a different offset vector array may be applied between sub-blocks.

After performing motion compensation for a sub-block based on a sub-block motion vector, each prediction sample may be updated based on an offset vector. A prediction sample update may be performed based on an offset vector of a prediction sample and a gradient on a prediction sample.

A gradient on a prediction sample may be derived based on a difference value of prediction samples. A gradient on the first prediction sample may be derived based on a difference value between prediction samples belonging to the same line as the first prediction sample or a difference value between prediction samples belonging to a line neighboring the first prediction sample.

In an example, a gradient on the first prediction sample may be derived by a difference value between the first prediction sample and another prediction sample belonging to the same line as the first prediction sample. Concretely, a horizontal directional gradient of the first prediction sample may be derived by a difference value between the first prediction sample and the second prediction sample belonging to the same row as the first prediction sample and a vertical directional gradient of the first prediction sample may be derived by a difference value between the first prediction sample and the third prediction sample belonging to the same column as the first prediction sample. In this case, the second prediction sample and the third prediction sample may neighbor the first prediction sample. In an example, the second prediction sample may be positioned at the left or the right of the first prediction sample and the third prediction sample may be positioned at the top or the bottom of the first prediction sample. Alternatively, the second prediction sample and the third prediction sample may apart from the first prediction sample by a predetermined distance in an x-axis and/or y-axis direction. In this case, a predetermined distance may be a natural number such as 1, 2 or 3, etc.

Alternatively, a difference value of prediction samples belonging to a line adjacent to the first prediction sample may be set as a gradient for the first prediction sample. In an example, a horizontal directional gradient for the first prediction sample may be derived by a difference value of prediction samples belonging to a row adjacent to the first prediction sample. In this case, a row adjacent to the first prediction sample may mean a top row or a bottom row of the first prediction sample. At least one of prediction samples used to drive a horizontal directional gradient of the first prediction sample may be adjacent to the first prediction sample and the other may not be adjacent to the prediction sample. In an example, a horizontal directional gradient for the first prediction sample may be derived based on a difference value between the second prediction sample positioned at the top or the bottom of the first prediction sample and the third prediction sample apart from the second prediction sample by a predetermined distance in an x-axis direction. A vertical directional gradient for the first prediction sample may be derived by a difference value of prediction samples belonging to a column adjacent to the first prediction sample. In this case, a column adjacent to the first prediction sample may mean a left column or a right row of the first prediction sample. At least one of prediction samples used to drive a vertical directional gradient of the first prediction sample may be adjacent to the first prediction sample and the other may not be adjacent to the first prediction sample. In an example, a vertical directional gradient for the first prediction sample may be derived based on a difference value between the fourth prediction sample positioned at the left or the right of the first prediction sample and the fifth prediction sample apart from the fourth prediction sample by a predetermined distance in a y-axis direction. In this case, a predetermined distance may be a natural number such as 1, 2 or 3, etc.

Equation 18 represents an example in which a horizontal directional gradient, gradientH, and a vertical directional gradient, gradientV, for the first prediction sample are derived.

$$gradientH[x][y]=(predSample[x+2][y+1]-predSample[x][y+1])>>shift1$$

$$gradientV[x][y]=(predSample[x+1][y+2]-predSample[x+1][y])>>shift1 \quad \text{[Equation 18]}$$

In Equation 18, predSample represents a prediction sample and [x][y] represents an x-axis and y-axis coordinate. shift1 represents a shifting parameter. A shifting parameter may have a predefined value in an encoding device and a decoding device. Alternatively, a shifting parameter may be adaptively determined based on at least one of a size, a shape, an aspect ratio or an affine motion model of a current block.

When a gradient for a prediction sample is derived, an offset prediction value for a prediction sample may be derived by using a gradient and an offset vector. An offset prediction value may be derived based on a multiplying operation of a gradient and an offset vector. In an example, Equation 19 represents an example in which an offset prediction value, OffsetPred, is derived.

OffsetPred[x][y]=gradientH[x][y]*offsetMV[x][y][0]+
gradientV*offsetMV[x][y][1]  [Equation 19]

When an offset prediction value is derived, a prediction sample may be updated by adding an offset prediction value to a prediction sample. Equation 20 represents an example in which a prediction sample is updated.

predSample[x][y]=predSample[x][y]+OffsetPred[x][y]  [Equation 20]

In another example, a prediction sample may be updated by adding an offset vector to a surrounding prediction sample. In this case, a surrounding prediction sample may include at least one of a sample positioned at the right of a prediction sample, a sample positioned at the bottom of a prediction sample or a sample positioned at the bottom-right of a prediction sample. In an example, Equation 21 represents an example in which a prediction sample is updated by using a surrounding prediction sample.

predSample[x][y]=predSample[x+1][y+1]+OffsetPred[x][y]  [Equation 21]

Information representing whether an offset vector will be used in performing motion compensation for a current block may be signaled in a bitstream. The information may be a 1-bit flag.

Alternatively, whether an offset vector is used may be determined based on a size of a current block, a shape of a current block or whether affine seed vectors are the same. In an example, if a 4-parameter affine motion model is applied to a current block, an offset vector can be used for motion compensation when the first affine seed vector and the second affine seed vector are the same. Alternatively, if a 6-parameter affine motion model is applied to a current block, an offset vector can be used for motion compensation when the first affine seed vector, the second affine seed vector and the third affine seed vector are the same or when two of the first affine seed vector, the second affine seed vector and the third affine seed vector are the same.

One prediction mode may be applied to a current block for a plurality of times and a plurality of prediction modes may be redundantly applied. Thus, a prediction method using the same or different prediction modes may be referred to as a combined prediction mode (or, Multi-hypothesis prediction mode).

A combined prediction mode may include at least one of a mode that a merge mode and a merge mode are combined, a mode that inter prediction and intra prediction are combined, a mode that a merge mode and a motion vector prediction mode are combined, a mode that a motion vector prediction mode and a motion vector prediction mode are combined or a mode that a merge mode and intra prediction are combined.

In a combined prediction mode, the first prediction block may be generated based on the first prediction mode and the second prediction block may be generated based on the second prediction mode. After that, the third prediction block may be generated based on a weighted sum operation of the first prediction block and the second prediction block. The third prediction block may be set as a final prediction block of a current block.

In the above-described embodiments, a variety of inter prediction methods using motion information derived from a merge candidate in a merge mode were described. Concretely, this description introduced inter prediction methods based on the following merge mode.

i) Regular Merge Mode A method that motion compensation is performed based on a motion vector derived from a merge candidate ii) Merge Offset Encoding Mode: A method that a motion vector derived from a merge candidate is modified based on an offset vector and motion compensation is performed based on a modified motion vector iii) Sub-block Motion Compensation Mode: A method that a sub-block motion vector is derived based on a merge candidate and motion compensation is performed in a basis of a sub-block iv) Encoding Mode based on Prediction Unit Partitioning A method that a current block is partitioned into a plurality of prediction units and the motion information of each prediction unit is derived from different merge candidates v) Combined Prediction Mode: A method that intra prediction and inter prediction (e.g., a merge mode) are combined Information representing that an inter prediction method based on a merge mode is allowed may be signaled in a bitstream. In an example, a merge flag, merge_flag, represents that at least one motion information of a current block is derived from a merge candidate. In an example, when a value of a syntax, merge_flag, is 1, it represents that one of the above-described inter prediction methods based on a merge mode is applied to a current block. In other words, when a value of a syntax, merge_flag, is 1, any one of a regular merge mode, a merge offset encoding mode, a sub-block motion compensation mode, an encoding mode based on prediction unit partitioning or a combined prediction mode may be applied to a current block. On the other hand, when a value of a syntax, merge_flag, is 0, it represents that the above-described inter prediction methods based on a merge mode is not applied to a current block.

Although a value of a syntax, merge_flag, is 1, additional information is needed to determine an inter prediction method applied to a current block as there are a variety of inter prediction methods based on a merge mode. In an example, at least one of a syntax, merge_subblock_flag, for determining whether a sub-block motion compensation mode is applied, a syntax, merge_offset_vector_flag or mmvd_flag, for determining whether a merge offset encoding mode is applied, triangle_partition_flag or merge_triangle_flag representing whether an encoding mode based on prediction unit partitioning is applied or ciip_flag representing whether a combined prediction mode is applied may be additionally signaled. Alternatively, whether an inter prediction method based on a specific merge mode is applied to a current block may be determined based on at least one of a size or a shape of a current block or the number of merge candidates included in a merge candidate list, instead of a flag.

In this case, when the other prediction methods excluding a regular merge mode are not applied, a regular merge mode may be applied to a current block. But, in this case, there is a problem that a lot of syntax elements should be parsed to determine whether a regular merge mode is applied to a current block. For example, there is a problem that a lot of syntax elements should be parsed although a regular merge mode is used more frequently than other modes when whether a regular merge mode is applied is determined after parsing mmvd_flag representing whether a merge offset encoding mode is applied, merge_subblock_flag representing whether sub-block motion compensation is applied, merge_triangle_flag representing whether an encoding mode based on prediction unit partitioning is applied and/or ciip_flag representing whether a combined prediction mode is applied. In other words, a determination of whether a regular merge mode is applied to a current block has multi-step parsing dependency. In addition, a problem is generated that index information, merge_idx, for specifying a merge candidate in a regular merge mode, also has high parsing dependency.

To resolve the above problem, information representing whether a regular merge mode is used may be separately encoded. Concretely, regular_merge_flag, a flag representing whether a regular merge mode is applied, may be encoded and signaled.

Table 12 represents a syntax table including regular_merge_flag.

TABLE 12

|  | Descriptor |
|---|---|
| merge_data( x0, y0, cbWidth, cbHeight ) { |  |
|   regular_merge_flag[x0][y0] | ae(v) |
|   if (regular_merge_flag[x0][y0]){ |  |
|     if ( MaxNumMergeCand > 1 ) |  |
|       merge_idx[ x0 ][ y0 ] | ae(v) |
|   } else { |  |
|     mmvd_flag[x0][y0] | ae(v) |
|     if( mmvd_flag[ x0 ][ y0 ] = = 1 ) { |  |
|       mmvd_merge_flag[ x0 ][ y0 ] | ae(v) |
|       mmvd_distance_idx[ x0 ][ y0 ] | ae(v) |
|       mmvd_direction_idx[ x0 ][ y0 ] | ae(v) |
|     } else { |  |
|       if ( MaxNumSubblockMergeCand > 0 && cbWidth >= 8 && cbHeight >= 8 ) |  |
|         merge_subblock_flag[ x0 ][ y0 ] | ae(v) |
|       if( merge_subblock_flag[ x0 ][ y0 ] = = 1 ) { |  |
|         if( MaxNumSubblockMergeCand > 1 ) |  |
|           merge_subblock_idx[ x0 ][ y0 ] | ae(v) |
|       } else { |  |
|         if( sps_ciip_enabled_flag && cu_skip_flag[ x0 ][ y0 ] = = 0 && ( cbWidth * cbHeight ) >= 64 && cbWidth < 128 && cbHeight < 128 ) { |  |
|           ciip_flag[ x0 ][ y0 ] | ae(v) |
|           if( ciip_flag[ x0 ][ y0 ] ) { |  |
|             if ( cbWidth <= 2 * cbHeight \|\| cbHeight <= 2 * cbWidth ) |  |
|               ciip_luma_mpm_flag[ x0 ][ y0 ] | ae(v) |
|             if( ciip_luma_mpm_flag[ x0 ][ y0 ] ) |  |
|               ciip_luma_mpm_idx[ x0 ][ y0 ] | ae(v) |
|           } |  |
|         } |  |
|         if( sps_triangle_enabled_flag && tile_group_type = = B && cbWidth * cbHeight >= 64 ) |  |
|           merge_triangle_flag[ x0 ][ y0 ] | ae(v) |
|         if( merge_triangle_flag[ x0 ][ y0 ] ){ |  |
|           merge_triangle_split_dir[ x0 ][ y0 ] | ae(v) |
|           merge_triangle_idx0[ x0 ][ y0 ] | ae(v) |
|           merge_triangle_idx1[ x0 ][ y0 ] | ae(v) |
|         } |  |
|       } |  |
|     } |  |
|   } |  |
| } |  |

A syntax, regular_merge_flag, may be encoded only when an inter prediction mode based on a merge mode is determined to be applied to a current block. In other words, only when a syntax, merge_flag, is 1, a syntax, regular_merge_flag, may be signaled in a bitstream.

When a syntax, regular_merge_flag, is 1, it represents that a regular merge mode is applied to a current block. When a regular merge mode is determined to be applied to a current block, a merge index, merge_idx, for specifying one of merge candidates, may be signaled in a bitstream.

When a syntax, regular_merge_flag, is 0, it represents that a regular merge mode is not applied to a current block. When a syntax, regular_merge_flag, is 0, at least one of a mmvd_flag representing whether a merge offset encoding mode is applied, a merge_subblock_flag representing whether a sub-block motion compensation mode is applied, a ciip_flag, representing whether a combined prediction mode is applied or merge_triangle_flag representing whether an encoding mode based on prediction unit partitioning is applied may be signaled in a bitstream.

Alternatively, signaling of a flag, merge_triangle_flag, may be omitted and whether an encoding mode based on prediction unit partitioning is applied may be determined based on ciip_flag. In an example, when ciip_flag is true, it represents that a combined prediction mode is applied to a current block and an encoding mode based on prediction unit partitioning is not applied. When ciip_flag is false, it represents that a combined prediction mode is not applied to a current block and an encoding mode based on prediction unit partitioning may be applied.

Alternatively, it is possible to signal at least one of a mmvd_flag representing whether a merge offset encoding mode is applied, a merge_subblock_flag representing whether a sub-block motion compensation mode is applied, a ciip_flag representing whether a combined prediction mode is applied or merge_triangle_flag representing whether an encoding mode based on prediction unit partitioning is applied before a regular_merge_flag representing whether a regular merge mode is applied. In an example, when a value of a flag, merge_subblock_flag, representing whether a sub-block motion compensation mode is applied is 0, a regular_merge_flag representing whether a regular merge is applied may be signaled.

Instead of a flag representing whether a regular merge mode is applied, a flag representing whether at least one of a regular merge mode or a merge offset encoding mode is applied may be encoded and signaled. In an example, a regular_mmvd_merge_flag representing whether at least one of a regular merge mode or a merge offset encoding mode is applied may be signaled in a bitstream.

Table 13 represents a syntax table including regular_mmvd_merge_flag.

TABLE 13

|  | Descriptor |
|---|---|
| merge_data( x0, y0, cbWidth, cbHeight ) { | |
|   regular_mmvd_merge_flag[x0][y0] | ae(v) |
|   if (regular_mmvd_merge_flag[x0][y0]){ | |
|     if ( MaxNumMergeCand > 1 ) | |
|       merge_idx[ x0 ][ y0 ] | ae(v) |
|     if( merge_idx<2 ){ | |
|       mmvd_flag[ x0 ][ y0 ] | ae(v) |
|       if( mmvd_flag[ x0 ][ y0 ] = = 1 ) { | |
|         mmvd_distance_idx[ x0 ][ y0 ] | ae(v) |
|         mmvd_direction_idx[ x0 ][ y0 ] | ae(v) |
|       } | |
|     } | |
|   } | |
|   } else { | |
|     if ( MaxNumSubblockMergeCand > 0 && cbWidth >= 8 && cbHeight >= 8 ) | |
|       merge_subblock_flag[ x0 ][ y0 ] | ae(v) |
|     if( merge_subblock_flag[ x0 ][ y0 ] = = 1 ) { | |
|       if ( MaxNumSubblockMergeCand > 1 ) | |
|         merge_subblock_idx[ x0 ][ y0 ] | ae(v) |
|     } else { | |
|       if( sps_ciip_enabled_flag && cu_skip_flag[ x0 ][ y0 ] = = 0 && ( cbWidth * cbHeight ) >= 64 && cbWidth < 128 && cbHeight < 128 ) { | |
|         ciip_flag[ x0 ][ y0 ] | ae(v) |
|         if( ciip_flag[ x0 ][ y0 ] ) { | |
|           if ( cbWidth <= 2 * cbHeight || cbHeight <= 2 * cbWidth ) | |
|             ciip_luma_mpm_flag[ x0 ][ y0 ] | ae(v) |
|           if( ciip_luma_mpm_flag[ x0 ][ y0 ] ) | |
|             ciip_luma_mpm_idx[ x0 ][ y0 ] | ae(v) |
|         } | |
|       } | |
|       if( sps_triangle_enabled_flag && tile_group_type = = B && cbWidth * cbHeight >= 64 ) | |
|         merge_triangle_flag[ x0 ][ y0 ] | ae(v) |
|       if( merge_triangle_flag[ x0 ][ y0 ] ){ | |
|         merge_triangle_split_dir[ x0 ][ y0 ] | ae(v) |
|         merge_triangle_idx0[ x0 ][ y0 ] | ae(v) |
|         merge_triangle_idx1[ x0 ][ y0 ] | ae(v) |
|       } | |
|     } | |
|   } | |
| } | |

A syntax, regular_mmvd_merge_flag, may be encoded only when an inter prediction mode based on a merge mode is determined to be applied to a current block. In other words, only when a syntax, merge_flag, is 1, a syntax, regular_mmvd_merge_flag, may be signaled in a bitstream.

When a value of a syntax, regular_mmvd_merge_flag, is 1, it represents that a regular merge mode or a merge offset encoding mode is applied to a current block. When a syntax, regular_mmvd_merge_flag, is 1, a syntax, mmvd_flag, representing whether a merge offset encoding mode is applied to a current block, may be additionally signaled. When a value of a syntax, mmvd_flag, is 1, it represents that a merge offset encoding mode is applied to a current block and when a value of a syntax, mmvd_flag, is 0, it represents that a regular merge mode is applied to a current block.

When a value of a syntax, regular_mmvd_merge_flag, is 0, it represents that a regular merge mode and a merge offset encoding mode are not applied to a current block. When a value of a syntax, regular_mmvd_merge_flag, is 0, at least one of a merge_subblock_flag representing whether a sub-block motion compensation mode is applied, a ciip_flag representing whether a combined prediction mode is applied, or a merge_triangle_flag, representing whether an encoding mode based on prediction unit partitioning is applied may be signaled in a bitstream.

Alternatively, signaling of a flag, merge_triangle_flag, may be omitted and whether an encoding mode based on prediction unit partitioning is applied may be determined based on ciip_flag. In an example, when ciip_flag is true, it presents that a combined prediction mode is applied to a current block and an encoding mode based on prediction unit partitioning is not applied. When ciip_flag is false, it presents that a combined prediction mode is not applied to a current block and an encoding mode based on prediction unit partitioning may be applied.

Alternatively, it is possible to signal at least one of a merge_subblock_flag representing whether a sub-block motion compensation mode is applied, a ciip_flag representing whether a combined prediction mode is applied, or a merge_triangle_flag representing whether an encoding mode based on prediction unit partitioning is applied before a regular_mmvd_merge_flag representing whether a regular merge mode or a merge offset encoding mode is applied. In an example, when a value of a flag, merge_subblock_flag, representing whether a sub-block motion compensation mode is applied is 0, a flag, regular_mmvd_merge_flag, representing whether a regular merge or a merge offset encoding mode is applied, may be signaled.

When a value of a flag, regular_mmvd_merge_flag, is 1, merge_idx, a merge index for specifying one of merge candidates, may be encoded and signaled and the availability of a merge offset encoding mode may be determined based on a value of merge_idx. In an example, when a value of a syntax, merge_idx, is smaller than a threshold value, a regular merge or a merge offset encoding mode may be applied to a current block. On the other hand, when a value of a syntax, merge_idx, is equal to or greater than a threshold value, a regular merge mode is applied to a current block and a merge offset encoding mode is not applied.

In an example, only when a value of merge_idx is smaller than 2, a syntax, mmvd_flag, representing whether a merge offset encoding mode is applied may be encoded and signaled. On the other hand, when a value of merge_idx is equal to or greater than 2, the encoding of a syntax, mmvd_flag, representing whether a merge offset encoding mode is applied may be omitted and a regular merge mode may be applied to a current block. In other words, only when a value of merge_idx is smaller than 2, a merge offset encoding mode may be applied.

When a syntax, mmvd_flag, is 1, it represents that a merge offset encoding mode is applied. When a merge offset encoding mode is applied, a motion vector of a merge candidate indicated by a merge index, merge_idx, may be set as an initial motion vector. In other words, a merge candidate used to derive an initial motion vector among merge candidates may be specified based on merge_idx which is parsed before mmvd_flag.

Alternatively, when mmvd_flag is 1, distance_idx and direction_idx for determining an offset vector may be signaled in a bitstream.

In another example, a syntax table may be configured so that a merge index, merge_idx, will be parsed before a flag representing whether a regular merge mode is applied (e.g., regular_merge_flag or regular_mmvd_merge_flag).

Table 14 represents an example in which a merge index is parsed before a flag representing whether a regular merge mode is applied.

TABLE 14

| | Descriptor |
|---|---|
| merge_data( x0, y0, cbWidth, cbHeight ) { | |
|   merge_idx[ x0 ][ y0 ] | ae(v) |
|   regular_merge_flag[x0] [y0] | ae(v) |
|   if (!regular_merge_flag[x0][y0]){ | |
|     if( merge_idx[x0][y0] <2 ) { | |
|       mmvd_flag[x0] [y0] | ae(v) |
|       if( mmvd_flag[ x0 ][ y0 ] = = 1 ) { | |
|         mmvd_distance_idx[ x0 ][ y0 ] | ae(v) |
|         mmvd_direction_idx[ x0 ][ y0 ] | ae(v) |
|       } | |
|     } else { | |
|       if ( MaxNumSubblockMergeCand > 0 && cbWidth >= 8 && cbHeight >= 8 ) | |
|         merge_subblock_flag[ x0 ][ y0 ] | ae(v) |
|       if( merge_subblock_flag[ x0 ][ y0 ] = = 1){ | |
|       } else { | |
|         if( sps_ciip_enabled_flag && cu_skip_flag[ x0 ][ y0 ] = = 0 && ( cbWidth * cbHeight ) >= 64 && cbWidth < 128 && cbHeight < 128 ) { | |
|           ciip_flag[ x0 ][ y0 ] | ae(v) |
|           if( ciip_flag[ x0 ][ y0 ] ) { | |
|             if ( cbWidth <= 2 * cbHeight \|\| cbHeight <= 2 * cbWidth ) | |
|               ciip_luma_mpm_flag[ x0 ][ y0 ] | ae(v) |
|             if( ciip_luma_mpm_flag[ x0 ][ y0 ] ) | |
|               ciip_luma_mpm_idx[ x0 ][ y0 ] | ae(v) |
|           } | |
|         } | |
|         if( sps_triangle_enabled_flag && tile_group_type = = B && cbWidth * cbHeight >= 64 ) | |
|           merge_triangle_flag[ x0 ][ y0 ] | ae(v) |
|         if( merge_triangle_flag[ x0 ][ y0 ] ){ | |
|           merge_triangle_split_dir[ x0 ][ y0 ] | ae(v) |
|           merge_triangle_idx1[ x0 ][ y0 ] | ae(v) |
|         } | |
|       } | |
|     } | |
|   } | |
| } | |

When motion prediction based on a merge mode is determined to be performed for a current block, a merge index for specifying one of merge candidates may be signaled. In other words, when a value of a syntax, merge_flag, is 1, merge_idx for specifying a merge candidate may be signaled.

A flag representing whether a regular merge mode is applied may be parsed after a merge index, merge_idx, is parsed. In an example, Table 14 illustrated that after merge_idx is parsed, a flag, regular_merge_flag, representing whether a regular merge mode is applied is parsed. Unlike an example in Table 14, a flag, mmvd_flag, representing whether a regular merge mode or a merge offset encoding mode is applied may be set to be signaled after the signaling of a merge index, merge_idx.

When a regular merge mode is applied, a merge candidate specified by a merge index, merge_idx, may be used to derive the motion information of a current block.

When a merge offset encoding mode is applied, a merge candidate specified by a merge index, merge_idx, may be used to derive an initial motion vector of a current block. A flag, mmvd_flag, representing whether a merge offset encoding mode is applied may be signaled in a bitstream only when a merge index is smaller than a threshold value.

When a regular merge mode is determined not to be applied (e.g., when regular_merge_flag or regular_mmvd_merge_flag is 0), a flag, merge_subblock_flag, representing whether a sub-block motion compensation mode is applied, may be signaled. When a sub-block motion compensation mode is applied, a merge candidate specified by a merge index, merge_idx, may be used to derive a motion vector of sub-blocks.

When a regular merge mode is determined not to be applied to a current block (e.g., when regular_merge_flag or regular_mmvd_merge_flag is 0), an encoding mode based on prediction unit partitioning may be applied to a current block. When an encoding mode based on prediction unit partitioning is applied, a merge candidate specified by a merge index, merge_idx, may be set as a merge candidate of one of the first partition and the second partition. When an encoding mode based on prediction unit partitioning is applied, a merge index for specifying a merge candidate of the other of the first partition or the second partition may be additionally signaled.

regular_merge_flag or regular_mmvd_merge_flag representing whether the above-described regular merge mode is applied may be signaled only when a size of a current block is smaller than a threshold value. In an example, when a size of a current block is smaller than 128×128, a flag representing whether a regular merge mode is applied may be signaled. When a flag representing whether a regular merge mode is applied is not signaled, it represents that a regular merge mode is not applied to a current block. In this case, an encoding mode based on prediction unit partitioning may be applied to a current block.

Intra-prediction is a method for performing prediction on a current block by using a reconstructed sample that has been already encoded/decoded and which is around the current block. In this connection, a reconstructed sample before applying an in-loop filter may be used for intra-prediction of the current block.

An intra-prediction method includes intra-prediction based on a matrix and intra-prediction according to a direction with a neighboring reconstruction sample. Information indicating an intra-prediction method of a current block may be signaled in a bitstream. The information may be a 1-bit flag. Alternatively, an intra-prediction of a current block may be determined on the basis of at least one of a position of the current block, a size of the current block, a shape of the current block, or an intra-prediction method of a neighboring block. In an example, when a current block is present crossing a picture boundary, it may be set such that an intra-prediction method based on a matrix is not applied to the current block.

An intra-prediction method based on a matrix is a method of obtaining a prediction block of a current block on the basis of a matrix product of a matrix stored in the encoder and the decoder, and reconstruction samples around the current block. Information for specifying any one of a plurality of prestored matrices may be signaled in a bitstream. The decoder may determine a matrix for performing intra-prediction on a current block on the basis of the above information and a size of the current block.

General intra-prediction is a method of obtaining a prediction block of a current block on the basis of a non-directional intra-prediction mode or directional intra-prediction mode.

A residual image may be derived by subtracting a prediction image from an original image. In this connection, when the residual image is converted into a frequency domain, even though high frequency components are removed from frequency components, subjective image quality of the image does not drop significantly. Accordingly, when values of high frequency components are transformed into small values, or when values of high frequency components are set to 0, compression efficiency may be increased without causing large visual distortion. Reflecting the above feature, transform may be performed on a current block so as to decompose a residual image to two-dimensional frequency components. The transform may be performed by using transform methods such as DCT (discrete cosine transform), DST (discrete sine transform), etc.

A transform method may be determined on a basis of a block. A transform method may be determined on the basis of at least one of a prediction encoding mode for a current block, a size of the current block, or a size of the current block. In an example, when a current block is encoded through an intra-prediction mode, and a size of the current block is smaller than N×N, transform may be performed by using a transform method of DST. On the other hand, when the above condition is not satisfied, transform may be performed by using a transform method of DCT.

For a partial block of a residual image, two-dimensional image transform may not be performed. Not performing two-dimensional image transform may be referred to as transform skip. When transform skip is applied, quantization may be applied to residual values for which transform is not performed.

After performing transform on a current block by using DCT or DST, transform may be performed again on the transformed current block. In this connection, transform based on DCT or DST may be defined as first transform, and performing transform again on a block to which first transform is applied may be defined as second transform.

First transform may be performed by using any one of a plurality of transform core candidates. In an example, first transform may be performed by using any one of DCT2, DCT8, or DCT7.

Different transform cores may be used for a horizontal direction and a vertical direction. Information representing a combination of a transform core of a horizontal direction and a transform core of a vertical direction may be signaled in a bitstream.

A processing unit of first transform may differ with second transform. In an example, first transform may be performed on an 8×8 block, and second transform may be performed on a 4×4 sized sub-block within the transformed 8×8 block. In this connection, a transform coefficient for remaining regions for which second transform is not performed may be set to 0.

Alternatively, first transform may be performed on a 4×4 block, and second transform may be performed on a region having an 8×8 size including the transformed 4×4 block.

Information representing whether or not to perform second transform may be signaled in a bitstream.

Alternatively, whether to perform the second transform may be determined based on whether a horizontal directional transform core and a vertical directional transform core are identical with each other. In one example, the second transform may be performed only when the horizontal directional transform core and the vertical directional transform core are identical with each other. Alternatively, the second transform may be performed only when the horizontal directional transform core and the vertical directional transform core are different from each other.

Alternatively, the second transform may be allowed only when a predefined transform core is used for the horizontal directional transform and the vertical directional transform. In one example, when a DCT2 transform core is used for transform in the horizontal direction and transform in the vertical direction, the second transform may be allowed.

Alternatively, it may be determined whether to perform the second transform based on the number of non-zero transform coefficients of the current block. In one example, when the number of the non-zero transforms coefficient of the current block is smaller than or equal to a threshold, the prediction method may be configured not to use the second transform. When the number of the non-zero transform coefficients of the current block is greater than the threshold, the prediction method may be configured to use the second transform. As long as the current block is encoded using intra prediction, the prediction method may be configured to use the second transform.

The decoder may perform inverse-transform (second inverse-transform) to the second transform and may perform inverse-transform (first inverse-transform) to the first transform resultant from the second inverse-transform. As a result of performing the second inverse-transform and the first inverse-transform, residual signals for the current block may be obtained.

When transform and quantization are performed by the encoder, the decoder may obtain the residual block via inverse-quantization and inverse-transform. The decoder may add the prediction block and the residual block to each other to obtain the reconstructed block for the current block.

When the reconstructed block of the current block is obtained, loss of information as occurring in the process of the quantization and encoding may be reduced via the in-loop filtering. The in-loop filter may include at least one of a deblocking filter, a sample adaptive offset filter (SAO), or an adaptive loop filter (ALF).

Applying the embodiments as described about the decoding process or the encoding process to the encoding process or the decoding process respectively may be included in the scope of the present disclosure. Within the scope of the present disclosure, the embodiments in which operations occur in a predetermined order may be modified to embodiments in which the operations occur in a different order from the predetermined order.

Although the above-described embodiment is described based on a series of the operations or the flowchart, the embodiment does not limit a time-series order of the operations of the method thereto. In another example, the operations may be performed simultaneously or in a different order therefrom as necessary. Further, in the above-described embodiment, each of the components (for example, a unit, a module, etc.) constituting the block diagram may be implemented in a form of a hardware device or software. A plurality of components may be combined with each other into a single component which may be implemented using a single hardware device or software. The above-described embodiment may be implemented using program instructions that may be executed via various computer components. The instructions may be recorded in a computer-readable storage medium. The computer-readable storage medium may contain therein program instructions, data files, data structures, or the like alone or in combination with each other. Examples of the computer-readable storage media include magnetic media such as hard disks, floppy disks, and magnetic tapes, optical storage media such as CD-ROMs, DVDs, and magneto-optical media such as floptical disks, and hardware devices such as ROM, RAM, flash memory, and the like specifically configured to store therein and execute the program instructions. The hardware device may be configured to operate as one or more software modules to perform processing according to the present disclosure, and vice versa.

INDUSTRIAL AVAILABILITY

The present disclosure may be applied to an electronic device that encodes/decodes video.

What is claimed is:

1. A system comprising:
one or more processors; and
one or more non-transitory computer readable media storing instructions that, when executed by the one or more processors, cause the one or more processors to perform operations comprising:
obtaining one or more spatial merge candidates of a current block;
obtaining a temporal merge candidate of the current block;
generating a merge candidate list of the current block by adding the one or more spatial merge candidates and the temporal merge candidate thereto;
obtaining motion information of the current block from one among merge candidates included in the merge candidate list;
obtaining a prediction sample of the current block based on the motion information of the current block; and
determining, based on a position of the current block, whether to update a motion information table with the motion information of the current block,
wherein when the current block is included in a pre-determined region, the motion information table is updated with the motion information of the current block only when the current block is located on a bottom-right of the pre-determined region, and
wherein when a number of the spatial and temporal merge candidates included in the merge candidate list is less than a threshold value, a motion information candidate included in a motion information table is added to the merge candidate list as a merge candidate.

2. The system of claim 1, wherein information for determining a size of the pre-determined region is signaled via a bitstream.

3. The system of claim 1, wherein when the current block is included in the pre-determined region, the motion information table is not updated with motion information of a previous block that is included in the same region as the current block.

4. The system of claim 1, wherein the operations further comprise performing a redundancy check for the motion information candidate included in the motion information table, and wherein the redundancy check for the motion information candidate is performed with a merge candidate that is derived from a top neighboring block or a left neighboring block.

5. One or more non-transitory computer readable media storing instructions that, when executed by one or more processors, cause the one or more processors to perform operations comprising:
   obtaining one or more spatial merge candidates of a current block;
   obtaining a temporal merge candidate of the current block;
   generating a merge candidate list of the current block by adding the one or more spatial merge candidates and the temporal merge candidate thereto;
   obtaining motion information of the current block from one among merge candidates included in the merge candidate list;
   obtaining a prediction sample of the current block based on the motion information of the current block; and
   determining, based on a position of the current block, whether to update a motion information table with the motion information of the current block,
   wherein when the current block is included in a pre-determined region, the motion information table is updated with the motion information of the current block only when the current block is located on a bottom-right of the pre-determined region, and
   wherein when a number of the spatial and temporal merge candidates included in the merge candidate list is less than a threshold value, a motion information candidate included in a motion information table is added to the merge candidate list as a merge candidate.

6. The one or more non-transitory computer readable media of claim 5, wherein information for determining a size of the pre-determined region is signaled via a bitstream.

7. The one or more non-transitory computer readable media of claim 5, wherein when the current block is included in the pre-determined region, the motion information table is not updated with motion information of a previous block that is included in the same region as the current block.

8. The one or more non-transitory computer readable media of claim 5, wherein the operations further comprise performing a redundancy check for the motion information candidate included in the motion information table, and wherein the redundancy check for the motion information candidate is performed with a merge candidate that is derived from a top neighboring block or a left neighboring block.

9. A system comprising:
   one or more processors; and
   one or more non-transitory computer readable media storing instructions that, when executed by the one or more processors, cause the one or more processors to perform operations comprising:
      obtaining one or more spatial merge candidates of a current block;
      obtaining a temporal merge candidate of the current block;
      generating a merge candidate list of the current block by adding the one or more spatial merge candidates and the temporal merge candidate thereto;
      obtaining motion information of the current block from one among merge candidates included in the merge candidate list;
      obtaining a prediction sample of the current block based on the motion information of the current block;
      determining, based on a position of the current block, whether to update a motion information table with the motion information of the current block,
      wherein when the current block is included in a pre-determined region, the motion information table is updated with the motion information of the current block only when the current block is located on a bottom-right of the pre-determined region; and
      generating a bitstream representing a video based on the prediction sample,
      wherein when a number of the spatial and temporal merge candidates included in the merge candidate list is less than a threshold value, a motion information candidate included in a motion information table is added to the merge candidate list as a merge candidate.

10. The system of claim 9, wherein information for determining a size of the pre-determined region is encoded into the bitstream.

11. The system of claim 9, wherein when the current block is included in pre-determined region, the motion information table is not updated with motion information of a previous block that is included in the same region as the current block.

12. The system of claim 9, wherein the operations further comprise performing a redundancy check for the motion information candidate included in the motion information table, and
   wherein the redundancy check for the motion information candidate is performed with a merge candidate that is derived from a top neighboring block or a left neighboring block.

13. One or more non-transitory computer readable media storing instructions that, when executed by one or more processors, cause the one or more processors to perform operations comprising:
   obtaining one or more spatial merge candidates of a current block;
   obtaining a temporal merge candidate of the current block;
   generating a merge candidate list of the current block by adding the one or more spatial merge candidates and the temporal merge candidate thereto;
   obtaining motion information of the current block from one among merge candidates included in the merge candidate list;
   obtaining a prediction sample of the current block based on the motion information of the current block;
   determining, based on a position of the current block, whether to update a motion information table with the motion information of the current block,
   wherein when the current block is included in a pre-determined region, the motion information table is updated with the motion information of the current block only when the current block is located on a bottom-right of the pre-determined region; and
   generating a bitstream representing a video based on the prediction sample, wherein when a number of the spatial and temporal merge candidates included in the merge candidate list is less than a threshold value, a motion information candidate included in a motion information table is added to the merge candidate list as a merge candidate.

14. The one or more non-transitory computer readable media of claim 13, wherein information for determining a size of the pre-determined region is encoded into the bitstream.

15. The one or more non-transitory computer readable media of claim 13, wherein when the current block is included in pre-determined region, the motion information table is not updated with motion information of a previous block that is included in the same region as the current block.

16. The one or more non-transitory computer readable media of claim 13, wherein the operations further comprise performing a redundancy check for the motion information candidate included in the motion information table, and wherein the redundancy check for the motion information candidate is performed with a merge candidate that is derived from a top neighboring block or a left neighboring block.

* * * * *